US011388166B2

(12) United States Patent
Fang et al.

(10) Patent No.: US 11,388,166 B2
(45) Date of Patent: Jul. 12, 2022

(54) USER MANAGEMENT OF BLOCKCHAIN-BASED CUSTOM CLEARANCE SERVICE PLATFORM

(71) Applicant: Alipay Labs (Singapore) Pte. Ltd., Singapore (SG)

(72) Inventors: Hui Fang, Hangzhou (CN); Shengjiao Cao, Hangzhou (CN); Weitao Yang, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/219,534

(22) Filed: Mar. 31, 2021

(65) Prior Publication Data
US 2021/0297418 A1    Sep. 23, 2021

Related U.S. Application Data

(63) Continuation of application No. PCT/CN2020/094962, filed on Jun. 8, 2020.

(51) Int. Cl.
*H04L 29/06* (2006.01)
*H04L 9/40* (2022.01)
(Continued)

(52) U.S. Cl.
CPC ......... *H04L 63/101* (2013.01); *G06Q 20/389* (2013.01); *H04L 9/0643* (2013.01);
(Continued)

(58) Field of Classification Search
CPC ............... H04L 63/101; H04L 63/0407; H04L 63/0421; H04L 9/0643; H04L 63/01; H04L 63/105
(Continued)

(56) References Cited

U.S. PATENT DOCUMENTS 8,271,536 B2 * 9/2012 Amradkar ........... H04L 63/0807
707/802
10,601,585 B1  3/2020 Robinson et al.
(Continued)

FOREIGN PATENT DOCUMENTS

CN    105359174    2/2016
CN    106971288    7/2017
(Continued)

OTHER PUBLICATIONS

U.S. Appl. No. 17/219,434, filed Mar. 31, 2021, Hui Fang.
(Continued)

*Primary Examiner* — Longbit Chai
(74) *Attorney, Agent, or Firm* — Fish & Richardson P.C.

(57) ABSTRACT

Disclosed herein are methods, systems, and apparatus, including computer programs encoded on computer storage media, for performing user management associated with blockchain-based services. One of the methods includes receiving: at a service platform, receiving a first request to authorize a first member to access information related to a first order; invoking a smart contract executing on a blockchain to request that the first member be added to a list of authorized members who are authorized to access the information related to the first order, in which the smart contract is configured to maintain a data structure that stores information about the authorized members; receiving a confirmation from the smart contract that the first member has been added to the list of authorized members; and sending a confirmation to the administrator that the first member has been added to the list of authorized members.

20 Claims, 15 Drawing Sheets

(51) Int. Cl.
  *G06Q 20/38* (2012.01)
  *H04L 9/06* (2006.01)
  *H04L 67/133* (2022.01)
(52) U.S. Cl.
  CPC ...... *H04L 63/0407* (2013.01); *H04L 63/0421* (2013.01); *H04L 67/40* (2013.01); *G06Q 2220/00* (2013.01)
(58) Field of Classification Search
  USPC .......................................................... 726/4
  See application file for complete search history.

(56) References Cited

U.S. PATENT DOCUMENTS

| | | | |
|---|---|---|---|
| 10,628,605 | B2 | 4/2020 | Wang |
| 10,708,070 | B2 * | 7/2020 | Fallah .................. H04L 9/3239 |
| 10,855,475 | B1 | 12/2020 | Leach et al. |
| 10,936,552 | B2 | 3/2021 | Androulaki et al. |
| 10,999,060 | B2 | 5/2021 | Zhuo et al. |
| 2017/0132620 | A1 | 5/2017 | Miller et al. |
| 2017/0317833 | A1 | 11/2017 | Smith et al. |
| 2017/0364450 | A1 | 12/2017 | Struttmann |
| 2017/0364701 | A1 | 12/2017 | Struttmann |
| 2017/0366353 | A1 | 12/2017 | Struttmann |
| 2018/0121918 | A1 | 5/2018 | Higgins |
| 2018/0189753 | A1 | 7/2018 | Kongda et al. |
| 2018/0205552 | A1 | 7/2018 | Struttmann et al. |
| 2018/0253464 | A1 | 9/2018 | Kohli et al. |
| 2018/0253702 | A1 | 9/2018 | Dowding |
| 2019/0013933 | A1 | 1/2019 | Mercuri et al. |
| 2019/0026234 | A1 | 1/2019 | Harnik et al. |
| 2019/0164157 | A1 | 5/2019 | Balaraman et al. |
| 2019/0228409 | A1 | 7/2019 | Madisetti et al. |
| 2019/0268312 | A1 | 8/2019 | Ma et al. |
| 2019/0288850 | A1 | 9/2019 | Beecham et al. |
| 2019/0354611 | A1 | 11/2019 | Snow |
| 2019/0354967 | A1 | 11/2019 | Lee et al. |
| 2019/0373472 | A1 | 12/2019 | Smith et al. |
| 2019/0379642 | A1 | 12/2019 | Simons et al. |
| 2020/0036519 | A1 | 1/2020 | Bitauld et al. |
| 2020/0042963 | A1 | 2/2020 | Benjamin et al. |
| 2020/0117818 | A1 | 4/2020 | Latka et al. |
| 2020/0118068 | A1 | 4/2020 | Turetsky et al. |
| 2020/0143337 | A1 | 5/2020 | Conroy et al. |
| 2020/0143496 | A1 | 5/2020 | Saito et al. |
| 2020/0169388 | A1 | 5/2020 | Wei et al. |
| 2020/0177604 | A1 | 6/2020 | Wei et al. |
| 2020/0233966 | A1 | 7/2020 | Bursell et al. |
| 2020/0274692 | A1 | 8/2020 | Simon et al. |
| 2020/0364703 | A1 | 11/2020 | Joveski et al. |
| 2020/0372505 | A1 | 11/2020 | Turgman et al. |
| 2021/0119994 | A1 | 4/2021 | Shekh-Yusef et al. |
| 2021/0126777 | A1 | 4/2021 | Mash |
| 2021/0143998 | A1 | 5/2021 | Kuai et al. |
| 2021/0157947 | A1 | 5/2021 | Biazetti et al. |
| 2021/0312020 | A1 | 10/2021 | Lindeman et al. |
| 2021/0320806 | A1 | 10/2021 | Boudreault |

FOREIGN PATENT DOCUMENTS

| | | |
|---|---|---|
| CN | 107273455 | 10/2017 |
| CN | 107507091 | 12/2017 |
| CN | 108062671 | 5/2018 |
| CN | 108985934 | 12/2018 |
| CN | 109472611 | 3/2019 |
| CN | 109766712 | 5/2019 |
| CN | 109791594 | 5/2019 |
| CN | 109993490 | 7/2019 |
| CN | 110264190 | 9/2019 |
| CN | 110335130 | 10/2019 |
| CN | 110473096 | 11/2019 |
| CN | 110598454 | 12/2019 |
| CN | 110795501 | 2/2020 |
| CN | 110915164 | 3/2020 |
| CN | 110929293 | 3/2020 |
| CN | 110990855 | 4/2020 |
| CN | 110995420 | 4/2020 |
| CN | 111078662 | 4/2020 |
| CN | 111105250 | 5/2020 |
| CN | 111108478 | 5/2020 |
| CN | 111159779 | 5/2020 |
| CN | 111183420 | 5/2020 |
| CN | 111222109 | 6/2020 |
| WO | WO 2018172439 | 9/2018 |
| WO | WO 2018201009 | 11/2018 |
| WO | WO 2018209222 | 11/2018 |
| WO | WO 2019072264 | 4/2019 |
| WO | WO 2019072268 | 4/2019 |
| WO | WO 2019072269 | 4/2019 |
| WO | WO 2019228556 | 12/2019 |
| WO | WO 2019233833 | 12/2019 |
| WO | WO 2020030936 | 2/2020 |
| WO | WO 2021000337 | 1/2021 |

OTHER PUBLICATIONS

U.S. Appl. No. 17/219,497, filed Mar. 31, 2021, Hui Fang.
U.S. Appl. No. 17/217,965, filed Mar. 30, 2021, Hui Fang.
U.S. Appl. No. 17/219,528, filed Mar. 31, 2021, Qian Sun.
U.S. Appl. No. 17/219,704, filed Mar. 31, 2021, Hui Fang.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/094947, dated Mar. 8, 2021, 7 pages.
PCT International Search Report and Written Opinion in International Application No. PCT/CN2020/094948, dated Mar. 8, 2021, 8 pages.
PCT International Search Report and Written Opinion in International Application No. PCT/CN2020/094949, dated Mar. 8, 2021, 8 pages.
PCT International Search Report and Written Opinion in International Application No. PCT/CN2020/094951, dated Mar. 8, 2021, 10 pages.
PCT International Search Report and Written Opinion in International Application No. PCT/CN2020/094960, dated Feb. 24, 2021, 8 pages.
PCT International Search Report and Written Opinion in International Application No. PCT/CN2020/094962, dated Mar. 8, 2021, 8 pages.
Extended European Search Report in European Application No. 20758457.4, dated Jul. 28, 2021, 8 pages.
Extended European Search Report in European Application No. 20760057.8, dated Jul. 19, 2021, 10 pages.
Jensen et al., "How Tradelens Delivers Business Value With Blockchain Technology," MIS Quarterly Executive, Dec. 2019, 18(4):221-243.
Extended European Search Report in European Application No. 20760182.4, dated Sep. 23, 2021, 10 pages.
Pham et al., "A Secure Remote Healthcare System for Hospital Using Blockchain Smart Contract," 2018 IEEE Globecom Workshops (GC Wkshps), Dec. 2018, pp. 1-6.
Extended European Search Report in European Application No. 20758583.7, dated Aug. 12, 2021, 7 pages.
Extended European Search Report in European Application No. 20759480.5, dated Aug. 13, 2021, 9 pages.
Extended European Search Report in European Application No. 20760181.6, dated Aug. 5, 2021, 8 pages.
Zhuang et al., "Applying Blockchain Technology for Health Information Exchange and Persistent Monitoring for Clinical Trials," AMIA Annual Symposium Proceedings, American Medical Informatics Association, Dec. 2018, 2018:1167-1175.

* cited by examiner

USER MANAGEMENT OF BLOCKCHAIN-BASED CUSTOM CLEARANCE SERVICE PLATFORM

CROSS-REFERENCE TO RELATED APPLICATIONS

This application is a continuation of PCT Application No. PCT/CN2020/094962, filed on Jun. 8, 2020, which is hereby incorporated by reference in its entirety.

TECHNICAL FIELD

This specification relates to user management for blockchain-based services.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Digital networks have enabled people around the world to find information and interact with each other conveniently and efficiently. For example, social media platforms allow people to easily share messages, photos, and videos with friends and colleagues. Online shopping web sites allow consumers to easily find information on a variety of products and send payments electronically to purchase products from businesses all over the world. Various kinds of payment and delivery services allow e-business providers and consumers to perform online and international transactions and shipments more easily. As more people are connected to the Internet and more transactions are conducted digitally and internationally, the volume of custom clearance claims for international orders increases, together with fraudulent claims that are difficult to be detected and handled by the customs authorities.

The current custom clearance solutions can result in high regulatory cost, due to randomness of the data supplied from different sources for custom clearance. Loopholes in the systems may allow some dishonest merchants, consumers, and custom clearance service providers to separately or jointly tamper the data for tax evasion. Moreover, the logistics data associated with international shipments can be manipulated by some dishonest shipment data providers, and is hard for consumers to detect. In some cases, some dishonest merchants can create fake international shipping data to sell locally made knock-offs as imported goods. Lastly, the data supplied from different sources can be inconsistent, hence hard to process or review by the customs authorities when the volume of the data is high.

It would be desirable to have a unified platform that can provide transparent, immutable, consistent, and verifiable custom clearance data to facilitate the custom clearance process, while ensuring data privacy and integrity of the users involved.

SUMMARY

Described embodiments of the subject matter can include one or more features, alone or in combination.

For example, in one embodiment, a computer-implemented method performed by a computing system associated with custom clearance services comprises: at a service platform, receiving first information related to an order, wherein the first information is provided, or to be provided, to a service authority for requesting clearance for merchandize included in the order; at the service platform, encrypting at least a portion of the first information to generate encrypted first data; and sending the encrypted first data to a blockchain network to store the encrypted first data on a blockchain managed by the blockchain network, wherein the encrypted first data are stored on the blockchain through consensus of blockchain nodes of the blockchain network.

As another example, in one embodiment, a system for processing custom clearance data comprises a service platform. The service platform comprises: a plurality of service modules and an application programming interface (API) layer comprising a plurality of APIs to enable users to invoke the service modules to process data related to orders associated with importation of merchandise, in which the data include information provided, or to be provided, to service authorities for requesting clearance of the merchandize for the order, and a rules database that includes information about rules for processing data for multiple countries; wherein at the service platform, upon receiving first data for a first order associated with importation of merchandise into a first country, the service modules process the first custom clearance data based on information in the rules database in compliance with rules of the first country, and wherein at the service platform, upon receiving second custom clearance data for a second order associated with importation of merchandise into a second country that is different from the first country, the service modules process the second custom clearance data based on information in the rules database in compliance with rules of the second country.

As another example, in one embodiment, a system for processing clearance data comprises a clearance platform, the service platform comprising: a plurality of service modules and an API layer comprising a plurality of APIs to enable users to invoke the service modules to process clearance data related to orders associated with purchase of merchandise, and a rules database that includes information about rules for processing clearance data, including a rule specifying an amount of fee or donation to be imposed on a specified category of merchandise; wherein at the clearance platform, upon receiving clearance data associated with an order, the service modules are configured to store at least a portion of the clearance data in a blockchain or a smart contract data cache, and process the clearance data based on information in the rules database to determine an amount of fee or donation to impose on the order.

As another example, in one embodiment, a computer-implemented method performed by a computing system associated with custom clearance services comprises: at a service platform, receiving a first request to authorize a first member to access information related to a first order, wherein the information is provided to a service authority for requesting clearance for the first order, and the first request is sent from an administrator; invoking a smart contract executing on a blockchain to request that the first member be added to a list of authorized members who are authorized to access the information related to the first order, in which the smart contract is configured to maintain a data structure that stores information about the authorized members, wherein the blockchain stores the information related to the first import order or a processed version of the information related to the first order; receiving a confirmation from the smart contract that the first member has been added to the list of authorized members; and sending a confirmation to the administrator that the first member has been added to the list of authorized members.

As another example, in one embodiment, a computer-implemented method performed by a computing system associated with custom clearance services comprises: at a service platform, receiving a first request from a first user to record or update information related to a first order, wherein the information is provided, or to be provided, to a service authority for requesting clearance for merchandize included in the first order; determining whether the first user is one of authorized members who are authorized to record or update the information related to the first order; and upon confirming that the first user is an authorized member, recording or updating the information related to the first order according to the first request.

As another example, in one embodiment, a computer-implemented method performed by a computing system for processing data, the system comprises: a service platform comprising a plurality of service modules and an API layer comprising a plurality of APIs to enable users to invoke the service modules to process information related to an order associated with importation of a merchandise, wherein the information is provided, or to be provided, to a service authority for requesting clearance for the merchandize associated with the order, wherein a first API of the plurality of APIs enables a user of the service platform to invoke a smart contract on a blockchain managed by a blockchain network, in which the smart contract performs at least one of processing of the information or processing of information related to another user of the service platform.

As another example, in one embodiment, a system for processing data comprises: a service platform comprising a plurality of service modules and an API layer comprising a plurality of APIs to enable users to invoke the service modules to process information related to an order associated with importation of a merchandise, wherein the information is provided, or to be provided, to a service authority for requesting clearance of the merchandize associated with the order, wherein a first API of the plurality of APIs enables a user of the service platform to invoke a smart contract on a blockchain managed by a blockchain network, in which the smart contract performs at least one of processing of the information or processing of information related to another user of the service platform.

As another example, in one embodiment, a system for processing data comprises: a service platform comprising a plurality of service modules and an API layer comprising a plurality of APIs to enable users to invoke the service modules to generate smart contracts configured to process information related to an order associated with importation of a merchandise, wherein the information is provided, or to be provided, to a service authority for requesting clearance of the merchandize associated with the order, wherein a first API of the plurality of APIs enables a user of the service platform to invoke a smart contract generator that includes customizable smart contract templates, in which the smart contract generator enables the user to generate a smart contract configured to process the information.

As another example, in one embodiment, a system for processing data comprises: a service platform comprising a plurality of service modules and an API layer comprising a plurality of APIs to enable users to invoke the service modules to process information related to an order associated with importation of a merchandise, wherein the is information provided, or to be provided, to a service authority for requesting clearance of the merchandize associated with the order, wherein a first API in the plurality of APIs enables a user of the service platform to deploy a smart contract to a blockchain managed by a blockchain network, and the smart contract is configured to process the information in association with the blockchain.

As another example, in one embodiment, a computer-implemented method comprises: at a service platform, providing a first API configured to register a specified smart contract at a blockchain managed by a specified blockchain network; receiving a first call from a first user to the first API to request registration of a first smart contract at a first blockchain managed by a first blockchain network; from the service platform, sending a request to the first blockchain network to register the first smart contract; receiving at the service platform a confirmation message from the first blockchain network that the first smart contract has been successfully registered at the first blockchain; and sending from the service platform a confirmation message to the first user that the first smart contract has been successfully registered at the first blockchain.

As another example, in one embodiment, a computer-implemented method blockchain-based data storage comprises: receiving data for storage from a service platform, wherein the data includes mutable data, immutable data, and index data identified by the service platform; storing the mutable data in a cache storage, wherein the mutable data is to be executed by a smart contract; initiating, a consensus algorithm to record the immutable data on a blockchain; in response to successfully performing the consensus algorithm, recording, based on invoking the smart contract, the immutable data on the blockchain, wherein the blockchain is stored in a database that has lower storage cost than the cache storage; and linking, based on invoking the smart contract, the mutable data and the immutable data based on the index data.

As another example, in one embodiment, a computer-implemented method for processing import custom clearance data with different levels of data privacy based on blockchain technologies comprises: at a service platform, receiving, from a computing device associated with a user, an encryption key and data for custom clearance for storage on a blockchain, wherein the data includes public data and private data, and the encryption key encrypts the private data; storing the encryption key and an identifier (ID) of the data in a cache storage dedicated to storing smart contract data for executing a smart contract; and invoking an API to enable a blockchain node to initiate a consensus algorithm to record the data and the ID of the data on a blockchain.

As another example, in one embodiment, a computer-implemented method for data storage on a blockchain performed by a computing device comprises: determining that data stored in a cache storage satisfies a predetermined condition; adding a blockchain address of a second smart contract to a configuration file, wherein the configuration file includes a plurality of addresses corresponding to a plurality of smart contracts stored on a blockchain; and invoking a virtual machine to execute the configuration file, wherein execution of the configuration file initiates a consensus algorithm to generate the second smart contract at the blockchain address and a corresponding smart contract pool for storing at least a portion of the data on the blockchain, and wherein the smart contract pool is a data structure to be stored on the blockchain.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
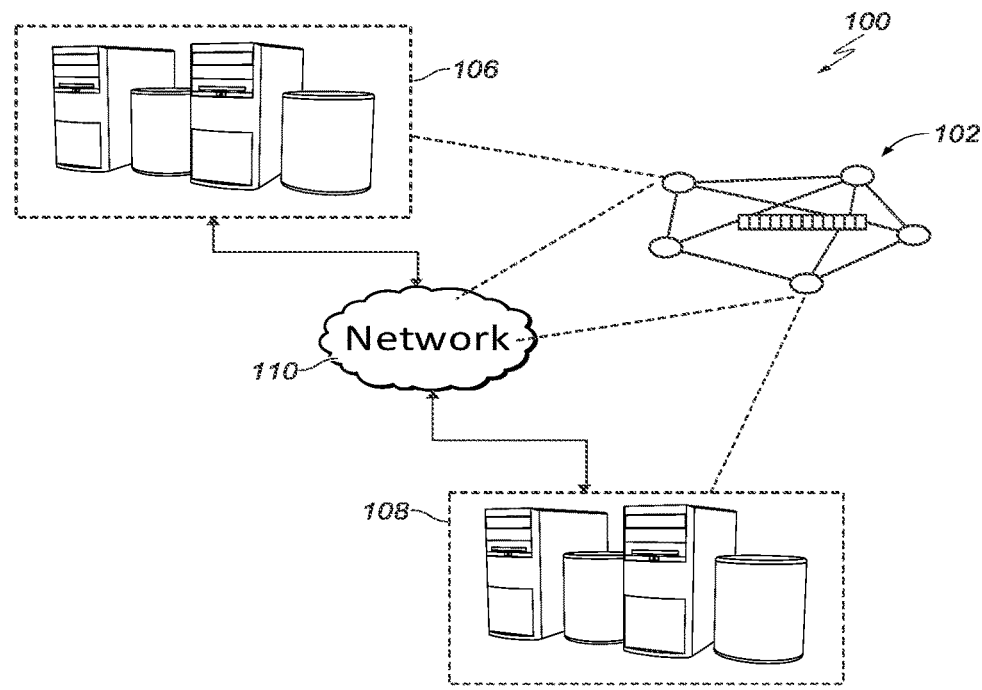
FIG. 1 is a diagram illustrating an example of an environment that can be used to execute embodiments of this specification.

This specification describes technologies related to blockchain-based document registrations for custom clearance services. These technologies generally involve, for example, at a service platform, receiving first information related to an order, wherein the first information is provided, or to be provided, to a service authority for requesting clearance for merchandize included in the order; at the service platform, encrypting at least a portion of the first information to generate encrypted first data; and sending the encrypted first data to a blockchain network to store the encrypted first data on a blockchain managed by the blockchain network, wherein the encrypted first data are stored on the blockchain through consensus of blockchain nodes of the blockchain network.

This specification also describes technologies for managing authorized member for accessing custom clearance data. These technologies generally involve, for example, at a service platform, receiving a first request to authorize a first member to access information related to a first order, wherein the information is provided to a service authority for requesting clearance for the first order, and the first request is sent from an administrator; invoking a smart contract executing on a blockchain to request that the first member be added to a list of authorized members who are authorized to access the information related to the first order, in which the smart contract is configured to maintain a data structure that stores information about the authorized members, wherein the blockchain stores the information related to the first import order or a processed version of the information related to the first order; receiving a confirmation from the smart contract that the first member has been added to the list of authorized members; and sending a confirmation to the administrator that the first member has been added to the list of authorized members.

This specification also describes technologies for processing data. These technologies generally involve: a service platform comprising a plurality of service modules and an API layer comprising a plurality of APIs to enable users to invoke the service modules to process information related to an order associated with importation of a merchandise, wherein the information is provided, or to be provided, to a service authority for requesting clearance for the merchandize associated with the order, wherein a first API of the plurality of APIs enables a user of the service platform to invoke a smart contract on a blockchain managed by a blockchain network, in which the smart contract performs at least one of processing of the information or processing of information related to another user of the service platform.

This specification also describes technologies for blockchain-based data storage performed by a blockchain node. These technologies generally involve receiving data for storage from a service platform, wherein the data includes mutable data, immutable data, and index data identified by the service platform; storing the mutable data in a cache storage, wherein the mutable data is to be executed by a smart contract; initiating, a consensus algorithm to record the immutable data on a blockchain; in response to successfully performing the consensus algorithm, recording, based on invoking the smart contract, the immutable data on the blockchain, wherein the blockchain is stored in a database that has lower storage cost than the cache storage; and linking, based on invoking the smart contract, the mutable data and the immutable data based on the index data.

This specification also describes technologies for processing import custom clearance data with different levels of data privacy. These technologies generally involve at a service platform, receiving, from a computing device associated with a user, an encryption key and data for custom clearance for storage on a blockchain, wherein the data includes public data and private data, and the encryption key encrypts the private data; storing the encryption key and an identifier (ID) of the data in a cache storage dedicated to storing smart contract data for executing a smart contract; and invoking an API to enable a blockchain node to initiate a consensus algorithm to record the data and the ID of the data on a blockchain.

This specification also describes technologies for data storage on a blockchain performed by a computing device. These technologies generally involve: determining that data stored in a cache storage satisfies a predetermined condition; adding a blockchain address of a second smart contract to a configuration file, wherein the configuration file includes a plurality of addresses corresponding to a plurality of smart contracts stored on a blockchain; and invoking a virtual machine to execute the configuration file, wherein execution of the configuration file initiates a consensus algorithm to generate the second smart contract at the blockchain address and a corresponding smart contract pool for storing at least a portion of the data on the blockchain, and wherein the smart contract pool is a data structure to be stored on the blockchain.

This document describes a system that can be used by the customs authorities to process import custom clearance data related to imports made by individuals. In the following, the system will be referred to as the "custom clearance system," "custom clearance service platform," or simply "service platform." Below is a brief description of the import custom clearance process. Different countries have different statutes and regulations that govern the import custom clearance process. The examples described in this specification are based on the general import custom clearance procedures that are common to many countries. It is understood that the technology described in this specification can be applied to the import custom clearance process of any of several countries in the world with modifications based on the specific custom clearance requirements of each individual country.

In general, the import custom clearance process may involve submitting import documentation, e.g., one or more of purchase order from buyer, sales invoice of supplier, bill of entry, bill of lading or air way bill, packing list, certificate of origin, and any other specific documentation required by the buyer, or financial institution or the importing country regulation. The import custom clearance process also involves customs examination, assessment of goods to be imported, payment of duty, and taking delivery of goods from customs after the goods have been cleared by the customs agency or authority. The examples described in this document primarily involve processing of import custom clearance data related to importation of goods by individuals. The technology described in this specification can also be applied to processing of import custom clearance data related to importation of goods by business entities with modifications based on the relevant regulations.

When a buyer residing in a country purchases products from a seller located outside of the country, the buyer (or an agent of the buyer) needs to submit identity documentation for custom clearance purposes. A custom clearance service platform can act as a hub to gather the import documentations needed for custom clearance. After the documentations are gathered and submitted to a custom, the customs officer can first look at the shipment document. International shipments need to have a commercial invoice. The shipping document can list both the shipper and the buyer's contact information, in addition to shipment details such as export date and airway bill number. Moreover, the invoice can include a description of the item and its total value.

The customs officer can then see if any taxes and duties should apply to the shipment. This will depend on the type of goods, their value, and the laws of the importing country. If it is determined that the value of the goods is above the tax threshold, then the officer will check whether these taxes and duties have been paid for. The customs will request payment of taxes and duties, if they haven't been paid by the buyer when the order is placed. After it is confirmed that outstanding taxes and duties have been paid, the shipment can be released and continues on to its final destination.

The techniques described in this specification produce several technical effects. In some embodiments, the entire lifecycle of custom clearance data such as the order data, logistics data, and payment data, can be recorded on a blockchain. For example, the blockchain can store an immutable and transparent chain-of-record of that links order data, logistics data, and payment data associated with the same order. Because the records on the blockchain are recorded through consensus of the blockchain nodes, they can be easily verified and trusted by parties that have access to the blockchain. As compared to peer to peer communications, the use of blockchain technology improves efficiency of data processing when the custom clearance data are generated by different parties.

In some embodiments, the custom clearance data can be time sensitive. For example, disputes may arise on timing of order placement, shipment, or payment, especially when international transactions involve parties or service providers located in different time zones. The disclosed technology is especially suitable for providing trusted times of order data, logistics data, and payment data that may not be synchronized, such that potential disputes that arise due to time differences can be avoided.

In some countries, the customs laws and regulations allow individuals to import products tax-free if certain criteria are met, such as if the quantity and value of the products for a given order are less than certain thresholds. A dishonest individual may attempt to avoid import taxes by splitting an order (whose quantity and/or value of the products would not qualify for tax exemption) into multiple smaller orders for multiple fictitious individuals so that the quantity and/or value of the product(s) for each smaller order are reduced to below the thresholds and meet the criteria for tax exemption.

The technology described in this specification provides a solution to prevent individuals from avoiding import taxes through this loophole.

In some embodiments, custom clearance data recorded on the blockchain can be embedded with a unique ID associated with a taxpayer. As such, the identity of the taxpayer can be verified and trusted. The unique ID can also be used to trace all custom clearance data associated with the taxpayer to ensure that an order is not fraudulently split among multiple buyers for the purpose of tax evasion.

In some embodiments, the custom clearance data to be recorded on the blockchain can be encrypted. The encryption keys can be generated and shared among the participants involved in the custom clearance process. The service platform can also provide zero knowledge proofs (ZKPs) to consensus nodes of the blockchain network. The ZKPs can be used by the consensus nodes to verify whether the data belongs to valid orders (e.g., whether the order values are within certain reasonable range) without knowing the actual data. The consensus nodes perform consensus only after the ZKPs are successfully verified. As such, privacy and security of the data recorded on the blockchain can be ensured.

In some embodiments, data privacy of the data can further be protected based on using the trusted execution environment (TEE) technology. The TEE serves as an isolated and trusted computing environment that can be integrated in the blockchain nodes of the blockchain network. The TEE processes plaintext of the custom clearance data and outputs cyphertext of the data. Using the TEE technology, the data can be easily updated inside the TEE without revealing the actual updates. Moreover, the output of the TEE is encrypted and trusted by all blockchain nodes of the blockchain network, hence can be efficiently stored to the blockchain after the blockchain nodes reach consensus.

This document describes a scalable system for processing custom clearance data handled by one or more customs authorities, which can be responsible for processing data related to the importation of goods through, e.g., a shipping port, a city, a state or a province, an entire nation, or a region encompassing multiple nations. As the custom clearance data accumulates, the data volume can be high, which raises the storage cost. In some embodiments, the custom clearance data on the blockchain can be stored either in a smart contract data cache or a blockchain database. The smart contract data cache can be a storage medium with faster read and write speed but higher storage cost. The blockchain database can be a storage medium with slower read and write speed but lower storage cost. The smart contract data cache can be used to store mutable data in the form of smart contract data, while the blockchain database can be used to store incremental, immutable, permanent blockchain data. As such, a better balance between processing efficiency and storage cost of the blockchain data can be reached.

As the smart contract data accumulates, it may be cost prohibitive to store all of them in high cost storage media such as cache. In some embodiments, the smart contract data can be stored in a so-called smart contract pool on the blockchain. A smart contract pool is a data structure (e.g., a Merkle Patricia Tree) stored as a transaction on the blockchain. Each smart contract can correspond to a dedicated smart contract pool. The smart contract data cache can store frequently used, mutable custom clearance data to be executed by the smart contract, while the smart contract pool can be created on the blockchain to store immutable data and programming instructions corresponding to the smart contract. A blockchain node can invoke a virtual machine to retrieve the programming instructions and/or other immutable data from the blockchain to execute the smart contract and store the output, event logs, and updates back to the smart contract pool. A plurality of smart contracts can be created to store data to a plurality of smart contract pools. The smart contract pools can be easily expanded by adding new smart contracts in order to afford more flexible custom clearance data storage and reduce storage cost by shifting data from cache to database storage.

In some embodiments, the blockchain can store only hash values of some infrequently used custom clearance data to further save storage space. When the data need to be verified by a customs authority, the custom clearance system or service platform (e.g., 504) can use the hash value to retrieve the corresponding custom clearance data from the data source. For example, if order data associated with an order needs to be retrieved by the customs authority, the custom clearance service platform 504 can send the corresponding hash value to an e-business platform (EBP) that possesses the order data. Based on the hash value, the EBP can send the order data back to the custom clearance service platform 504 to be delivered to the customs authority.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
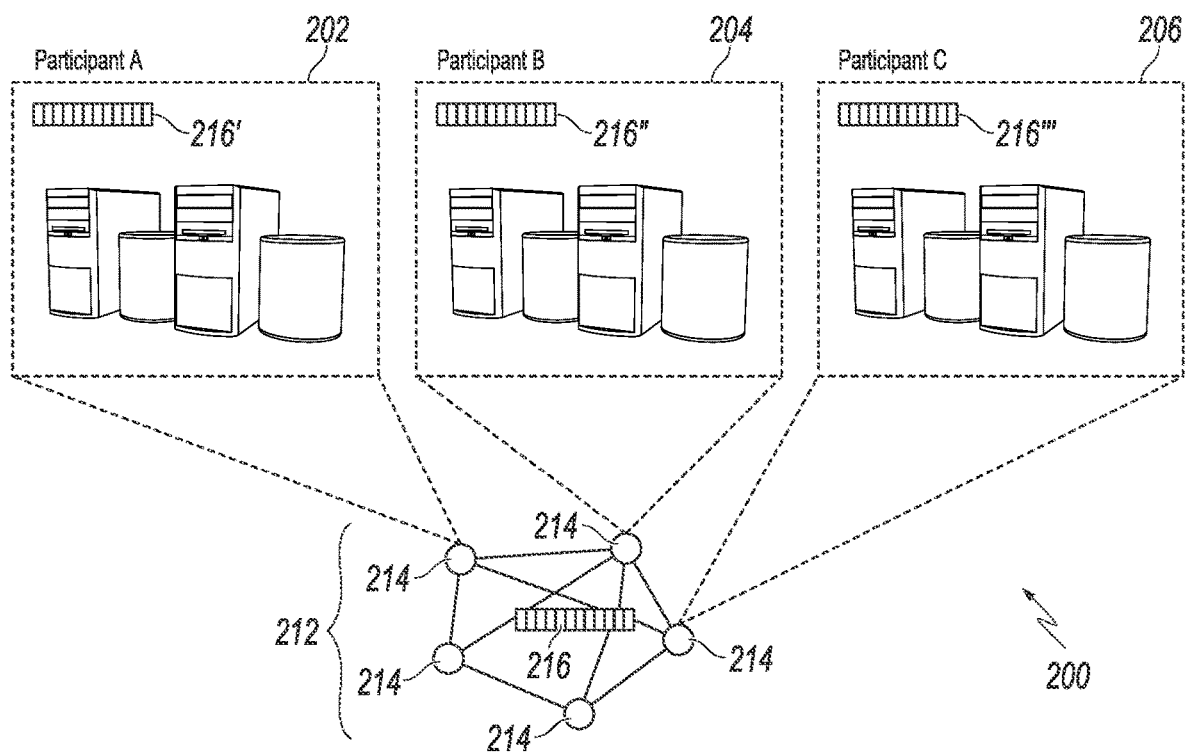
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through, the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical *Byzantine* state machine replication that tolerates *Byzantine* faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each of the consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating cyphertext from plaintext), and decryption (generating plaintext from cyphertext). In symmetric encryption, the same key is available to multiple nodes, so each node can en-/de-crypt transaction data.

Asymmetric encryption uses keys pairs that each include a private key and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (cyphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using trusted execution environments (TEEs). At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients. Additional details of the TEE technology are described in, e.g., PCT application PCT/CN2019/081180, filed on Apr. 3, 2019, the contents of which are incorporated by reference.

Figure 3:
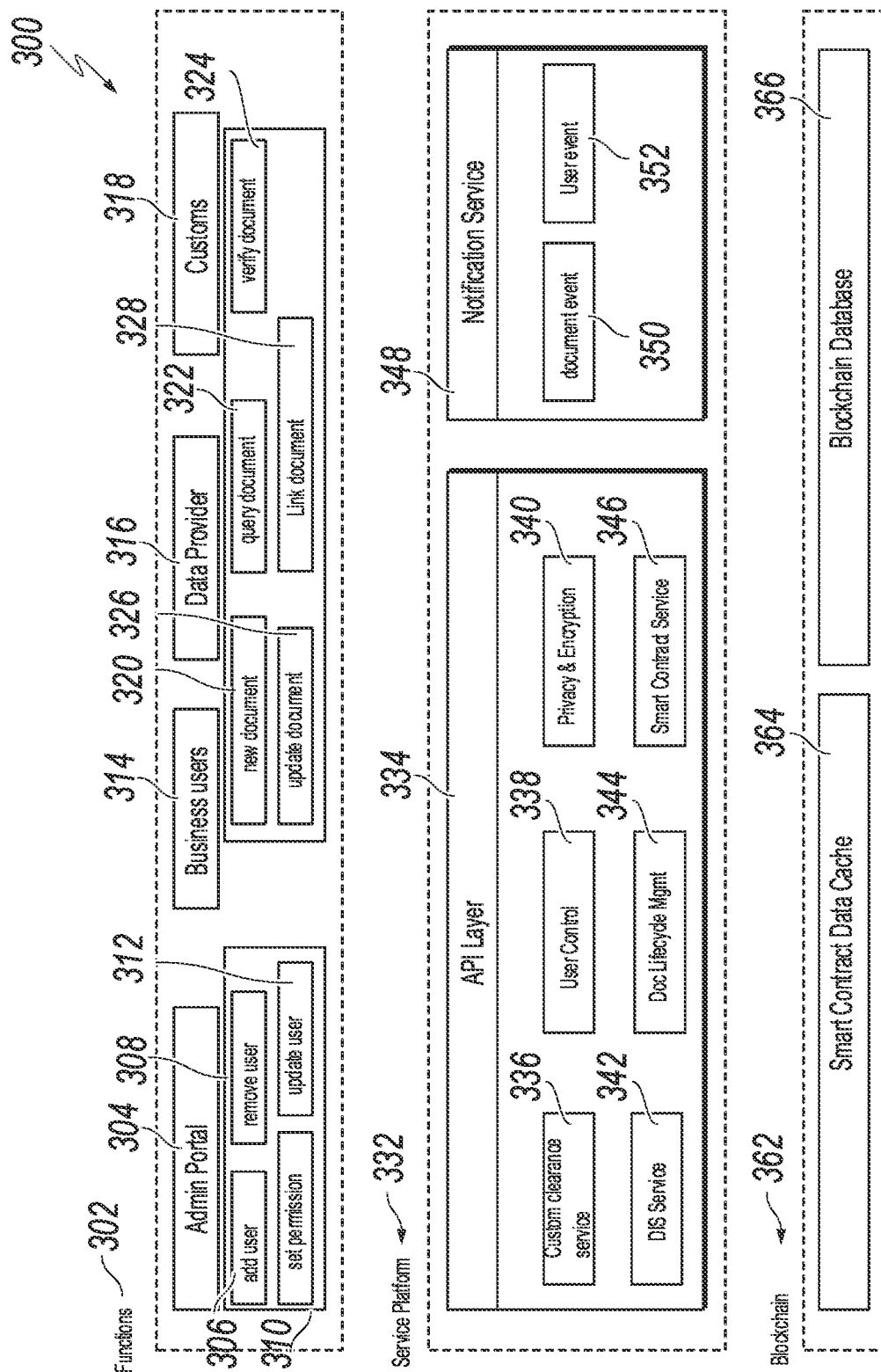
FIG. 3 is a diagram illustrating an example of services provided by a custom clearance service platform in accordance with embodiments of this specification.

FIG. 3 is a diagram illustrating an example of services 300 provided by a custom clearance service platform 332 in accordance with embodiments of this specification. The purpose of the service platform is to provide application program interfaces (APIs) of data services to various participants in the custom clearance process. The data services are based on blockchain technology implemented on a consortium blockchain network. The consortium blockchain network can include nodes owned by one or more of the service platform 332, business users 314 (e.g., e-business platform (EBP)), data provider 316 (custom clearance agent platform), customs 318, payment services providers, delivery services companies, and/or individual users. Efficiency and transparency of the custom clearance process can be ensured by using the custom clearance service platform to interface with data from the blockchain of the consortium blockchain network.

In this specification, the term "custom clearance agent platform" refers to the platform (which can include a combination of hardware and software) provided or managed by custom clearance agents or brokers who represent buyers in preparing and submitting documents for obtaining custom clearance from the customs authorities. The term "custom clearance service platform" (332 in FIG. 3) refers to the platform (which can include a combination of hardware and software) using the inventive technologies described in this specification.

The functions 302 of the custom clearance service platform 332 can be invoked by a system administrator through an administrator portal 304. The functions invoked by the system administrator can include one or more of adding new users 306 with permissions to use the custom clearance service platform 332, removing users 308, setting permission levels 310 based on different user types, or updating the list of users 312.

The users can be owners of blockchain nodes of a consortium blockchain network associated with a blockchain 362 or parties involved in transactions that produce or are associated with the custom clearance data. The user types can include one or more of custom clearance service platform users, business owners, the custom clearance agent platform, delivery services companies, payment services companies, customs, and custom clearance service platform system administrators. The following table, Table 1, lists some example properties under a user sub-model modeled by the custom clearance service platform 332.

TABLE 1

| Properties | Data Type | Description |
| --- | --- | --- |
| userId | string, unique | User ID |
| userType | enum | User type |
| publicKey | base64 encoded string | Public key |
| privateKeyAlias | string | Alias of private key used by the custom clearance service platform to invoke the private key kept in secured digital key vault |
| bcAccountId | string | Account ID on the blockchain |

The functions 302 of the custom clearance service platform 332 can also be invoked by participants of the custom clearance process including business users 314, data providers 316, and customs authority 318. Those participants can perform functions including one or more of adding new documents 320, querying documents 322, verifying documents 324, updating documents 326, or linking documents 328. In some examples, the documents that are involved in the custom clearance process can include one or more of order documents, logistics documents, shipment tracking documents, or payment documents.

Part or all of the documents can be encrypted by encryption keys to protect privacy of the document owners. The document owners can determine which users can be allowed to access the plaintext version of the documents and request the system administrator to set access permissions 310 of the documents. In some embodiments, the document owners can provide a list of users that are permitted to access the plaintext version of the documents besides the document owners themselves.

In some examples, the encryption key used to encrypt the documents can be a symmetric key. To set access permission 310 for a user, the system administrator can encrypt the symmetric key by using the public key of the user. The encrypted version of the symmetric key can be stored in a smart contract. The users that have access of the document can retrieve the encrypted version of the symmetric key from the smart contract and use its corresponding private key to decrypt the encrypted version of the symmetric key. After the symmetric key is decrypted, the user can use it to decrypt the encrypted document.

The custom clearance service platform 332 includes an API layer 334 that comprises multiple APIs available to be called by the users to provide services associated with custom clearance. Those APIs can be accessed through a software application (APP) from a computing device. The APIs can interface with services including one or more of custom clearance services 336, user control services 338, privacy and encryption services 340, distributed information storage (DIS) services 342, document lifecycle management services 344, or smart contract services 346.

The custom clearance services 336, user control services 338, and privacy and encryption services 340 are user-oriented, meaning that those services are provided mainly for the users or system administrator of the custom clearance service platform. The DIS services 342, document lifecycle management services 344, and smart contract services 346 are blockchain-oriented, meaning that those services are provided mainly for the blockchain nodes of the consortium blockchain network.

The custom clearance services 336 can be provided for the users for handling different types of documents. The user control services 338 can be provided to the system administrator for access control of users of the custom clearance service platform 332. The privacy and encryption services 340 can be provided to the system administrator and users for providing encryption services to allow different levels of document privacy controls.

The DIS services 342 can be provided to selectively store custom clearance data in either the smart contract data cache 364 or the permanent blockchain database 366. The document lifecycle management 344 can be used to manage or update events associated with different types of documents, such as an order received event, a payment refunded event, etc. The smart contract services 346 can be provided to perform smart contract related functions such as creating and executing a smart contract, creating smart contract pools, etc.

In some embodiments, notification services 348 can be provided for one or more blockchain nodes of the consortium blockchain network, so that the blockchain nodes can notify the custom clearance service platform 332 and/or the users for updates on document events 350 (e.g., new document added, document status change) and user events 352 (e.g., new user added, user permission level changed).

The storage of data on the blockchain 362 can include smart contract data cache 364 storage and blockchain database 366 storage. In general, a document can include both data that can be modified or updated, and data that are unmodifiable or does not need to be modified. The modifiable data can be referred to as mutable data, or dynamic data, which can be stored in the smart contract data cache 364. The unmodifiable data can be referred to as immutable data, which can be permanently stored on the blockchain in the blockchain database 366. In some embodiments, the custom clearance service platform 332 can determine mutable data and immutable data in a document. More details on custom clearance data storage are discussed in the description of FIG. 8.

Figure 4:
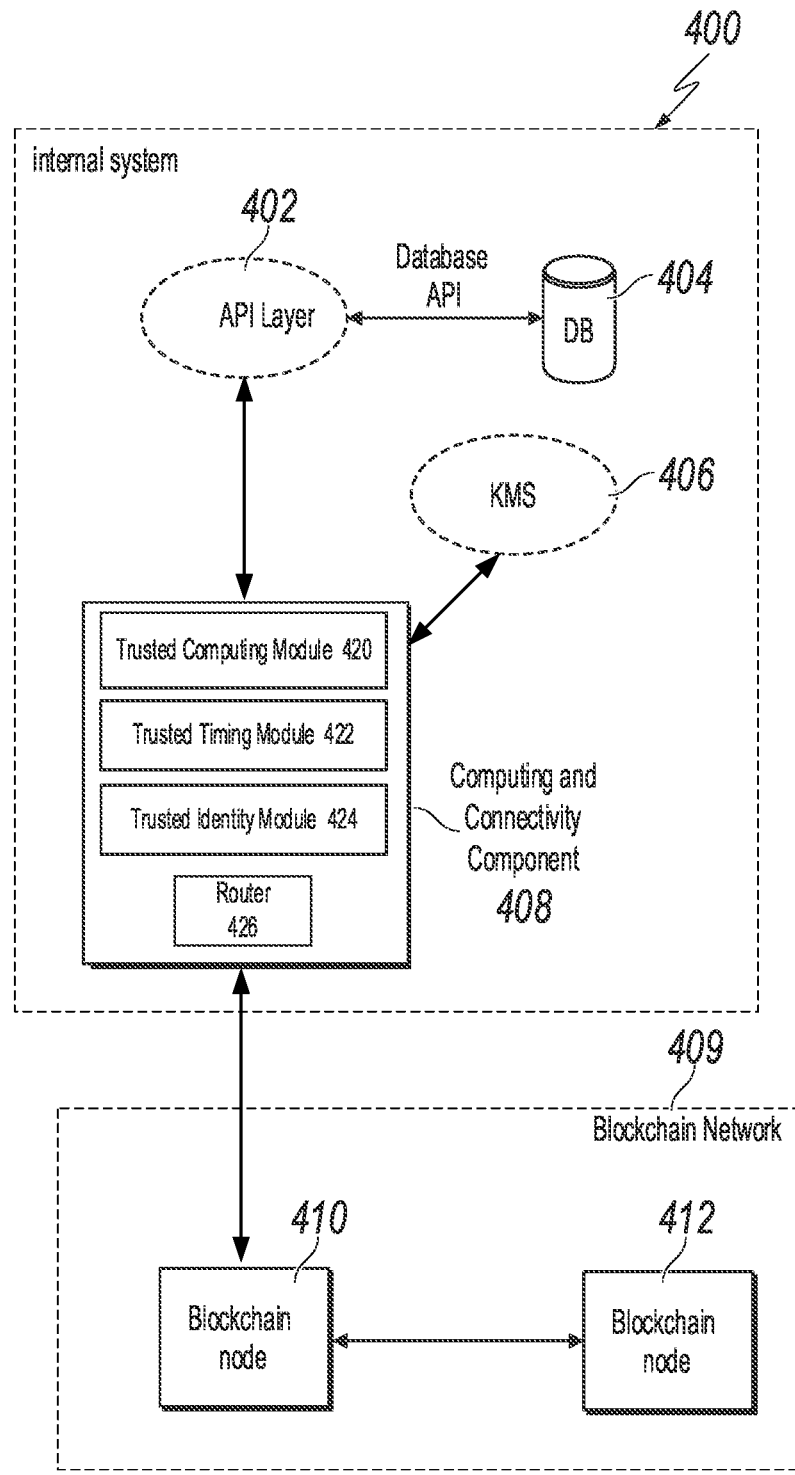
FIG. 4 is a flow diagram illustrating an example of an internal system of the custom clearance service platform in accordance with embodiments of this specification.

FIG. 4 is a flow diagram illustrating an example of an internal system 400 of the custom clearance service platform 332 in accordance with embodiments of this specification.

At a high-level, the custom clearance service platform's internal system 400 can include an application program, or APP, 402, a database 404, a key management system (KMS) 406, and a computing and connectivity component 408. In some embodiments, the internal system 400 can include fewer or more components. The internal system 400 is connected to a blockchain network 409 that includes a plurality of blockchain nodes (only blockchain node 410 and blockchain node 412 are depicted in FIG. 4 for illustration purposes, it is understood that the blockchain network 409 can include many additional blockchain nodes).

The APP 402 can be a software program for carrying the APIs of the service platform for providing data services associated with custom clearance. The APP 402 can be an interface between users of the service platform 332 and the internal system 400 of the service platform 332. For example, the APP 402 can be used to receive input including user profile information, login information, custom clearance data, etc. In some embodiments, data related to custom clearance can be stored in a database 404. The database 404 can include any memory or database module and can take the form of volatile or non-volatile memory, including, without limitation, magnetic media, optical media, random access memory (RAM), read-only memory (ROM), removable media, or any other suitable local or remote memory component. The database 404 can store various objects or data, including classes, frameworks, applications, backup data, business objects, jobs, web pages, web page templates, database tables, repositories storing business or mutable data, and any other appropriate information including any parameters, variables, algorithms, instructions, rules, constraints, or references thereto associated with the purposes of the APP 402 or the internal system 400.

Example data can include order data, logistics data, tracking data, payment data, templates, and encryption keys, etc. Additionally, the database 404 can include any other appropriate data, such as VPN applications, firmware logs and policies, firewall policies, a security or access log, print or other reporting files, as well as others. In some examples, the APP 402 can retrieve data from the database 404 through a database API.

The APP 402 can communicate information related to custom clearance with a computing and connectivity component 408. In some embodiments, the computing and connectivity component 408 can include a trusted computing module 420, a trusted timing module 422, and a trusted identity module 424. The trusted computing module 420 can include one or more processors to execute instructions provided by a software development kit (SDK). Example instructions can include performing encryption, generating digital signatures and/or ZKPs, or other applicable proofs. In some embodiments, the one or more data processors can have a TEE that is isolated from the one or more processors' operating system and configured to provide enhanced confidentiality and integrity of code executing, and data loaded within, the one or more data processors.

In some embodiments, the trusted computing module 420 can be configured to record data associated with custom clearance in compliance with privacy laws. For example, the trusted computing module 420 can generate a hash value of the record (i.e., a transaction hash), and add a block that includes the record and the hash value to the blockchain associated with the blockchain network 409. As discussed earlier, a document can include mutable data and immutable blockchain data that are separately stored in a smart contract data cache and a blockchain database. In some embodiments, for a same document or smart contract transaction, the transaction hash of the mutable data can be stored with the corresponding immutable data under the same data structure on the blockchain, so that the mutable data and the immutable data can be linked. Alternatively or additionally, the transaction hash of the immutable data can be stored with the corresponding mutable data in the smart contract data cache so that the immutable data and the mutable data can be linked.

In some embodiments, the service platform 332 can add index data to the document to link the mutable and immutable data. The index data can be stored in both the smart contract data cache and the blockchain database to associate the mutable data with the immutable data.

In some examples, the index data can include a document ID. The document ID can be stored with mutable data of a document in the smart contract data cache. The document ID can also be stored with immutable data of the document on the blockchain in the blockchain database. In some examples, a document can be associated with multiple transactions. The index data can include transaction hashes of the transactions. A transaction hash can be stored with mutable data associated with a transaction in the smart contract cache. The transaction hash can also be stored with immutable data associated with the transaction on the blockchain. As such, both mutable data and immutable data can be identified from two storage locations when a document or a transaction associated with the document is queried.

In some embodiments, the trusted computing module 420 can be configured to provide a verified record of the steps/operations performed by the APP 402 in response to a request for the verified record associated with a document for custom clearance. The trusted computing module 420 can also provide a verified time stamp generated by a trusted timing module 422, a verified identity generated by a trusted identity module 424, and/or the computation result associated with each step/operation of the steps/operations performed by the APP 402.

In some embodiments, the encryption keys used to perform encryption, and generate digital signatures and proofs can be provided by the KMS 406 to the trusted computing module 420. In some embodiments, the KMS 406 can generate, store, and manage encryption keys. In some embodiments, the KMS 406 includes a secure application environment implemented using the TEE technology (e.g., Intel SGX). One or more software programs or libraries can be executed by the TEE.

In some embodiments, the trusted timing module 422 can be configured to generate time stamps based on national standard timing information (e.g., Greenwich Mean Time (GMT), UTC), or timing information obtained from a global positioning system. In some embodiments, the trusted timing module 422 can synchronize the time it maintains with the global time adopted by the blockchain nodes of the blockchain network 409 to ensure accuracy of the time stamps stored on the blockchain.

In some embodiments, the trusted timing module 422 can be configured to generate time stamps associated with different users using different standard times in different regions. For example, the trusted timing module 422 can generate time stamps associated with an e-business platform (EBP) using a first standard time recognized by an international delivery services provider, and to generate time stamps associated with a customer using a second standard time recognized by a domestic services provider associated with the customer, in which the EBP and the customer reside in different regions having different logistics systems.

The trusted identity module 424 can be configured to verify an identity of a service platform user based on one or more of unique IDs associated with the user. In some embodiments, the unique IDs can include at least one of the following: (i) a mobile phone number, (ii) a credit card number, (iii) a user ID associated with an online payment system, (iv) a user ID associated with an online shopping account, (v) a user ID associated with a music streaming or downloading account, (vi) a user ID associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information.

In some embodiments, the unique IDs can also include a decentralized identifier of the user. The decentralized identifier can include a universal resource locator (URL) scheme identifier, an identifier for a decentralized identifier method, and a decentralized identifier method-specific identifier. The decentralized identifier can point to a corresponding decentralized identifier document, which can include descriptive text in a preset format (e.g., JSON-LD) about the decentralized identifier and the owner of the decentralized identifier. The decentralized identifier can serve as a uniform resource identifier (URI) for locating the decentralized identifier document. The decentralized identifier document can include various properties such as contexts, decentralized identifier subject, public keys, authentication, authorization and delegation, service endpoints, creation, updates, proof, and extensibility. The decentralized identifier document can define or point to resources defining a plurality of operations that can be performed with respect to the decentralized identifier. In the examples described in this specification, the decentralized identifiers comply with the standards specified by the World Wide Web Consortium (W3C). However, other decentralized identifiers can also be used.

In some embodiments, the unique ID can be used to uniquely identify a taxpayer associated with an order. The unique ID can be embedded by the custom clearance agent platform or the custom clearance service platform into the custom clearance data associated with the taxpayer or the order, before the data is recorded on the blockchain. The custom or other law enforcement agency can trace custom clearance data associated with the taxpayer or the order based on recovering the embedded unique ID. As such, it can be ensured that an order is not fraudulently split among multiple buyers to cause the value of the order to be under a taxable threshold for the purpose of tax evasion. Additional information about unique IDs can be found in applications PCT/CN2019/095299, filed on Jul. 9, 2019, PCT/CN2019/103780, filed on Aug. 30, 2019, and CN201910963431.0, filed on Oct. 11, 2019. The above applications are hereby incorporated by reference.

In some embodiments, the trusted identity module 424 can be configured to verify different users residing in different regions having different tax systems by using different identifiers. For example, the trusted identity module 424 can be configured to verify the identity of a first user using at least one of a first set of identifiers recognized by a first tax system associated with the first user, and to verify the identity of a second user using at least one of a second set of identifiers recognized by a second tax system associated with the second user, in which the first and second users reside in different regions having different tax systems.

In some examples, the computing and connectivity component 408 can also include a router 426 that can route information processed by the one or more processors to a blockchain node 410 in the blockchain network 409 communicably coupled to the internal system 400. As discussed earlier, the blockchain node 410 can be a cloud node that can sign and/or verify messages, and communicate with other blockchain nodes. The blockchain node 410 can also be a consensus node that participates in a consensus procedure in the blockchain network 409. In some embodiments, the communications inside and between the internal system 400 and blockchain network 409 can be performed based on a secure communication protocol such as the hypertext transfer protocol secure (HTTPS) or transport layer security (TLS). For example, the functions performed by the blockchain node 410 can be defined in a smart contract, in which mining nodes of the blockchain network execute the functions in the smart contract and consensus nodes of the blockchain network verify the transactions.

Transactions added on a blockchain can be verified and agreed upon by blockchain nodes in the blockchain network 409 through consensus based on a consensus protocol. Example consensus protocols can include proof of work (PoW), proof of stake (PoS), and PBFT, etc. The blockchain nodes can be associated with customers, online or retail sales platforms, custom clearance data providers, international and domestic delivery service providers, customs, service platforms, etc. Once added, the data become immutable and can be trusted by the participants of the custom clearance processes.

The time, identity, and content carried by the custom clearance data recorded on the blockchain can be trusted. The blockchain enables the APP 402 that provides the custom clearance services to preserve verified records of information (e.g., who, what, and when) about events that occur during each of multiple steps or critical time points of the services. The records of information are preserved in ways that comply (or are more compliant compared to previous systems) with predetermined rules. For example, when the custom clearance is at a Chinese custom, the predetermined rule can be the Customs Law of the People's Republic of China.

Figure 5:
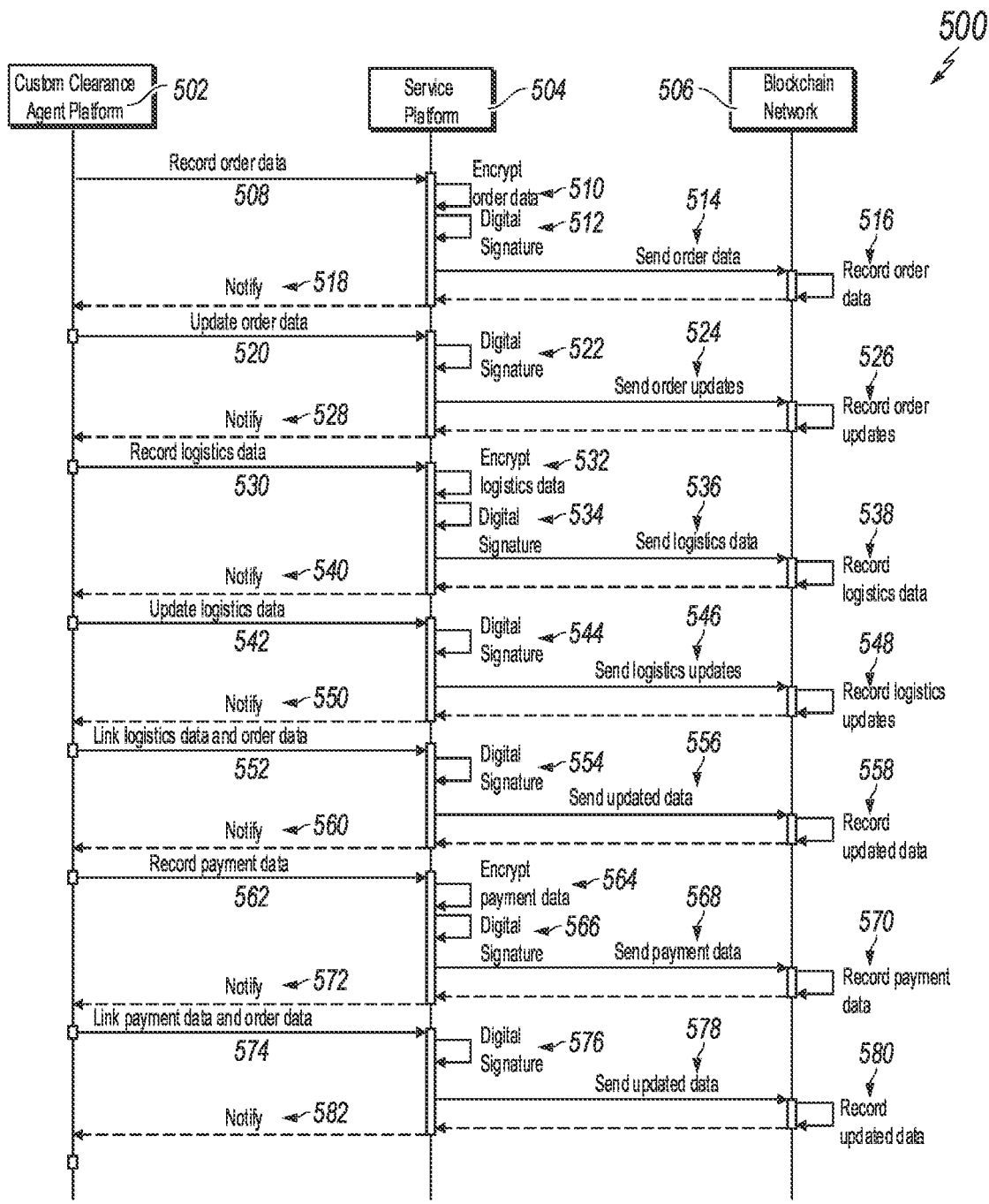
FIG. 5 is swim-lane diagram illustrating an example of a process of handling custom clearance data in accordance with embodiments of this specification.

FIG. 5 is swim-lane diagram illustrating an example of a process 500 of handling custom clearance data in accordance with embodiments of this specification. At a high-level, the participants of the process 500 include a local system of a custom clearance agent platform 502, a custom clearance service platform 504, and one or more blockchain nodes of a consortium blockchain network 506. The process 500 can be performed to record and update data and statuses related to custom clearance to a blockchain corresponding to the consortium blockchain network 506. As discussed in the description of FIG. 3, the custom clearance agent platform 502 can act as an agency for collecting and providing data related to custom clearance. The custom clearance service platform 504 can be a service platform as discussed in the description of FIG. 4. The custom clearance service platform 504 can provide APIs to the custom clearance agent platform 502 for accessing various blockchain-based services.

At 508, the custom clearance agent platform 502 can make an API call to invoke a service supported by the custom clearance service platform 504 to record order data associated with an order to the blockchain. The custom clearance agent platform 502 can receive order information from various resources, such as EBPs, online retailers, or brick and mortar (B&M) stores. In some embodiments, to ensure consistency of data to facilitate efficient computational processing, the order information can be converted by the custom clearance agent platform 502 to standard order parameters and coded into computer codes to be processed by the custom clearance service platform 504. In some examples, order parameters can generally include order subject parameters and merchandise parameters.

The following table, Table 2, lists some example codes of order subject parameters and their corresponding properties. More or fewer order subject parameters can be included in the order parameters than the parameters listed in the table below, in accordance with embodiments of this specification.

TABLE 2

| Order Subject Parameters | Description | Data Type | Data Length |
| --- | --- | --- | --- |
| orderNo | Order number | String | 64 |
| actualPaid | Total actual payment (including payment of merchandise, shipping, tax, etc.) | BigDecima l | (8.3) |
| orderCommitTime | Time of the order | String | 32 |
| ebpCode | EBP code | String | 64 |
| ebpName | EBP name | String | 128 |
| ebcCode | E-business corporation code | String | 64 |
| ebcName | E-business corporation name | String | 128 |
| serviceType | Service type | String | 8 |
| actualpaidForeign | Actual payment in local currency of merchandise | BigDecima l | (8.3) |
| allCargoTotalPrice | Total price of merchandise | BigDecima l | (8.3) |
| allCargoTotalTax | Total tax of merchandise | BigDecima l | (8.3) |
| buyerIdNumber | Buyer's ID number | String | 32 |
| buyerIdType | Buyer's ID type | String | 2 |
| buyerName | Buyer's name | String | 64 |
| buyerRegNo | Buyer's ID on the EBP | String | 64 |
| buyerTelephone | Buyer's phone number | String | 32 |
| cargoDescript | Merchandise description | String | 256 |
| currency | Currency type | String | 8 |
| freight | Shipping cost | BigDecima l | (8.3) |
| goodsNumber | Number of items purchased | Int | 4 |
| orderType | Electronic order type | String | 2 |
| merchantName | Merchant name | String | 128 |

The following table, Table 3, lists some example codes of merchant parameters and their corresponding properties. More or fewer merchandise parameters can be included in the order parameters than the parameters listed in the table below, in accordance with embodiments of this specification.

TABLE 3

| Merchandise Parameters | Description | Data Type | Data Length |
| --- | --- | --- | --- |
| barCode | Merchandise barcode | String | 32 |
| cargoTotalTax | Total tax | BigDecima l | (12.5) |
| country | Country of merchandise | String | 8 |

TABLE 3-continued

| Merchandise Parameters | Description | Data Type | Data Length |
|---|---|---|---|
| currency | Currency type | String | 8 |
| gnum | Merchandise number | String | 4 |
| itemDescript | Description of item | String | 128 |
| itemName | Name of item | String | 256 |
| hscode | hscode | String | 16 |
| codeTs | Tax code | String | 16 |
| price | Merchandise price | BigDecima 1 | (8.3) |
| foreignPayPrice | Payment price in foreign currency | BigDecima 1 | (8.3) |
| weight | weight | double | (5.3) |
| qty | Quantity of items | BigDecima 1 | (5.0) |
| totalPrice | Total price of merchandise | BigDecima 1 | (8.3) |
| spt01 | Reserved fields | String | 128 |

In some embodiments, data used for custom clearance can also include standard header parameters when provided to the custom clearance service platform 504 for processing. For example, the custom clearance agent platform 502 can also include header parameters when providing order parameters to the custom clearance service platform 504 for recording on the blockchain. The following table, Table 4, lists some example codes of header parameters and their properties. More or fewer header parameters can be provided to the custom clearance service platform 504 in accordance with embodiments of this specification.

TABLE 4

| Header Parameters | Description | Data Type | Data Length |
|---|---|---|---|
| patternType | Custom clearance type (e.g., personal item, overseas direct mail, bonded goods) | String | 8 |
| port | Port code (e.g., the port code for Shanghai is 2200) | String | 8 |
| custCode | Custom code | String | 8 |
| coName | Company name | String | 128 |
| coCode | Company code | String | 64 |

In some embodiments, the custom clearance agent platform 502 can further generate a document ID associated with the order to be stored to the blockchain. The document ID can be used to locate the header parameters and order parameters associated with the order. Accordingly, the order data is sent by the custom clearance agent platform 502 as computer codes that include the document ID, the header parameters, and the order parameters.

The header parameters are often considered not confidential and can be stored with the document ID to the blockchain without encryption. The order parameters contain information that can be considered private to the buyer and seller and can be encrypted before sending to the consortium blockchain network 506 for storage. After receiving the parameters, the custom clearance service platform 504 can encrypt the order parameters at 510. In some examples, the encryption of the order parameters can be performed by the computing and connectivity component 408 as discussed in the description of FIG. 4.

In some embodiments, the encryption keys can be derived based on a linear secret sharing scheme (LSSS) through negotiations among the participants of the custom clearance process. For example, the participants, such as the custom clearance agent platform 502, the custom clearance service platform 504, and the customs authority can be the participants involved in the encryption key negotiations. Additional details of the encryption key negotiations are described in, e.g., Chinese Application No. 201911187078.8, filed on Nov. 27, 2019, the content of which is incorporated herein by reference. Such encryption key derivation technologies enhance security of the encryption keys and reduce the possibilities of deciphering by a third party.

In some embodiments, the custom clearance service platform 504 can also generate ZKPs associated with the parameters. The ZKPs can be provided to the blockchain nodes of the consortium blockchain network 506 together with the encrypted parameters, such that the blockchain nodes can verify the legitimacy of the order data without knowing its content. After verifying that the order data is legitimate, the blockchain nodes of the consortium blockchain network 506 can perform consensus to record the parameters on the blockchain.

In some embodiments, the ZKPs can include proof under a homomorphic encryption scheme, range proof, and/or zero test. The homomorphic encryption scheme can be used to separately encrypt the total actual payment (e.g., "actualPaid" in Table 2), the total merchandise price (e.g., "allCargoTotalPrice"), the total tax (e.g., "allCargoTotalTax"), and the shipping cost (e.g., "freight"). After performing the homomorphic encryption scheme, the encrypted parameters cannot be revealed without decryption. However, based on the homomorphic nature of the encryption scheme, it can be verified that the total actual payment equals the summation of the total merchandise price, the total tax, and the shipping cost, if this is true for their encrypted counterparts. Additional details of the homomorphic encryption are described in, e.g., PCT/CN2018/114344, PCT/CN2018/114421, and PCT/CN2018/114420 filed on Apr. 22, 2019, the contents of which are incorporated by reference.

In some embodiments, a range proof can be used to prove that an amount is within a range without revealing the actual amount. In some examples, a range proof can be provided by the custom clearance service platform 504 to show that the actual payment price or other parameters are within a reasonable range. For example, a reasonable range can be set as 0 to $2^{10}$ for the actual payment price. As another example, a range proof can be set for the total merchandise price to verify that the value of the order meets a taxable amount. In some examples, the range proof can be provided to show that the total merchandise price is less than or equal to the total actual payment. The zero test can be used to prove that an amount is zero. For example, a zero test can be used to determine that the total actual payment is non-zero such that custom clearance is warranted.

At 512, the custom clearance service platform 504 can add its digital signature to the order data. The digital signature can be generated by the custom clearance service platform's 504 private key for the blockchain nodes in the consortium blockchain network 506 to verify the identity of the sender.

At 514, the custom clearance service platform 504 can send the digitally signed order data to the consortium blockchain network 506, e.g., by calling a smart contract on the blockchain associated with the consortium blockchain network 506. At 516, the blockchain nodes of the consortium blockchain network 506 can perform consensus to record the order data on the blockchain. In some embodiments, the consensus is performed after the blockchain nodes pre-verify the legitimacy of the order data based on the ZKPs.

As discussed in the description of FIG. 3, as the custom clearance data accumulates, the volume of the data can be high, which can significantly raise the storage cost. In some embodiments, the custom clearance data can be stored either in a smart contract data cache or a blockchain database. The smart contract data cache can be a storage medium with faster read and write speeds but higher storage cost, such as hardware caches, random access memory (RAM), or a solid state drive. The blockchain database can be a storage medium with slower read and write speeds and a lower storage cost, such as a hard disc drive. The smart contract data cache can be used to store mutable data used for executing a smart contract, while the blockchain database can be used to store incremental, permanent blockchain data. As such, a better balance between processing efficiency and storage cost of the blockchain data can be achieved.

In some embodiments, types of data to be stored in the smart contract data cache can include data that can be updated, such as the document type, document ID, document status, mapping data, encryption keys, or other data that are modifiable. For example, parameters such as order number (e.g., "orderNo" in Table 2), owner ID (e.g., "ownerID"), port code (e.g., "port" in Table 4), custom code (e.g., "custCode"), custom clearance type (e.g., "patternType") can be stored in the smart contract data cache.

The types of data to be stored in the blockchain database can include, e.g., order ID, encrypted data and their corresponding storage location in the smart contract, or other immutable data. For example, the order subject parameters and merchandise parameters can be stored in the blockchain database. The smart contract codes, input, output, and execution logs can also be stored on the blockchain in the blockchain database.

Moreover, data stored in the blockchain database can be encrypted to protect privacy of the data owners. As discussed in the description of FIG. 3, the encryption key used to encrypt the documents can be a symmetric key. A data owner can provide access permission of the plaintext data to a user by issuing an encrypted version of the symmetric key using the user's public key. Assuming that encrypted data is stored in the blockchain database, a hash value of the encrypted data can be generated and stored with the encrypted version of the symmetric key to the smart contract data cache.

To query the data, an authorized user can search the smart contract data cache to obtain the hash value and the encrypted version of the symmetric key. The user can use its private key to decrypt the encrypted version of the symmetric key. If the symmetric key is successfully decrypted, the user can determine that she has access permission to the plaintext data. The user can then use the hash value to locate the encrypted data from the blockchain storage, and use the symmetric key to decrypt the encrypted data.

In some embodiments, one or more blockchain nodes of the consortium blockchain network 506 can notify the custom clearance service platform 504 that the order data has been recorded on the blockchain. The custom clearance service platform 504 can then forward the notification to the custom clearance agent platform 502 at 518. In some examples, the custom clearance service platform 504 can also forward the notification to the customs authority to notify that the order data is ready to be retrieved from the blockchain when needed.

At 520, the custom clearance agent platform 502 can make an API call to update the order data. The API call can be in the form of a request, which includes the document ID of the data to be updated. The custom clearance service platform 504 can invoke a smart contract on the blockchain to perform the update operations. Generally, the document to be updated can be located based on its document ID. The update operations can include updating states of the document, adding additional parameters to the document, associating multiple documents with the same document ID, and associating multiple transactions associated with the same document, etc. In some embodiments, document states, such as order states and logistics states, can be accumulated and updated in batch to improve efficiency. Examples of order states and logistics states are described in the description of FIG. 7.

After the update operations are performed, the custom clearance service platform 504 can add its digital signature at 522 to prove its authenticity and provide it to the consortium blockchain network 506 for storage at 524. At 526, the blockchain nodes of the consortium blockchain network 506 perform consensus to record the updates to the blockchain. Because the updates are performed on data that are modifiable, they can be stored in the smart contract on the blockchain.

In some embodiments, one or more blockchain nodes of the consortium blockchain network 506 can notify the custom clearance service platform 504 that the updates have been recorded on the blockchain. The custom clearance service platform 504 can then forward the notification to the custom clearance agent platform 502 at 528. In some examples, the custom clearance service platform 504 can also forward the notification to the customs authority to notify that new updates associated with the order are recorded and are ready to be retrieved from the blockchain for review when needed.

At 530, the custom clearance agent platform 502 can make an API call to invoke a service from the custom clearance service platform 504 to record logistics data associated with shipment of the order to the blockchain. The custom clearance agent platform 502 can receive logistics information from delivery services providers or freight services providers. Similar to the order information, the logistics information can be converted to standard logistics parameters to ensure data consistency and facilitate computational processing.

The following table, Table 5, lists some example codes of logistics parameters and their corresponding properties. More or fewer logistics parameters can be provided to the custom clearance service platform 504 in accordance with embodiments of this specification.

TABLE 5

| Logistics Parameters | Description | Data Type | Data Length |
| --- | --- | --- | --- |
| logisticsNo | Overseas segment tracking number | String | 64 |
| logisticsName | Overseas segment delivery services company name | String | 128 |
| domesticTrackNo | Domestic segment tracking number | String | 64 |
| domesticTrackName | Domestic segment delivery services company name | String | 128 |
| customDeclCo | Company for custom declaration | String | 128 |

TABLE 5-continued

| Logistics Parameters | Description | Data Type | Data Length |
|---|---|---|---|
| waybillNo | Waybill Number | String | 64 |
| packageWeight | Package Weight | BigDecima 1 | (5.3) |
| recZip | Delivery zip code | String | 32 |
| receiverAddress | Delivery address | String | 256 |
| receiverCity | Delivery city | String | 64 |
| receiverCountry | Delivery country | String | 64 |
| receiverCounty | Delivery county | String | 64 |
| receiverIdNumber | Recipient ID | String | 32 |
| receiverIdType | Type of ID | String | 2 |
| receiverName | Recipient name | String | 64 |
| receiverTel | Recipient phone number | String | 32 |
| receiverProvince | Recipient province | String | 64 |
| senderCompanyName | Sender's company name | String | 128 |
| senderAddr | Sender address | String | 256 |
| senderCity | Sender city | String | 64 |
| senderCountry | Sender country | String | 64 |
| senderProvince | Sender province | String | 64 |
| senderZip | Sender zip code | String | 32 |
| senderTel | Sender phone number | String | 32 |
| senderName | Sender name | String | 64 |

Similar to the order data, the logistics data used for custom clearance can also include standard header parameters and a document TD when provided to the custom clearance service platform 504 for processing. For example, the custom clearance agent platform 502 can also include header parameters when providing logistics parameters to the custom clearance service platform 504 for recording on the blockchain. Accordingly, the logistics data is sent by the custom clearance agent platform 502 as computer codes that include the document ID, the header parameters, and the logistics parameters.

The logistics parameters contain information that can be considered private to the buyer and seller. The parameters can be encrypted before sending to the consortium blockchain network 506 for storage. After receiving the parameters, the custom clearance service platform 504 can encrypt the logistics parameters at 532. In some examples, the encryption of the logistics parameters can be performed by the computing and connectivity component 408*b* as discussed in the description of FIG. 4.

At 534, the custom clearance service platform 504 can add its digital signature to the logistics data. The digital signature can be generated by the custom clearance service platform's 504 private key, in which the digital signature can be used by the blockchain nodes in the consortium blockchain network 506 to verify the identity of the sender. At 536, the custom clearance service platform 504 can send the digitally signed logistics data to the consortium blockchain network 506, e.g., by calling a smart contract on the blockchain associated with the consortium blockchain network 506. At 538, the blockchain nodes of the consortium blockchain network 506 can perform consensus to record the logistics data on the blockchain.

Similar to the order data, in some examples, header parameters such as port code (e.g., "port"), custom code (e.g., "custCode"), custom clearance type (e.g., "patternType") can be stored in the smart contract data cache part of the blockchain. In some examples, logistics parameters that are encrypted can be stored in the blockchain database.

In some embodiments, one or more blockchain nodes of the consortium blockchain network 506 can notify the custom clearance service platform 504 that the logistics data has been recorded on the blockchain. The custom clearance service platform 504 can then forward the notification to the custom clearance agent platform 502 at 540. In some examples, the custom clearance service platform 504 can also forward the notification to the customs authority to notify that the logistics data is ready to be retrieved from the blockchain for review when needed.

At 542, the custom clearance agent platform 502 can make an API call to update the logistics data. The API call can be in the form of a request, which includes the document ID of the data to be updated. The custom clearance service platform 504 can invoke a smart contract on the blockchain to perform the update operations. After the update operations are performed, the custom clearance service platform 504 can add its digital signature at 544 to prove the authenticity of the updated logistics data and provide the updated logistics data to the consortium blockchain network 506 for storage at 546. At 548, the blockchain nodes of the consortium blockchain network 506 perform consensus to record the updated logistics data to the smart contract on the blockchain.

In some embodiments, one or more blockchain nodes of the consortium blockchain network 506 can notify the custom clearance service platform 504 that the updated logistics data have been recorded on the blockchain. The custom clearance service platform 504 can then forward the notification to the custom clearance agent platform 502 at 550. In some examples, the custom clearance service platform 504 can also forward the notification to the customs authority to notify that new updates associated with the logistics data are recorded and are ready to be retrieved from the blockchain for review when needed.

At 552, the custom clearance agent platform 502 can make an API call to link the logistics data with the order data. In some embodiments, the request for linking logistics data and order data can be initiated by a user of the custom clearance service platform 504, such as an EBP, a logistics company, the custom clearance agent platform 502, or a customer. For example, an order can include a plurality of items corresponding to a plurality of logistics transactions (e.g., shipments) and payment transactions (e.g., separate payments for different shipments). The user can send the request to link the order document to all the related logistics transactions associated with the order.

In some examples, the request can include an order ID (e.g., order number) of an order document and one or more logistics transaction IDs of one or more logistics documents associated with the order. In response to receiving the request, the custom clearance service platform 504 can invoke a smart contract to store the order ID and the one or more logistics transaction IDs under a data structure corresponding to the order in the smart contract data cache. In some embodiments, a list of logistics transaction IDs associated with the order can be stored under the data structure for storing the order data. In some embodiments, for each logistics transaction, the smart contract can also be invoked to store the order ID in the logistics data corresponding to the logistics transaction stored in the smart contract data cache. Examples of a data structure of order data and logistics data stored in the smart contract data cache are provided in the description of FIG. 6. As such, when the order document or logistics transactions are searched through its corresponding document ID later on, the order ID and its corresponding logistics transaction ID(s) can be found under the same data structure. The document IDs can then be used to locate the corresponding documents from the blockchain stored in the blockchain database.

In some examples, the order ID and its corresponding logistics transaction ID(s) can be referred to as "linkage information" that links the corresponding order document and logistics document(s). The linkage information can be information used for linking other document types in accordance with this specification.

In some examples, the request can include the document ID of the order and one or more logistics documents associated with the order. In response to receiving the request for linking logistics data and order data, the custom clearance service platform 504 can invoke the smart contract to store the hash values of the logistics documents under the data structure corresponding to the order in the smart contract data cache. As such, when the order document is searched through its document ID later on, the hash values of the logistics documents associated with the order can be found under the same data structure. The hash values of the logistics documents can then be used to locate the corresponding logistics documents from the blockchain stored in the blockchain database.

After the documents are linked, the custom clearance service platform 504 can add its digital signature at 554 to the updated order data and/or logistics data, and provide it to the consortium blockchain network 506 for storage at 556. At 558, the blockchain nodes of the consortium blockchain network 506 perform consensus to record the updates to the smart contract on the blockchain.

In some embodiments, one or more blockchain nodes of the consortium blockchain network 506 can notify the custom clearance service platform 504 that the logistics data and the order data recorded on the blockchain are linked. The custom clearance service platform 504 can then forward the notification to the custom clearance agent platform 502 at 560.

At 562, the custom clearance agent platform 502 can make an API call to invoke a service from the custom clearance service platform 504 to record payment data associated with payment of the order to the blockchain. The custom clearance agent platform 502 can receive payment information from the EBP, the customer, or a bank where the payment is made from. Similar to the order information and logistics information, the payment information can be converted to standard payment parameters to ensure data consistency and facilitate processing by the computing systems.

The following table, Table 6, lists some example codes of payment parameters and their corresponding properties. More or fewer logistics parameters can be provided to the custom clearance service platform 504 in accordance with embodiments of this specification.

TABLE 6

| Payment Parameters | Description | Data Type | Data Length |
|---|---|---|---|
| payTransactionID | Payment transaction ID | String | 64 |
| merchantOrderNo | Order number | String | 64 |
| businessId | Business ID | String | 64 |
| totalPayment | Total actual payment | BigDecima 1 | (8.3) |
| payMethod | Payment method | String | 16 |
| payMerchantName | Payee name | String | 128 |
| payMerchantCode | Payee business code | String | 64 |
| payTime | Time of payment | String | 32 |
| Currency | Payment currency | String | 8 |
| payBuyerName | Payor name | String | 64 |
| payBuyerIdNu | Payor's ID | String | 32 |
| payBuyerTel | Payor's phone number | String | 32 |

Similar to the order data and the logistics data, the payment data used for custom clearance can also include standard header parameters and a document ID when provided to the custom clearance service platform 504 for processing. For example, the custom clearance agent platform 502 can also include header parameters when providing payment parameters to the custom clearance service platform 504 for recording on the blockchain. Accordingly, the payment data is sent by the custom clearance agent platform 502 as computer codes that include the document ID, the header parameters, and the payment parameters.

The payment parameters contain information that can be considered private to the buyer and seller and can be encrypted before the payment parameters are sent to the consortium blockchain network 506 for storage. After receiving the payment parameters, the custom clearance service platform 504 can encrypt the payment parameters at 564. In some examples, the encryption of the payment parameters can be performed by the computing and connectivity component 408 as discussed in the description of FIG. 4.

In some embodiments, the custom clearance service platform 504 can also generate ZKPs associated with the payment parameters. The ZKPs can be provided to the blockchain nodes of the consortium blockchain network 506 together with the encrypted payment parameters, such that the blockchain nodes can verify the legitimacy of the payment data without knowing its content. After verifying that the payment data is legitimate, the blockchain nodes of the consortium blockchain network 506 can perform consensus to record the payment parameters on the blockchain.

At 566, the custom clearance service platform 504 can add its digital signature to the payment data. The digital signature can be generated by the custom clearance service platform's 504 private key to enable the blockchain nodes in the consortium blockchain network 506 to verify the identity of the sender.

At 568, the custom clearance service platform 504 can send the digitally signed payment data to the consortium blockchain network 506, e.g., by calling a smart contract on the blockchain associated with the consortium blockchain network 506. At 570, the blockchain nodes of the consortium blockchain network 506 can perform consensus to record the payment data on the blockchain.

Similar to the order data and the logistics data, in some examples, header parameters such as port code ("port"), custom code ("custCode"), custom clearance type ("patternType") can be stored in the smart contract data cache part of the blockchain. In some examples, payment parameters that are encrypted can be stored in the blockchain database.

In some embodiments, one or more blockchain nodes of the consortium blockchain network 506 can notify the custom clearance service platform 504 that the payment data has been recorded on the blockchain. The custom clearance service platform 504 can then forward the notification to the custom clearance agent platform 502 at 572. In some examples, the custom clearance service platform 504 can also forward the notification to the customs authority to notify that the payment data is ready to be retrieved from the blockchain for review when needed.

At 574, the custom clearance agent platform 502 can make an API call to link the payment data with the order data and/or the logistics data. In some embodiments, the request for linking payment data and order data can be initiated by a user of the service platform 506, such as an EBP, a logistics company, the custom clearance agent platform 502 or a customer. For example, an order can include a plurality of items corresponding to a plurality of payment transactions and a plurality of logistics transactions. The user can send the request to link the order document to the related payment transactions associated with the order.

In some examples, the request for linking payment data and order data can include an order ID (e.g., order number) of an order document and one or more payment transaction IDs of one or more payment documents associated with the order. In response to receiving the request, the custom clearance service platform 504 can invoke a smart contract to store the order ID and the one or more payment transaction IDs under a data structure corresponding to the order in the smart contract data cache. In some embodiments, for each payment transaction, the smart contract can also be invoked to store the order ID in the payment data corresponding to the payment transaction stored in the smart contract data cache. Examples of a data structure of order data and payment data stored in the smart contract data cache are provided in the description of FIG. 6. As such, when the order document or a payment transaction is searched through its corresponding document ID later on, the order ID and its corresponding payment transaction ID(s) can be found under the same data structure. The document IDs can then be used to locate the corresponding documents from the blockchain stored in the blockchain database.

In some examples, the request for linking payment data and order data can include the document ID of the order and one or more payment documents associated with the order. In response to receiving the request, the custom clearance service platform 504 can invoke the smart contract to store the hash values of the payment documents under the data structure corresponding to the order in the smart contract data cache. As such, when the order document is searched through its document ID later on, the hash values of the payment documents associated with the order can be found under the same data structure. The hash values of the payment documents can then be used to locate the corresponding payment documents from the blockchain stored in the blockchain database.

After the documents are linked, the custom clearance service platform 504 can add its digital signature at 576 to the updated order data and/or payment data, and provide them to the consortium blockchain network 506 for storage at 578. At 580, the blockchain nodes of the consortium blockchain network 506 can perform consensus to record the updated order data and/or payment data to the smart contract on the blockchain.

In some embodiments, one or more blockchain nodes of the consortium blockchain network 506 can notify the custom clearance service platform 504 that the logistics data and the order data recorded on the blockchain are linked. The custom clearance service platform 504 can then forward the notification to the custom clearance agent platform 502 at 582.

In some embodiments, in the process 500 of FIG. 5, before the custom clearance agent platform 502 can make an API call to request recording or updating order data, logistics data, or payment data, or to request linking of two or more types of custom clearance related data, the custom clearance service platform 504 determines whether the custom clearance agent platform 502 is a member who is authorized to perform those actions. For example, a smart contract on the blockchain can maintain a data structure (e.g., database) that stores information about authorized members, and the actions that each member is authorized to perform. For example, the data structure can include a first list of members who are authorized to record import custom clearance data for a new import order. For each existing import order, the data structure includes a second list of members who are authorized to perform actions on documents associated with the import order, and information about what types of actions the members are authorized to perform.

The custom clearance service platform 504 provides an identifier of the custom clearance agent platform 502 to the smart contract and requests the smart contract to determine whether the custom clearance agent platform 502 is authorized to perform the requested actions. If the smart contract confirms that the custom clearance agent platform 502 is authorized to perform the requested actions, the custom clearance service platform 504 performs the steps in the process 500. If the smart contract determines that the custom clearance agent platform 502 is not authorized to perform the requested actions, the custom clearance service platform 504 denies the request from the custom clearance agent platform 502.

In some embodiments, the custom clearance agent platform 502 collects information from parties that are involved in the custom clearance process, in which the parties may include, e.g., the importer who wishes to import the merchandise specified in the import order, the payee bank, the payor bank, the delivery service company for the overseas segment, and the delivery service company for the domestic segment. The custom clearance agent platform 502 interacts with the custom clearance service platform 504 and sends requests for recording and/or updating order data, logistics data, and/or payment data, and/or linking two or more types of data. In this example, the importer, the banks, and the delivery service companies do not interact with the custom clearance service platform 504.

In some embodiments, the custom clearance agent platform 502 collects information from parties that are involved in the custom clearance process, interacts with the custom clearance service platform 504, and sends requests for recording and/or updating order data, logistics data, and/or payment data, and/or linking two or more types of data. The importer, the banks, and the delivery service companies can also interact with the custom clearance service platform 504 directly and send requests for recording and/or updating order data, logistics data, and/or payment data, and/or linking two or more types of data. In this example, each of the parties (other than the custom clearance agent platform 502) may have authorization to perform limited actions, such as modifying certain parameters but not other parameters.

For example, the delivery service company for the domestic segment is authorized to record or update information related to the delivery for the domestic segment, and is not authorized to record or update information related to the delivery for the overseas segment. The delivery service companies are not authorized to record or update payment data. The banks are authorized to record or update parameters related to financial information, and are not authorized to record or update parameters related to delivery of merchandise.

In some embodiments, a designated party, such as an administrator of the custom clearance service platform 504, is responsible for adding a member to the list of members authorized to perform actions on data related to the import order. For example, the administrator can send a request to the custom clearance service platform 504 to request that a new member be added to the list of authorized members. The administrator can provide information about the new member, such as an identifier of the member, a type of the member, and a name of the member, to the custom clearance service platform 504.

The custom clearance service platform 504 invokes a smart contract on the blockchain (that stores the data related to the import order) to request that a new member be added to the listed of authorized members, and indicate the types of actions that the new member is authorized to perform. The custom clearance service platform 504 provides information about the new member, such as an identifier of the member, a type of the member, and a name of the member, to the smart contract. The smart contract updates the data structure to add the new member to the list of members who are authorized to perform actions on the data related to the import order. The smart contract sends a message to the custom clearance service platform 504 to indicate that the new member has been added to the list of authorized members. The custom clearance service platform 504 then sends a message to the administrator to confirm that the new member has been added to the list of authorized members. The custom clearance service platform 504 can provide an API (e.g., AddMember) to enable the administrator to add a new member.

The custom clearance service platform 504 can enable the designated party to update information about an existing member, including, e.g., updating contact information of the member, updating the actions that the member is authorized to perform, or removing the member from the list of authorized members. For example, the custom clearance service platform 504 can provides an API (e.g., UpdateMember<memberID>) to enable the administrator to update information about a member that can be identified by the member's identifier (e.g., memberID). Upon receiving the request from the administrator about updating information of a member, the custom clearance service platform 504 invokes the smart contract on the blockchain to request that information about the member be updated. The smart contract updates the data structure to update the information about the member. The smart contract sends a message to the custom clearance service platform 504 to indicate that the information about the member has been updated. The custom clearance service platform 504 then sends a message to the administrator to confirm that the information about the member has been updated.

The custom clearance service platform 504 can provide an API (e.g., QueryMember<memberID>) to enable the administrator to query or look up the import order(s) for which a specified member is an authorized member that can access data associated with the import order(s).

The custom clearance service platform 504 can provide an API (e.g., QueryMember<orderID>) to enable the administrator to query or look up members who are authorized members that are authorized to perform actions on documents associated with a specified import order.

Figure 6:
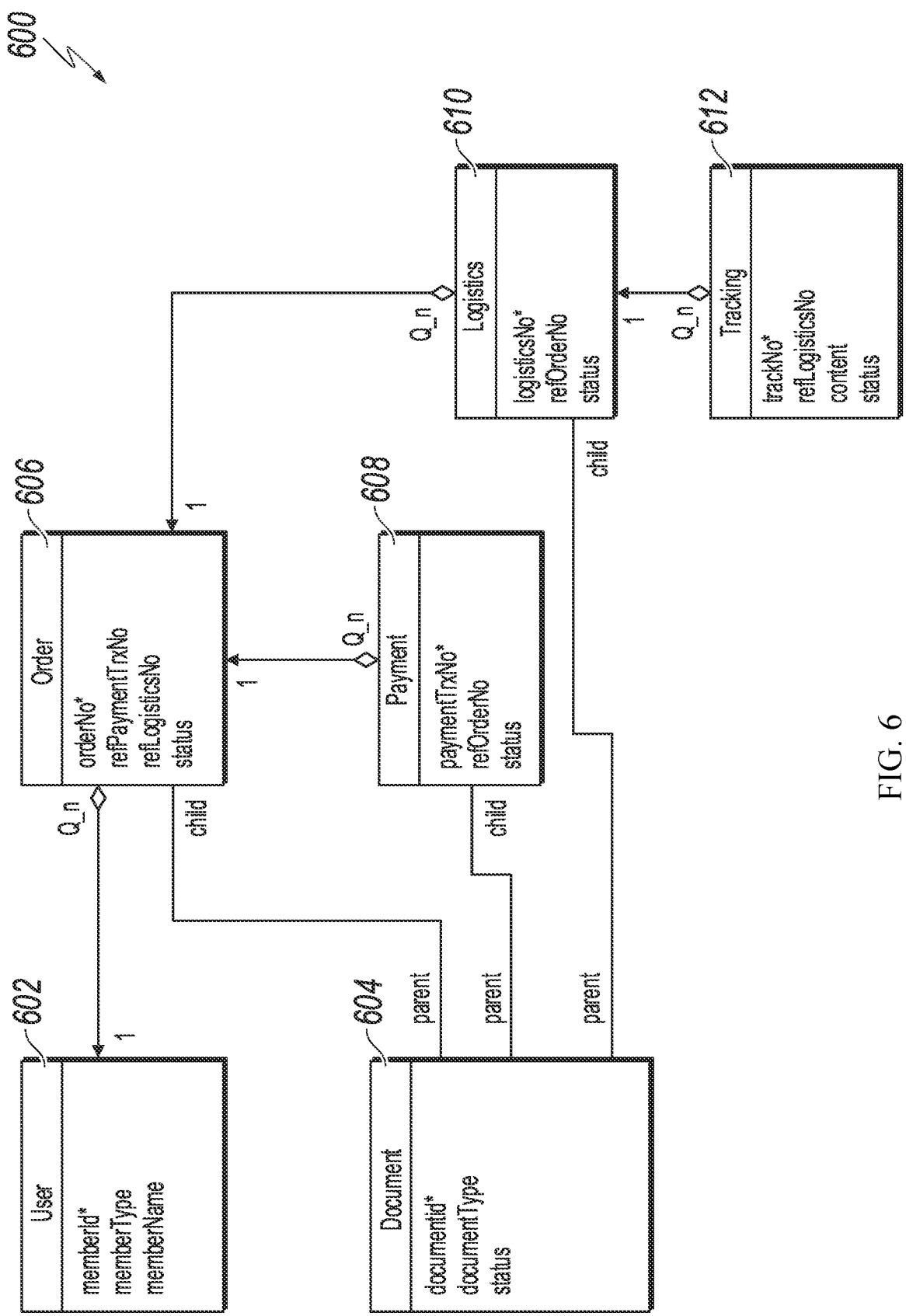
FIG. 6 is a relational diagram illustrating an example of relationships between sub-models of a computer-implemented model in accordance with embodiments of this specification.

FIG. 6 is a relational diagram illustrating an example of relationships between sub-models of a computer-implemented model 600 in accordance with embodiments of this specification. The computer-implemented model 600 can be used by one or more software applications of the service platform, such as the custom clearance service platform 504 discussed in the description of FIGS. 3-5, for processing custom clearance data. The processed custom clearance data is to be recorded on the blockchain to facilitate the custom clearance process. At a high-level, the model 600 can have sub-models including a user sub-model 602, a document sub-model 604, an order data sub-model 606, a payment data sub-model 608, a logistics data sub-model 610, and a tracking data sub-model 612.

The user sub-model 602 can be used to model properties of users allowable to access the services provided by the service platform as discussed in the description of FIG. 3. Each user can correspond to one or more order documents modeled under the order sub-model 606. Each order document can include a unique order number (e.g., "orderNo*"), one or more references to link the order document to one or more payment documents (e.g., "refPaymentTrxNo"), one or more references to link the order document to one or more logistics documents (e.g., "refLogisticsNo"), and an order state (e.g., "status"). For example, the refPaymentTrxNo reference can include a list of payment transaction IDs of payment transactions associated with the order document. The refLogisticsNo reference can include a list of logistics documents associated with the order document. As such, all payment and logistics transactions can be found when the order is searched for.

Each payment document can be modeled under the payment sub-model 608. The payment document can include a payment document number (e.g., "paymentTrxNo*"), a reference to link back the payment document to the order document (e.g., "refOrderNo"), and a payment state (e.g., "status").

Each logistics document can be modeled under the logistics sub-model 610. The logistics document can include a logistics document number (e.g., "logisticsNo*"), a reference to link back the logistics document to the order document (e.g., "refOrderNo"), and a logistics state (e.g., "status"). In some examples, the logistics document can also be linked to one or more tracking records modeled under the tracking sub-model 612. Each tracking record can include a tracking number (e.g., "trackNo*") of one or more items in the order, a reference that links the tracking record back to the logistics document, tracking content (e.g., "content"), and a tracking status (e.g., "status"). In some examples, the references such as refPaymentTrxNo, refLogisticsNo, and refOrderNo, can be referred to as linkage information that links the corresponding documents.

In some embodiments, the order document, logistics document, and payment document can be child documents generated based on a parent document modeled under the document sub-model 604. In some embodiments, the document sub-model 604 can be invoked to generate data to link the order document, logistics document, and payment document together. Properties of the document sub-model 604 can include document ID (e.g., "documentId*"), document type (e.g., "documentType") and document states (e.g., "status").

In FIG. 6, the user sub-model 602 is used to model properties of users who are given access the services provided by the service platform as discussed in the description of FIG. 3. For example, the smart contract can be configured to determine whether a user is an authorized member based on a comparison of the characteristics of the user and the properties included in the model. For example, the user model 602 may indicate that the authorized members have the member type "financial institution." In this example, a user that has the member type other than "financial institution," such as "delivery services company," is not an authorized member.

There can be more than one custom clearance agent platform. For example, a first custom clearance agent platform processes documents associated with a first import order, and a second custom clearance agent platform processes documents associated with a second import order. The first custom clearance agent platform can be an authorized member for the first import order, and is not an authorized member for the second import order. The second custom clearance agent platform can be an authorized member for the second import order, and is not an authorized member for the first import order.

The custom clearance service platform 504 confirms whether the user sending a request to record or update order data, logistics data, and/or payment data, or to link multiple pieces of data, is an authorized user. This reduces the likelihood of tampering of the data associated with the import order, enhancing the integrity of the data associated with the import order and stored on the blockchain.

Figure 7:
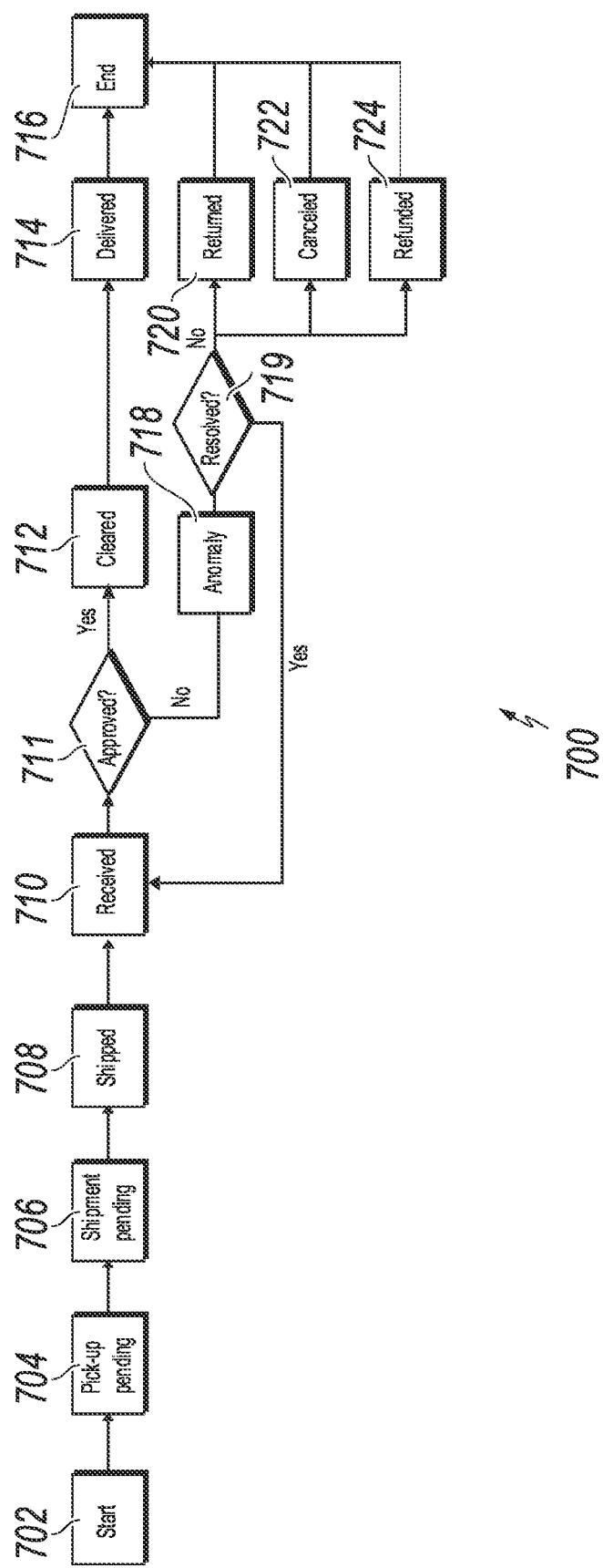
FIG. 7 is a graph illustrating an example of a progression of states in accordance with embodiments of this specification.

FIG. 7 is a graph illustrating an example of a progression of states 700 in accordance with embodiments of this specification. As discussed earlier, the states of the order data, logistics data, and payment data associated with a lifecycle of an order can progress over time. The state information is recorded on the blockchain and is available to be retrieved by the customs authority to review for custom clearance. To ensure consistency of the state data recorded on the blockchain, the custom clearance service platform 504 can generate the state data according to a state machine. The state machine can be shown as a graph depicted in FIG. 7. The state machine is configured to progress from one state to the next state in response to an event.

The progression of states 700 can be at a start state at 702. At 704, in response to an order pick-up event, the state of the order data and/or logistics data progresses to a pick-up pending state. At 706, in response to an event that a delivery services provider receives a shipment order, the state of the order data and/or logistics data progresses from the pick-up pending state to a shipment pending state. At 708, in response to an order shipped event, the state of the order data and/or logistics data progresses to an order shipped state. At 710, in response to an event that the order document, logistics document, or the payment document is received at the custom clearance agent platform 502, the custom clearance service platform 504, or the customs authority, the state of the data progresses to a document received state.

At 711, a decision can be made regarding whether the document received satisfies the requirements for clearing customs. If the document received satisfies the requirements for clearing customs, a custom cleared state can be assigned at 712. The state of the order data, the logistics data, and/or the payment data can be updated to a delivered state at 714 in response to an event that the order is delivered to the customer. Afterwards, the progression of states 700 can end at 716. Otherwise, an anomaly state can be assigned to the order data, the logistics data, and/or the payment data at 718. At 719, it can be determined whether the anomaly can be resolved. If anomaly can be resolved, the data can be resubmitted, and the state can be updated to a received state again awaiting to be decided whether the resubmitted data satisfies the requirements for clearing customs. Otherwise, the order can be returned 720, canceled 722, or refunded 724, and the progression of states 700 ends at 716.

Figure 8:
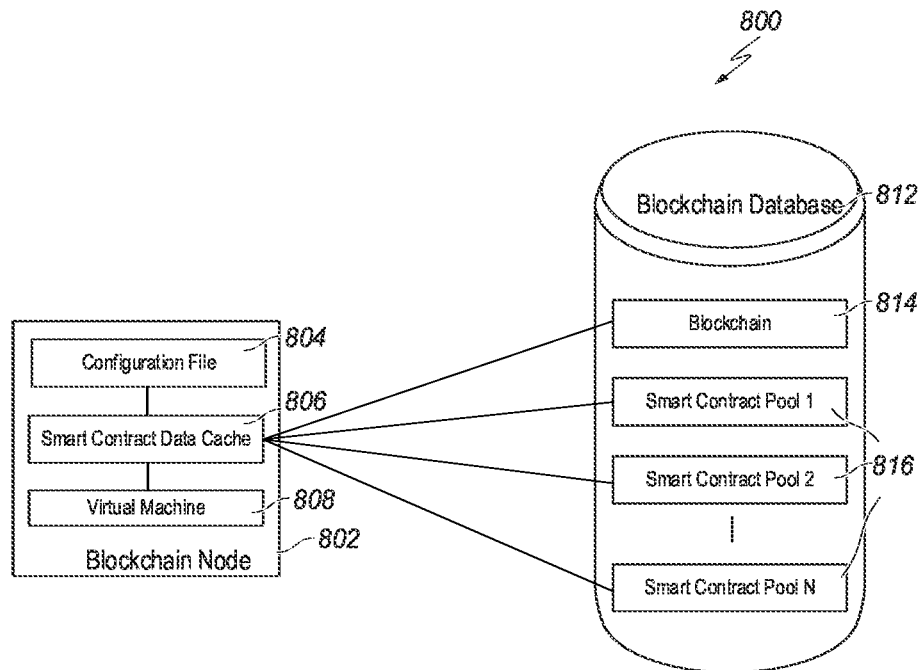
FIG. 8 is a diagram illustrating an example of storing custom clearance data in smart contract pools in accordance with embodiments of this specification.

FIG. 8 is a diagram illustrating an example 800 of storing custom clearance data in smart contract pools in accordance with embodiments of this specification. At a high-level, storage of the custom clearance data can be shared by a smart contract data cache 806 included in a blockchain node 802 and a blockchain database 812. The blockchain node 802 can be any node of a blockchain network 409 as discussed in the description of FIG. 4, such as a blockchain node owned by the custom clearance service platform 504.

The blockchain node 802 can invoke a virtual machine 808 to execute smart contracts. In some embodiments, the virtual machine 808 can be deployed in a trusted computing environment such as a TEE. In some embodiments, the virtual machine 808 can be configured to perform smart contract operations by executing instructions of a smart contract programming language. In some examples, the virtual machine 808 can access resources external of the TEE during execution of the operation, such as, for example, external servers, a blockchain, a database, or other resources indicated by the operation. In some embodiments, accessing external resources can be restricted or denied, such that the entirety of the execution of the operations depends only on data stored in the TEE (such as the smart contract states). This type of restriction can further reduce the possibility of tampering with the execution of the operations.

The smart contract operations can include an execution state for the smart contract associated with the request contract operation (e.g., add document, update document states, etc.). During execution of a smart contract, multiple blockchain nodes of a blockchain network can execute each instruction of the smart contract individually, and produce a result indicating an execution state of the smart contract after the completion of executing the instructions. The execution state can include data associated with the smart contract. Each executed instruction of the contract can change the contents of the data (e.g., to store a value to be used by a later instruction in the smart contract).

After execution of an instruction of the smart contract, the nodes of the blockchain network can reach a consensus on the new execution state after execution of the instruction. This consensus process is performed for each instruction executed in a smart contract, leading to a consensus as to the execution path of the smart contract. The execution path can be recorded as a corresponding smart contract execution event log recorded on a blockchain 814 in the blockchain database 812. Finally, the final result (i.e., output) of the execution is also recorded on the blockchain 814.

The smart contract data cache 806 can be used to store mutable data managed by the smart contracts. In general, the mutable data can include document type, document ID, document state, modifiable data of the document content, transaction hash that associates document data stored in the smart contract data cache 806 and the blockchain database 812, linkage information provided for linking different documents associated with the same order, encryption keys, and lists of authorized users to the documents, etc. In some embodiments, the smart contract data cache can also store index data for associating mutable data and immutable data associated with the same document or transaction. As discussed earlier, the index data can include document IDs associated with documents and transaction hashes associated with the transactions. The document IDs can be stored in both the smart contract data cache 806 and the blockchain database 812 to link mutable and immutable data associated with the same document. The transaction hashes can be stored in both the smart contract data cache 806 and the blockchain database 812 to link mutable and immutable data associated with the same transactions. As such, both mutable data and immutable data can be identified from two storage locations when a document or a transaction associated with the document is queried.

The document type and document ID can respectively indicate a type and an identifier of the document. The document state can indicate a state of the document as discussed in the description of FIG. 7. The modifiable data of the document content can be certain content such as overhead inserted into the document by the custom clearance agent platform (e.g., 502) for data processing.

The transaction hash can be the hash value of the immutable blockchain data stored in the blockchain database 812. The encryption keys can include a symmetric key for encrypting the document data before storing on the blockchain in the blockchain database 812. The encryption keys can also include encryption keys associated with users of the custom clearance service platform 504. As discussed earlier, data stored in the blockchain database can be encrypted to protect privacy of the document owners. In some examples, the encryption keys can be supplied by a KMS 406 under a TEE as discussed in the description of FIG. 4.

A document owner can provide access permission of the document in plaintext to another user of the service platform by issuing an encrypted version of the symmetric key using the other user's public key. The encrypted data is immutable and is stored in the blockchain database 812, a hash value of the encrypted data (i.e., a transaction hash) can be generated and stored with the encrypted version of the symmetric key to the smart contract data cache 806 under the same data structure. Generally, the transaction hash can be used to link the mutable data stored in the smart contract data cache 806 with immutable blockchain data associated with the same order stored in the blockchain database 812. For example, an order document and one or more logistics documents associated with an order can include mutable data stored in the smart contract data cache 806 and encrypted documents stored in the blockchain database 812. The transaction hashes of the encrypted documents stored in the blockchain database 812 can be stored with the mutable data under the same data structure in the smart contract data cache 806. As such, data stored in different locations can be linked when queried.

To query the data, a permitted user can search the smart contract data cache 806 to obtain the hash value and the encrypted version of the symmetric key. The user can use her private key to decrypt the encrypted version of the symmetric key. If the symmetric key is successfully decrypted, the user can determine that she has access permission to the plaintext data. The user can then use the hash value to locate the encrypted data from the blockchain storage, and use the symmetric key to decrypt the encrypted data.

The blockchain database 812 can be used to store the blockchain 814. The blockchain 814 can include incremental, immutable blockchain data, such as the smart contract codes, input, output, and execution logs of the smart contracts, and parameters included in the custom clearance data.

In some embodiments, mutable data in the smart contract data cache 806 are stored as key value pairs (KVPs). The cache storage can be a relatively high-speed, high-cost, and low capacity storage medium, as compared to other storage media such as hard disk drives. When the volume of the KVPs exceeds a certain threshold (e.g., 5 GB), a cache-miss state may incur. The cache miss is a state where the data requested for processing by a component or application is not found in the cache memory. Cache miss can cause execution delays by requiring the program or application to fetch the data from other cache levels or the main memory.

In some embodiments, a plurality of smart contract pools 816 can be created in the blockchain database 812 to store at least a portion of the mutable data managed by the smart contracts in the smart contract data cache 806. The at least a portion of the mutable data can then be moved from the high-cost cache storage to the blockchain database 812 to lower the overall storage cost and alleviate the cache-miss state.

In some embodiments, a new smart contract address can be added by the blockchain node 802 to the configuration file 804 to create a corresponding smart contract. The virtual machine 808 can create a smart contract based on the smart contract address when the configuration file 804 is executed. A smart contract pool corresponding to the smart contract can be automatically created in the blockchain database 812 when the corresponding smart contract is created.

In some embodiments, data stored in the smart contract pools are also recorded on the blockchain 814 through consensus. In some embodiments, data stored in the smart contract pool can be exclusively managed by the corresponding smart contract. A contract ID of the smart contract can be added to data stored in the corresponding smart contract pool, so that the data in the pool can be easily queried, retrieved, or otherwise managed by the smart contract.

In some embodiments, a document can be stored in one of the smart contract pools 816 based on a hash value of one or more of the document ID or document type. A hash value range can be predetermined and assigned to each of the smart contract pools 816. For example, for a document with document ID 000001, its md3 hash value is 769924EADBBF6F72C6581377419FCB77. Assume that 16 smart contract pools exist, the document can be stored in the seventh smart contract pool based on the first hexadecimal number of the hash value. Similarly, a document with document ID 000003 has a md3 hash value 4DE1F0F6DA993FC4AB439CDCA5E084F6. The document can be stored in the fourth smart contract pool based on the first hexadecimal number of the hash value.

In some embodiments, the order document, logistics documents, and payment documents associated with the same order can be assigned to a same document ID or tag. As such, they can be easily located when queried from the smart contract data cache 806, the smart contract pools 816, and the blockchain 814. To link documents associated with the same order stored in different smart contract pools 816, the contract IDs of the corresponding smart contracts can be added with the corresponding document ID to each document. As such, the documents can be retrieved from different smart contract pools 816 according to the contract IDs. In some embodiments, the document ID can be a transaction hash of the corresponding document. The transaction hash can be used to locate the corresponding immutable data stored on the blockchain 814.

In some embodiments, new smart contract pools can be created periodically. For example, if a new smart contract pool is created every month, the smart contract can be associated with the time of creation expressed as MMYYYY, where MM represents the month of creation and YYYY represents the year of creation. As such, mutable data created during a particular month can be stored in the smart contract pool created in that month.

In some embodiments, the document can be stored in each of the smart contract pools 816 in a round-robin manner. In some examples, after a smart contract pool reaches its storage capacity, mutable data of a new document can be stored in the next smart contract pool. In some examples, after a smart contract pool stores mutable data of a predetermined amount of documents, mutable data of a new document can be stored in the next smart contract pool.

The following describes technology for managing access to custom clearance information, including information related to import orders, such as information related to order data, logistics data, and payment data. The custom clearance service platform 504 is configured to prevent tampering of the custom clearance documents that are submitted to the customs authority to request custom clearance for an import order. This enables the customs authority to determine whether to approve the import order to clear customs based on accurate data. The custom clearance service platform 504 is configured to protect private information by allowing only authorized users to access the custom clearance documents, which may include private information of the importers.

Figure 9:
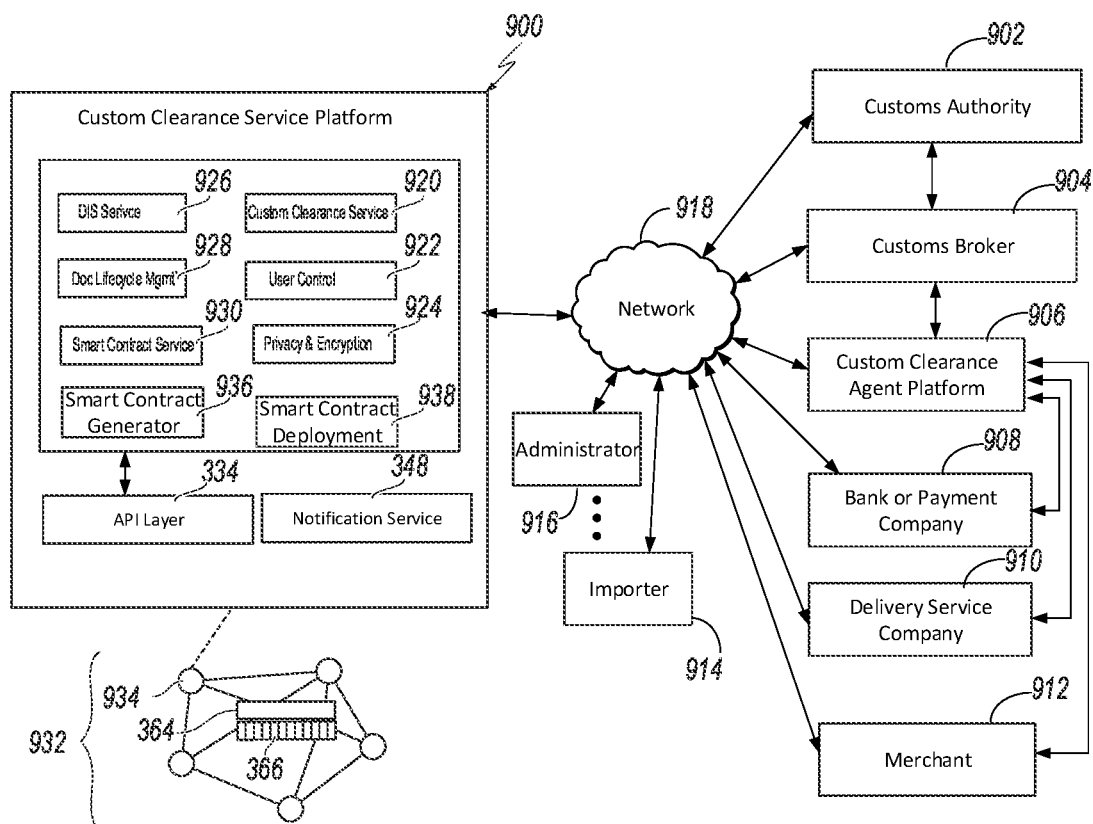
FIG. 9 shows an example of a system for implementing a blockchain-based custom clearance service platform for enabling secure and efficient processing of custom clearance documents in accordance with embodiments of this specification.

FIG. 9 shows an example of a system for implementing a blockchain-based custom clearance service platform 900 for enabling secure and efficient processing of custom clearance documents in accordance with embodiments of this specification. For example, the custom clearance documents can be import custom clearance documents that are used for clearing customs for import merchandise. The platform 900 provides an integrated interface that allows users to manage information used in various stages of the custom clearance process. The custom clearance service platform 900 provides services related to various stages of processing of custom clearance documents. In some embodiments, the custom clearance service platform 900 provides services to a custom clearance agent platform 906 so that the custom clearance information processed by the custom clearance agent platform 906 can be recorded in a secure manner, such as stored in a blockchain database and smart contract data caches. In some embodiments, the custom clearance service platform 900 can also provide services to other entities associated with an import order, such as one or more customs authorities 902, one or more customs brokers 904, one or more custom clearance agent platforms 906, one or more banks or payment companies 908, one or more delivery service companies 910, one or more merchants 912, one or more importers 914, and one or more administrators 916 through a network 918, such as the Internet.

For example, the customs authority 902 can be a government agency that is responsible for processing custom clearance, such as reviewing information about import merchandise, and assessing and collecting the duties, taxes, and fees associated with the importation of the merchandise. The customs authority 902 is also responsible for detecting fraudulent activities meant to avoid the payment of the duties, taxes, and fees.

A feature of the custom clearance service platform 900 is that the platform enables linking of multiple types of documents associated with an import order, or multiple import orders, allowing the customs authority 902 to more easily review the information recorded across multiple documents associated with the import order, and thus more easily detect inconsistencies or anomalies in the documents indicating potential fraudulent activities. Another feature of the custom clearance service platform 900 is that the platform provides encryption services for encrypting private information to protect privacy of the users. Another feature of the custom clearance service platform 900 is that the custom clearance information is recorded in a blockchain database through consensus of the blockchain nodes, the custom clearance information can be easily verified and trusted by parties that have access to the blockchain database. A further feature of the custom clearance service platform 900 is that the platform is scalable through the use of smart contract pools so that the platform 900 can process large amounts of import clearance data.

The customs broker 904 can be, e.g., a professional who prepares and submits documents to obtain custom clearance from the customs authority 902. The custom clearance agent platform 906 can be, e.g., an on-line or web-based system maintained by one or more custom brokers for collecting and processing custom clearance information. In some examples, the custom clearance agent platform 906 collects the custom clearance information from multiple parties, such as the banks or payment companies 908, the delivery service companies 910, the merchants 912, and the importers 914, and provides the collected information to the customs broker 904, who then submits the custom clearance documents to the customs authority 902. The custom clearance agent platform 906 sends copies of the custom clearance documents to the custom clearance service platform 900 for record keeping, e.g., by storing the custom clearance documents in a blockchain database and/or a smart contract data cache.

In some embodiments, the custom clearance agent platform 906 submits the custom clearance documents to the custom clearance service platform 900, and the custom clearance service platform 900 notifies the customs authority 902 that the custom clearance information have been recorded. The customs authority 902 then accesses the custom clearance information recorded by the custom clearance service platform 900 to assess and collect the duties, taxes, and fees associated with the import merchandise, and to detect fraudulent activities.

The bank or payment company 908 sends payment to the merchant 912. The bank or payment company 908 provides payment information associated with the import orders to the custom clearance agent platform 906. The bank or payment company 908 generates payment documents that include payment information related to the import orders, and sends the payment documents to the custom clearance agent platform 906. The bank or payment company 908 also interacts with the custom clearance service platform 900 to provide, e.g., payment information related to the import orders.

The delivery service company 910 receives the packages including the merchandise from the merchant 912, generates delivery documents that include shipment tracking information associated with the import orders. The delivery service company 910 provides the delivery documents related to the import orders to the merchant 912 and the custom clearance agent platform 906. The delivery service company 910 transports and delivers the packages of merchandise to the importers 914. The delivery service company 910 provides updated delivery information, such as updated shipment tracking information, to the custom service agent platform 906. The delivery service company 910 also interacts with the custom clearance service platform 900 to provide, e.g., shipment tracking information related to the import orders.

The merchant 912 provides information about the import order, such as order data, invoice information, and shipment tracking number to the custom clearance agent platform 906.

The importer 914 places orders for the merchandise, pays for the merchandise, and initiates delivery of the merchandise. The importer 914 can provide relevant information to the custom clearance agent platform 906. The importer 914 can also interact with the custom clearance service platform 900, e.g., to provide information regarding the import order, or to obtain information regarding the progress of the custom clearance for the import order.

The administrator 916 is responsible for controlling which members or parties have access to what information, and control authorization levels of the users of the custom clearance service platform 900 to ensure that privacy of the users are protected.

In some examples, the custom clearance service platform 900 collects information from the parties mentioned above (e.g., merchants 912, banks or payment companies 908, delivery companies 910, and importers 914) and compiles the information into a format that can be easily reviewed by the customs authority 902. The custom clearance service platform 900 can link multiple documents obtained from multiple parties to make it easier for the customs authority 902 to review the documents together.

In some examples, the custom clearance service platform 900 receives custom clearance information about all of the import orders for a region or country, and enables the customs authority 902 to analyze custom clearance data in novel ways. For example, the customs authority 902 can query the custom clearance service platform 900 for all import merchandise that are shipped to a particular address within a specified period of time. If an importer splits an order into multiple smaller orders that are all shipped to the same address, it may be difficult to detect the fraudulent activity by examining the individual smaller orders. By examining all import orders in which the merchandises are shipped to a particular address within a short period of time, the customs authority 902 may determine that the transactions have a pattern that indicates a likelihood of fraudulent activity.

The custom clearance service platform 900 interacts with a blockchain network 932 that includes a plurality of blockchain nodes 934 to securely record custom clearance information in the blockchain database 366 and the smart contract data cache 364. As discussed above, the smart contract data cache 364 can store mutable data in the form of smart contract data, and the blockchain database 366 can store incremental, immutable, permanent blockchain data. This provides a good balance between processing efficiency and storage cost of the blockchain data.

The custom clearance service platform 900 is configured to provide tools (e.g., web based portals and interfaces, APIs, and smart contracts) that enable the customs authority 902, the customs broker 904, the custom clearance agent platform 906, the bank or payment company 908, the delivery service company 910, the merchant 912, the importer 914, and the administrator 916 to conveniently and securely access and process the custom clearance information and documents associated with the import orders. For example, the custom clearance service platform 900 can provide interfaces that facilitate the recording, updating, and reviewing of order data, logistics data, and payment data associated with the import orders, and facilitate recording of the custom clearance information related to the import orders in one or more blockchain databases and smart contract data caches.

For example, the custom clearance service platform 900 can provide tools to implement the process 500 of FIG. 5 for handling custom clearance data. In some examples, the custom clearance service platform 900 includes a custom clearance service module 920, a user control module 922, a privacy and encryption module 924, a DIS service module 926, a document lifecycle management module 928, and a smart contract service module 930. The API layer 334 (described above in connection with FIG. 3) includes APIs (e.g., 336, 338, 340, 342, 344, and 346) that can be called by the users to invoke the services of the modules 920, 922, 924, 926, 928, and 930, respectively.

The custom clearance service module 900 includes the notification service 348 (described above in connection with FIG. 3) that enables the blockchain nodes of the blockchain network to notify the custom clearance service platform 900 and/or the users for updates on document events and user events.

Many of the functions provided by the custom clearance service platform 900 related to recording or access information stored in the blockchain database 366 and the smart contract data cache 364 involve the use of smart contracts. In some embodiments, a smart contract is developed by software programmers and/or people familiar with the custom clearance process, and the administrator 916 registers the smart contract with the blockchain network through the custom clearance service platform 900.

For example, the custom clearance service platform 900 can provide an API (e.g., CreateContract<contractId, body>) that can be used to register a smart contract with the blockchain network. The administrator 916 invokes the API provided by the custom clearance service platform 900 to establish a new smart contract with the blockchain network. The custom clearance service platform 900 sends the request to establish a new smart contract to the blockchain network. After the blockchain network registers the smart contract on the blockchain, the blockchain network sends a message to the custom clearance service platform 900 indicating that the new smart contract has been registered at the blockchain. The custom clearance service platform 900 then sends a message to the administrator 916 indicating that the new smart contract has been registered at the blockchain.

Using the process described above, the administrator 916 can deploy smart contracts on the blockchain without interacting with the blockchain network. Different blockchain networks may have different protocols for deploying smart contracts, and the protocols may not be intuitive to people who are not familiar with those blockchain networks. The custom clearance service platform 900 provides an easy-to-use and consistent application programming interface to enable the administrator 916 to deploy the smart contracts without having to learn the protocols of each blockchain network for deploying smart contracts.

In some examples, the custom clearance service platform 900 includes a smart contract generator 936 that includes customizable smart contract templates that allow a person familiar with the custom clearance process but is not an expert in computer programming to be able to generate smart contracts suitable for processing custom clearance data. The person can invoke the functions of the smart contract generator 936 by calling an API in the API layer 334 to generate a smart contract for processing a particular type of import custom clearance document for a certain stage of the import custom clearance process. The person can invoke the functions of a smart contract deployment module 938 by calling an API in the API layer 334 to deploy the new smart contract on the blockchain. The smart contract deployment module 938 can include information about protocols for deploying smart contracts at veracious blockchain networks.

Figure 10:
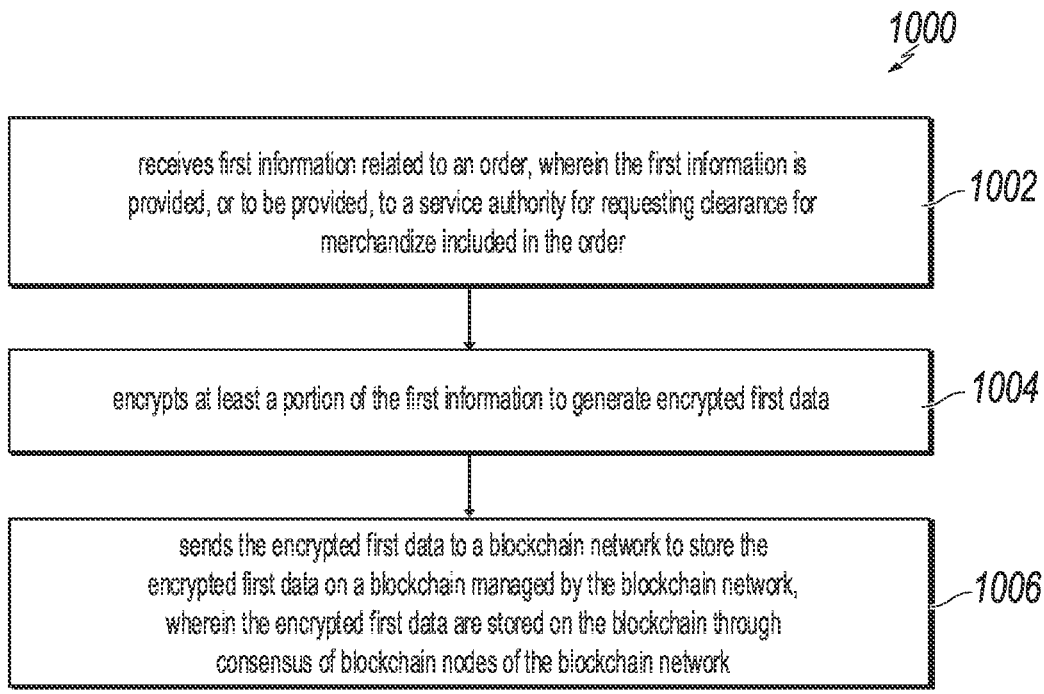
FIG. 10 is a flowchart of an example of a process in accordance with embodiments of this specification.

FIG. 10 is a flowchart of an example of a process 1000 in accordance with embodiments of this specification. For convenience, the process 1000 will be described as being performed by a system of one or more computers, located in one or more locations, and programmed appropriately in accordance with this specification. For example, an internal computer system, e.g., the internal system 400 of FIG. 4, appropriately programmed, can perform the process 1000.

At 1002, the computer system receives first information related to an order, wherein the first information is provided, or to be provided, to a service authority for requesting clearance for merchandize included in the order.

In some cases, the first data comprises order data, the order data comprises an order identifier of an order document associated with the import order, the second data comprises logistics data, the logistics data comprises a logistics transaction identifier of a logistics document associated with the import order, and linking the first data with the second data comprises invoking a smart contract on the blockchain to store the order identifier and the logistics transaction identifier in a data structure corresponding to the import order, and linking the order identifier with the logistics transaction identifier.

In some cases, the first data comprises order data, the order data comprises an order identifier of an order document associated with the import order, the second data comprises logistics data, in which the logistics data comprises at least one logistics document, wherein the process 1000 further comprising: generating a hash value of the at least one logistics document, and wherein linking the first data with the second data comprises invoking a smart contract on the blockchain to store the order identifier and the hash value of the at least one logistics document in a data structure corresponding to the import order, and linking the order identifier with the hash value of the at least one logistics document.

At 1004, the computer system encrypts at least a portion of the first information to generate encrypted first data. In some cases, encrypting at least a portion of the first information comprises encrypting at least a portion of the first information using an encryption key that is derived based on a linear secret sharing scheme.

In some cases, the encryption key is derived based on the linear secret sharing scheme through negotiations among at least two of (i) a custom clearance agent platform managed by at least one custom clearance agent or broker who represents importers in preparing and submitting information related to custom clearance to the customs authority, (ii) the service platform, or (iii) the customs authority.

At 1006, the computer system sends the encrypted first data to a blockchain network to store the encrypted first data on a blockchain managed by the blockchain network, wherein the encrypted first data are stored on the blockchain through consensus of blockchain nodes of the blockchain network.

In some cases, the process 1000 further comprising: at the service platform, receiving second information related to the order, wherein the second information is provided, or to be provided, to the service authority for requesting clearance for the merchandize included in the order; at the service platform, encrypting at least a portion of the second information to generate encrypted second data; sending the encrypted second data to the blockchain network to store the encrypted second data on the blockchain, wherein the encrypted second data are stored on the blockchain through consensus of blockchain nodes of the blockchain network; and linking the first data with the second data.

In some cases, linking the first data with the second data comprises enabling a user to search for the logistics document by searching for the order identifier in the data structure corresponding to the order, and searching for the logistics transaction identifier linked to the order identifier.

In some cases, the process 1000 further comprising: at the service platform, providing an API to enable the service authority to search for the order identifier, and search for the logistics transaction identifier linked to the order identifier.

In some cases, the first data comprises order data, the process 1000 further comprising: at the service platform, receiving payment data related to the order, wherein the payment data are provided to the service authority for requesting clearance of the merchandize associated with the order; at the service platform, encrypting at least a portion of the payment data to generate encrypted payment data; sending the encrypted payment data to the blockchain network to store the encrypted payment data on the blockchain, wherein the encrypted payment data are stored on the blockchain through consensus of blockchain nodes of the blockchain network; wherein the payment data comprises a payment transaction identifier of a payment document associated with the order, and linking the order data with the payment data, including invoking the smart contract on the blockchain to store the order identifier and the payment transaction identifier in the data structure corresponding to the order, and linking the order identifier with the payment transaction identifier.

In some cases, the first data comprises order data, the process 1000 further comprising: at the service platform, receiving payment data related to the order, wherein the payment data are provided to the service authority for requesting clearance of the merchandize associated with the order; wherein the payment data comprises a payment transaction identifier of a payment document associated with the order; at the service platform, encrypting at least a portion of the payment data to generate encrypted payment data; sending the encrypted payment data to the blockchain network to store the encrypted payment data on the blockchain, wherein the encrypted payment data are stored on the blockchain through consensus of blockchain nodes of the blockchain network; wherein the method comprises generating a hash value of the at least one logistics document, and linking the order data with the payment data, including invoking the smart contract on the blockchain to store the order identifier and the payment transaction identifier in the data structure corresponding to the order, and linking the order identifier with the payment transaction identifier.

In some cases, linking the order data with the payment data comprises enabling the user to search for the payment document by searching for the order identifier in the data structure corresponding to the order, and searching for the payment identifier linked to the order identifier.

In some cases, the process 1000 further comprising: at the service platform, providing an API to enable the service authority to search for the order identifier, and search for the logistics transaction identifier and the payment identifier linked to the order identifier.

In some cases, the first data comprises order data, the order data comprises an order identifier of an order document associated with the order, the second data comprises payment data, the payment data comprises a payment transaction identifier of a payment document associated with the order, and linking the first data with the second data comprises invoking a smart contract on the blockchain to store the order identifier and the payment transaction identifier in a data structure corresponding to the order, and linking the order identifier with the payment transaction identifier.

In some cases, linking the first data with the second data comprises enabling a user to search for the payment document by searching for the order identifier in the data structure corresponding to the order, and searching for the payment transaction identifier linked to the order identifier.

In some cases, the process 1000 further comprising: at the service platform, providing an API to enable the service authority to search for the order identifier, and search for the payment identifier linked to the order identifier.

In some cases, the process 1000 further comprising: at the service platform, providing an API to enable the service authority to search for the first data, and search for the second data linked to the first data.

In some cases, the first information comprises order data, and the order data include information about at least one of (i) an identifier of an importer associated with the order, (ii) a name of the importer, (iii) contact information of the importer, (iv) merchandise to be imported according to the order, (v) number of items ordered, (vi) price of the merchandise to be imported, (vii) currency type, or (viii) merchant that sells the merchandise.

In some cases, the first information comprises logistics data including information about at least one of (i) an overseas segment delivery tracking number, (ii) an overseas segment delivery service company name, (iii) a domestic segment delivery tracking number, (iv) a domestic segment delivery service company name, (v) company name for custom declaration, (vi) a waybill number, (vii) package weight, (viii) delivery address, (ix) identifier of recipient, (x) company name of sender, or (xi) address of sender.

In some cases, the first information comprises payment data including information about at least one of (i) payment transaction identifier, (ii) order number, (iii) identifier of payee, (iv) name of payee, (v) total actual payment, (vi) payment method, (vii) time of payment, (viii) payment currency, (ix) identifier of payor, (x) name of payor, or (xi) contact information of payor.

In some cases, the information is provided by a custom clearance agent platform managed by at least one custom clearance agent or broker who represents importers in preparing and submitting information related to custom clearance to the service authority.

In some cases, the process 1000 further comprising: generating one or more zero-knowledge proofs (ZKPs) related to one or more values associated with the order. In some cases, the first data comprises at least one of order data or payment data, and generating one or more ZKPs comprises generating one or more zero-knowledge proofs related to one or more values associated with at least one of the order data or the payment data.

In some cases, at least one of the one or more ZKPs is generated based on homomorphic encryption. In some cases, the one or more ZKPs include at least one of a range proof or a zero test. In some cases, the process 1000 further comprising: at a blockchain node of the blockchain network, verifying the one or more ZKPs and performing consensus based on the encrypted information after the one or more ZKPs are verified, and storing the encrypted information to the blockchain after the consensus is successfully performed.

In some cases, the process 1000 further comprising: at the service platform, receiving updated first information related to the order, encrypting the updated first information to generate encrypted updated first information, and sending the encrypted updated first information to the blockchain network to store the encrypted updated first information on the blockchain.

In some cases, the updated first information includes updated order data. In some cases, the process 1000 further comprising: at the service platform, receiving updated second information related to the order, encrypting the updated second information to generate encrypted updated second information, and sending the encrypted updated second information to the blockchain network to store the encrypted updated second information on the blockchain, wherein the updated second information includes at least one of (i) updated logistics data, or (ii) updated payment data.

In some cases, encrypting at least a portion of the first information comprises encrypting at least a portion of the first information using an encryption key, the process 1000 further comprising: sharing the encryption key with the service authority, and after the encrypted first data is stored on the blockchain, notifying the service authority that the encrypted first data are stored on the blockchain.

In some cases, the process 1000 further comprising: at the service platform, providing an API to enable a user of the service platform to request that the first information be recorded on the blockchain.

In some cases, providing an API comprises providing an API to enable the user of the service platform to request that at least one of (i) order data, (ii) logistics data, or (iii) payment data be recorded on the blockchain.

In some cases, providing an API comprises providing an API to enable the user of the service platform to request that at least one of (i) updated order data, (ii) updated logistics data, or (iii) updated payment data be recorded on the blockchain.

In some cases, providing an API comprises providing an API to enable the service authority to search for data that are associated with the order and stored on the blockchain.

In some cases, the process 1000 further comprising: generating a digital signature of the service platform, and adding the digital signature of the service platform to the encrypted first data to generate digitally signed encrypted first data, wherein sending the encrypted first data to the blockchain network comprises sending the digitally signed encrypted first data to the blockchain network to store the digitally signed encrypted first data on the blockchain.

In some cases, a service platform comprises: a plurality of service modules and an API layer comprising a plurality of APIs to enable users to invoke the service modules to process data related to orders associated with importation of merchandise, in which the data include information provided, or to be provided, to customs authorities for requesting custom clearance for the order, and a rules database that includes information about rules for processing custom clearance data for multiple countries; wherein at the service platform, upon receiving first custom clearance data for a first order associated with importation of merchandise into a first country, the service modules process the first custom clearance data based on information in the rules database in compliance with rules of the first country, and wherein at the service platform, upon receiving second custom clearance data for a second order associated with importation of merchandise into a second country that is different from the first country, the service modules process the second custom clearance data based on information in the rules database in compliance with rules of the second country.

In some cases, a first API of the plurality of APIs enables a first user located in the first country to invoke a first smart contract to store first custom clearance data on at least one of a first blockchain database or a smart contract data cache in compliance with rules of the first country, wherein the first API also enables a second user located in the second country to invoke a second smart contract to store second custom clearance data on at least one of a second blockchain database or a second smart contract data cache in compliance with rules of the second country.

In some cases, the first smart contract is configured to store an immutable portion of the first custom clearance data on the first blockchain database and a mutable portion of the first custom clearance data on the first smart contract data cache in compliance with the rules of the first country, and the second smart contract is configured to store an immutable portion of the second custom clearance data on the second blockchain database and a mutable portion of the second custom clearance data on the second smart contract data cache in compliance with the rules of the second country.

In some cases, a second API of the plurality of APIs enables a third user located in the first country to invoke a third smart contract executing on the first blockchain to request that a first member be added to or removed from a list of authorized members who are authorized to access the first data based on information in the rules database in compliance with rules of the first country, and the second API enables a fourth user located in the first country to invoke a third smart contract executing on the first blockchain to request that a second member be added to or removed from a list of authorized members who are authorized to access the second data based on information in the rules database in compliance with rules of the second country.

In some cases, a clearance platform comprises: a plurality of service modules and an API layer comprising a plurality of APIs to enable users to invoke the service modules to process clearance data related to purchase orders associated with purchase of merchandise, and a rules database that includes information about rules for processing clearance data, including a rule specifying an amount of fee or donation to be imposed on a specified category of merchandise; wherein at the clearance platform, upon receiving clearance data associated with a purchase order, the service modules are configured to store at least a portion of the clearance data in a blockchain and/or a smart contract data cache, and process the clearance data based on information in the rules database to determine an amount of fee or donation to impose on the purchase order.

In some cases, a first API of the plurality of APIs enables an administrator to establish new rules for the rules database or revise existing rules in the rules database. In some cases, the clearance platform is configured to invoke a smart contract to store an immutable portion of the clearance data on the blockchain database and a mutable portion of the clearance data on the smart contract data cache.

In some cases, the order is an import order, the first information is first import custom clearance information, the encrypted first import custom clearance data is encrypted first import custom clearance data, and the service authority is a customs authority for custom clearance of the merchandize included in the order.

Figure 11:
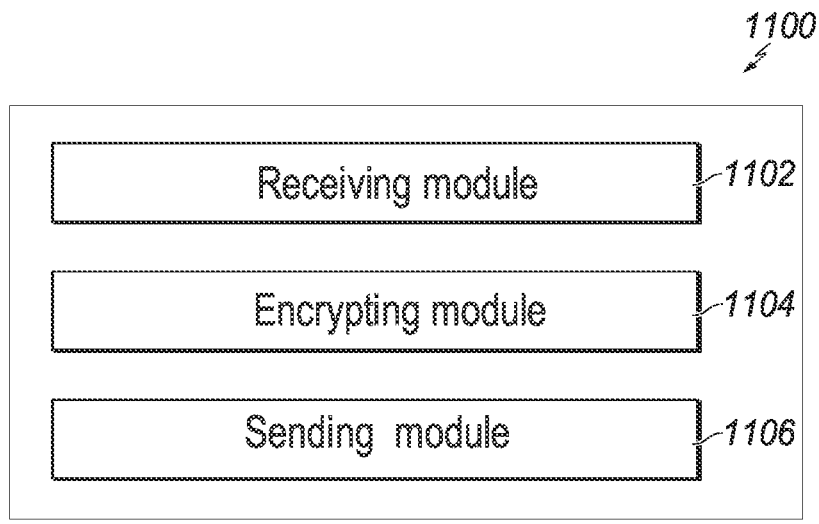
FIG. 11 is a diagram of an example of modules of an apparatus in accordance with embodiments of this specification.

FIG. 11 is a diagram of an example of modules of an apparatus 1100 in accordance with embodiments of this specification. The apparatus 1100 can be an example of an embodiment of a computer system configured to register documents for custom clearance based on blockchain technologies. The apparatus 1100 can correspond to the embodiments described above, and the apparatus 1100 includes the following: a receiving module 1102 that receives first information related to an order, wherein the first information includes first information provided, or to be provided, to a service authority for requesting clearance for merchandize included in the order; an encrypting module 1104 that encrypts at least a portion of the first information to generate encrypted first data; and a sending module 1106 that sends the encrypted first data to a blockchain network to store the encrypted first data on a blockchain managed by the blockchain network, wherein the encrypted first data are stored on the blockchain through consensus of blockchain nodes of the blockchain network.

In an optional embodiment, the apparatus 1100 further comprising: at the service platform, receiving second information related to the order, wherein the second information includes second information provided, or to be provided, to the service authority for requesting clearance for merchandize included in the order; at the service platform, encrypting at least a portion of the second information to generate encrypted second data; sending the encrypted second data to the blockchain network to store the encrypted second data on the blockchain, wherein the encrypted second data are stored on the blockchain through consensus of blockchain nodes of the blockchain network; and linking the first data with the second data.

In an optional embodiment, the first data comprises order data, the order data comprises an order identifier of an order document associated with the order, the second data comprises logistics data, the logistics data comprises a logistics transaction identifier of a logistics document associated with the order, and linking the first data with the second data comprises invoking a smart contract on the blockchain to store the order identifier and the logistics transaction identifier in a data structure corresponding to the order, and linking the order identifier with the logistics transaction identifier.

In an optional embodiment, the first data comprises order data, the order data comprises an order identifier of an order document associated with the order, the second data comprises logistics data, in which the logistics data comprises at least one logistics document, wherein the apparatus 1100 further comprising: generating a hash value of the at least one logistics document, and wherein linking the first data with the second data comprises invoking a smart contract on the blockchain to store the order identifier and the hash value of the at least one logistics document in a data structure corresponding to the order, and linking the order identifier with the hash value of the at least one logistics document.

In an optional embodiment, linking the first data with the second data comprises enabling a user to search for the logistics document by searching for the order identifier in the data structure corresponding to the order, and searching for the logistics transaction identifier linked to the order identifier.

In an optional embodiment, the apparatus 1100 further comprising: at the service platform, providing an API to enable the service authority to search for the order identifier, and search for the logistics transaction identifier linked to the order identifier.

In an optional embodiment, the first data comprises order data, the apparatus 1100 further comprising: at the service platform, receiving payment data related to the order, wherein the payment data are provided to the service authority for requesting custom clearance for the order; at the service platform, encrypting at least a portion of the payment data to generate encrypted payment data; sending the encrypted payment data to the blockchain network to store the encrypted payment data on the blockchain, wherein the encrypted payment data are stored on the blockchain through consensus of blockchain nodes of the blockchain network; wherein the payment data comprises a payment transaction identifier of a payment document associated with the order, and linking the order data with the payment data, including invoking the smart contract on the blockchain to store the order identifier and the payment transaction identifier in the data structure corresponding to the order, and linking the order identifier with the payment transaction identifier.

In an optional embodiment, the first data comprises order data, the apparatus 1100 further comprising: at the service platform, receiving payment data related to the order, wherein the payment data are provided to the service authority for requesting custom clearance for the order; wherein the payment data comprises a payment transaction identifier of a payment document associated with the order; at the service platform, encrypting at least a portion of the payment data to generate encrypted payment data; sending the encrypted payment data to the blockchain network to store the encrypted payment data on the blockchain, wherein the encrypted payment data are stored on the blockchain through consensus of blockchain nodes of the blockchain network; wherein the method comprises generating a hash value of the at least one logistics document, and linking the order data with the payment data, including invoking the smart contract on the blockchain to store the order identifier and the payment transaction identifier in the data structure corresponding to the order, and linking the order identifier with the payment transaction identifier.

In an optional embodiment, linking the order data with the payment data comprises enabling the user to search for the payment document by searching for the order identifier in the data structure corresponding to the order, and searching for the payment identifier linked to the order identifier.

In an optional embodiment, the apparatus 1100 further comprising: at the service platform, providing an API to enable the service authority to search for the order identifier, and search for the logistics transaction identifier and the payment identifier linked to the order identifier.

In an optional embodiment, the first data comprises order data, the order data comprises an order identifier of an order document associated with the order, the second data comprises payment data, the payment data comprises a payment transaction identifier of a payment document associated with the order, and linking the first data with the second data comprises invoking a smart contract on the blockchain to store the order identifier and the payment transaction identifier in a data structure corresponding to the order, and linking the order identifier with the payment transaction identifier.

In an optional embodiment, linking the first data with the second data comprises enabling a user to search for the payment document by searching for the order identifier in the data structure corresponding to the order, and searching for the payment transaction identifier linked to the order identifier.

In an optional embodiment, the apparatus 1100 further comprising: at the service platform, providing an API to enable the service authority to search for the order identifier, and search for the payment identifier linked to the order identifier.

In an optional embodiment, the apparatus 1100 further comprising: at the service platform, providing an API to enable the service authority to search for the first data, and search for the second data linked to the first data.

In an optional embodiment, the first information comprises order data, and the order data include information about at least one of (i) an identifier of an importer associated with the order, (ii) a name of the importer, (iii) contact information of the importer, (iv) merchandise to be imported according to the order, (v) number of items ordered, (vi) price of the merchandise to be imported, (vii) currency type, or (viii) merchant that sells the merchandise.

In an optional embodiment, the first information comprises logistics data including information about at least one of (i) an overseas segment delivery tracking number, (ii) an overseas segment delivery service company name, (iii) a domestic segment delivery tracking number, (iv) a domestic segment delivery service company name, (v) company name for custom declaration, (vi) a waybill number, (vii) package weight, (viii) delivery address, (ix) identifier of recipient, (x) company name of sender, or (xi) address of sender.

In an optional embodiment, the first information comprises payment data including information about at least one of (i) payment transaction identifier, (ii) order number, (iii) identifier of payee, (iv) name of payee, (v) total actual payment, (vi) payment method, (vii) time of payment, (viii) payment currency, (ix) identifier of payor, (x) name of payor, or (xi) contact information of payor.

In an optional embodiment, the information is provided by a custom clearance agent platform managed by at least one custom clearance agent or broker who represents importers in preparing and submitting information related to custom clearance to the service authority.

In an optional embodiment, encrypting at least a portion of the first information comprises encrypting at least a portion of the first information using an encryption key that is derived based on a linear secret sharing scheme.

In an optional embodiment, the encryption key is derived based on the linear secret sharing scheme through negotiations among at least two of (i) a custom clearance agent platform managed by at least one custom clearance agent or broker who represents importers in preparing and submitting information related to custom clearance to the service authority, (ii) the service platform, or (iii) the service authority.

In an optional embodiment, the apparatus 1100 further comprising: generating one or more ZKPs related to one or more values associated with the order.

In an optional embodiment, the first data comprises at least one of order data or payment data, and generating one or more ZKPs comprises generating one or more zero-knowledge proofs related to one or more values associated with at least one of the order data or the payment data.

In an optional embodiment, at least one of the one or more ZKPs is generated based on homomorphic encryption. In an optional embodiment, the one or more ZKPs include at least one of a range proof or a zero test. In an optional embodiment, the apparatus 1100 further comprising: at a blockchain node of the blockchain network, verifying the one or more ZKPs and performing consensus based on the encrypted information after the one or more ZKPs are verified, and storing the encrypted information to the blockchain after the consensus is successfully performed.

In an optional embodiment, the apparatus 1100 further comprising: at the service platform, receiving updated first information related to the order, encrypting the updated first information to generate encrypted updated first information, and sending the encrypted updated first information to the blockchain network to store the encrypted updated first information on the blockchain.

In an optional embodiment, the updated first information includes updated order data. In an optional embodiment, the apparatus 1100 further comprising: at the service platform, receiving updated second information related to the order, encrypting the updated second information to generate encrypted updated second information, and sending the encrypted updated second information to the blockchain network to store the encrypted updated second information on the blockchain, wherein the updated second information includes at least one of (i) updated logistics data, or (ii) updated payment data.

In an optional embodiment, encrypting at least a portion of the first information comprises encrypting at least a portion of the first information using an encryption key, the apparatus 1100 further comprising: sharing the encryption key with the service authority, and after the encrypted first data is stored on the blockchain, notifying the service authority that the encrypted first data are stored on the blockchain.

In an optional embodiment, the apparatus 1100 further comprising: at the service platform, providing an API to enable a user of the service platform to request that the first information be recorded on the blockchain.

In an optional embodiment, providing an API comprises providing an API to enable the user of the service platform to request that at least one of (i) order data, (ii) logistics data, or (iii) payment data be recorded on the blockchain.

In an optional embodiment, providing an API comprises providing an API to enable the user of the service platform to request that at least one of (i) updated order data, (ii) updated logistics data, or (iii) updated payment data be recorded on the blockchain.

In an optional embodiment, providing an API comprises providing an API to enable the service authority to search for data that are associated with the order and stored on the blockchain.

In an optional embodiment, the apparatus 1100 further comprising: generating a digital signature of the service platform, and adding the digital signature of the service platform to the encrypted first data to generate digitally signed encrypted first data, wherein sending the encrypted first data to the blockchain network comprises sending the digitally signed encrypted first data to the blockchain network to store the digitally signed encrypted first data on the blockchain.

In an optional embodiment, the order is an import order, the first information is first import custom clearance information, the encrypted first import custom clearance data is encrypted first import custom clearance data, and the service authority is a customs authority for custom clearance of the merchandize included in the order.

Figure 12:
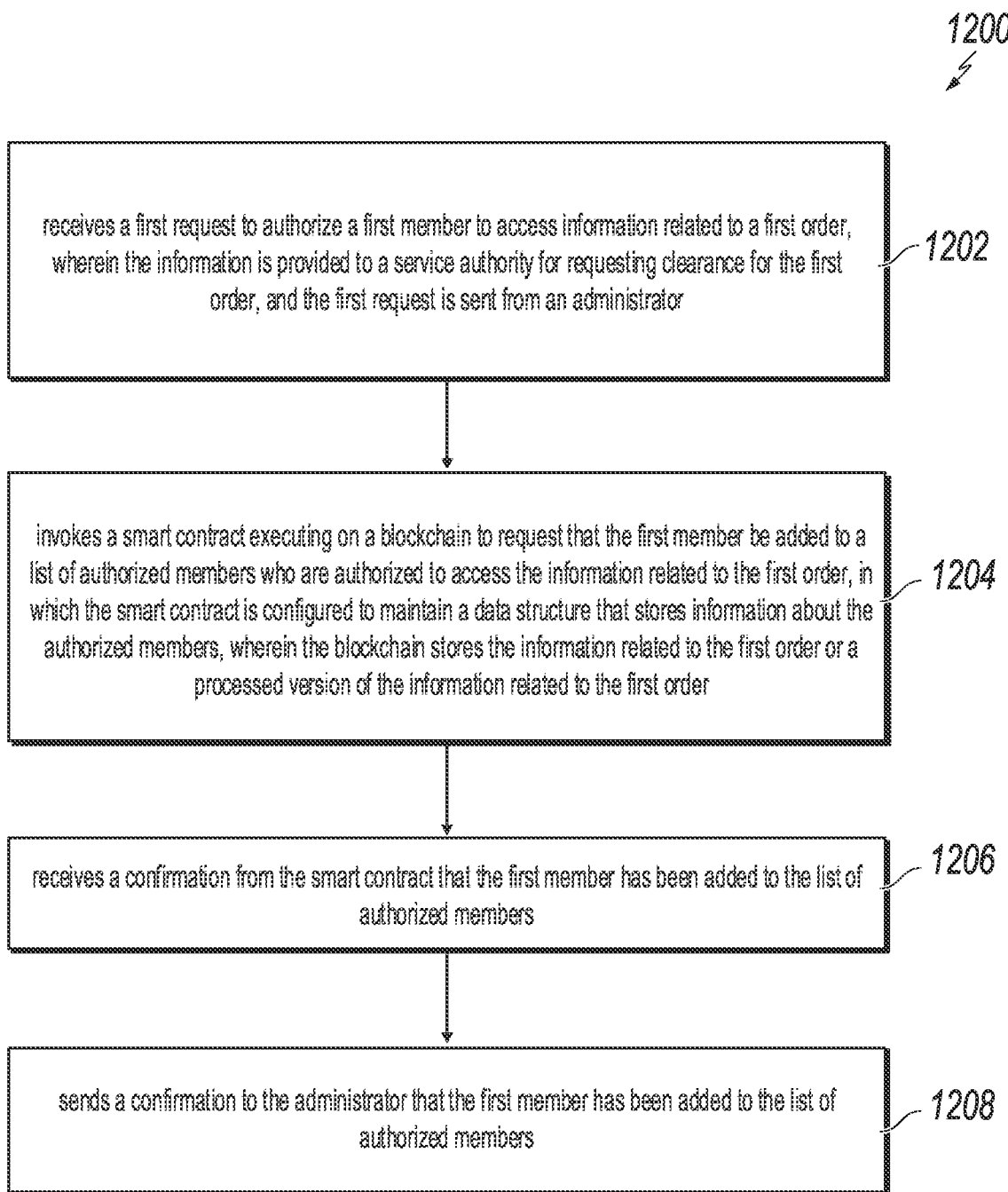
FIG. 12 is a flowchart of another example of a process in accordance with embodiments of this specification.

FIG. 12 is a flowchart of another example of a process 1200 in accordance with embodiments of this specification. For convenience, the process 1200 will be described as being performed by a system, which can include a system of one or more computers, located in one or more locations, and programmed appropriately in accordance with this specification. For example, a computer system, e.g., the internal computer system 400 of FIG. 4, appropriately programmed, can perform the process 1200.

At 1202, the computer system receives a first request to authorize a first member to access information related to a first order, wherein the information is provided to a service authority for requesting clearance for the first order, and the first request is sent from an administrator. In some cases, the information comprises at least one of order data, logistics data, or payment data associated with the first order.

At 1204, the computer system invokes a smart contract executing on a blockchain to request that the first member be added to a list of authorized members who are authorized to access the information related to the first order, in which the smart contract is configured to maintain a data structure that stores information about the authorized members, wherein the blockchain stores the information related to the first order or a processed version of the information related to the first order.

At 1206, the computer system receives a confirmation from the smart contract that the first member has been added to the list of authorized members.

At 1208, the computer system sends a confirmation to the administrator that the first member has been added to the list of authorized members.

In some cases, the process 1200 further comprising: at the service platform, receiving a third request from the first member to record or update information related to the first order, determining whether the first member is one of the authorized members who are authorized to access information related to the first order; upon confirming that the first member is an authorized member, record or update the information related to the first order according to the third request.

In some cases, determining whether the first member is one of the authorized members comprises invoking the smart contract executing on the blockchain to determine whether the first member is one of the authorized members based on the information stored in the data structure.

In some cases, the process 1200 further comprising: at the service platform, receiving a third request from a second member to record or update information related to the first order, determining whether the second member is one of the authorized members who are authorized to access information related to the first order; upon confirming that the second member is not an authorized member, denying the third request from the second member.

In some cases, the process 1200 further comprising: providing a first API to enable an administrator to add a new member to a list of authorized members who are authorized to access information related to an order.

In some cases, the process 1200 further comprising: providing an API to enable an administrator to remove a member from a list of authorized members who are authorized to access information related to an order.

In some cases, the process 1200 further comprising: providing an API to enable an administrator to set permission level for a member who is authorized to access information related to an order, and storing information about the permission level in a data structure that stores information about a list of members who are authorized to access the information related to the order.

In some cases, the process 1200 further comprising: providing an API to enable an administrator to update information for a member who is authorized to access information related to an order, and storing the updated information for the member in a data structure that stores information about a list of members who are authorized to access the information related to the order.

In some cases, the process 1200 further comprising: at a service platform, receiving a first request from a first user to record or update information related to a first order, wherein the information includes information provided, or to be provided, to a service authority for requesting custom clearance for the first order; determining whether the first user is one of authorized members who are authorized to record or update information related to the first order; and upon confirming that the first user is an authorized member, recording or updating the information related to the first order according to the first request.

In some cases, determining whether the first member is one of the authorized members comprises invoking a smart contract executing on a blockchain to determine whether the first user is one of the authorized members based on the information stored in a data structure maintained by the smart contract.

In some cases, the process 1200 further comprising: at the service platform, receiving a second request from the first user to record or update information related to a second order, wherein the information includes information provided, or to be provided, to the service authority for requesting custom clearance for the second order, determining whether the first user is one of authorized members who are authorized to access information related to the second order; upon determining that the first user is not authorized to access information related to the second order, denying the second request from the first user.

In some cases, the order is an import order, the first information is first import custom clearance information, the encrypted first import custom clearance data is encrypted first import custom clearance data, and the service authority is a customs authority for custom clearance of the merchandize included in the order.

Figure 13:
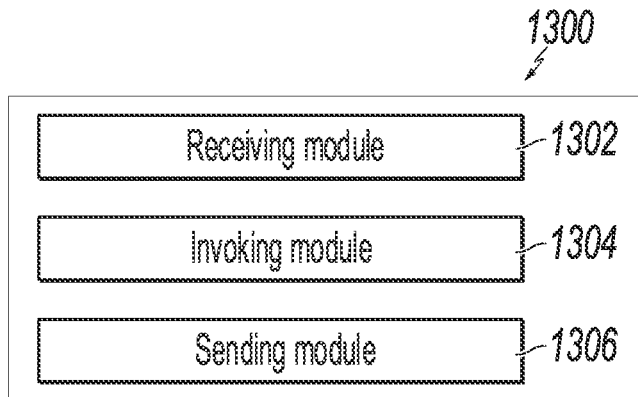
FIG. 13 is a diagram of another example of modules of an apparatus in accordance with embodiments of this specification.

FIG. 13 is a diagram of another example of modules of an apparatus 1300 in accordance with embodiments of this specification. The apparatus 1300 can be an example of an embodiment of a computer system. The apparatus 1300 can correspond to the embodiments described above, and the apparatus 1300 includes the following: a receiving module 1302 that receives a first request to authorize a first member to access information related to a first order, wherein the information includes information provided to a service authority for requesting custom clearance for the first order, and the first request is sent from an administrator; an invoking module 1304 that invokes a smart contract executing on a blockchain to request that the first member be added to a list of authorized members who are authorized to access the information related to the first order, in which the smart contract is configured to maintain a data structure that stores information about the authorized members, wherein the blockchain stores the information related to the first order or a processed version of the information related to the first order; the receiving module 1302 that receives a confirmation from the smart contract that the first member has been added to the list of authorized members; and a sending module 1306 that sends a confirmation to the administrator that the first member has been added to the list of authorized members.

In an optional embodiment, the apparatus 1300 further comprising: at the service platform, receiving a third request from the first member to record or update information related to the first order, determining whether the first member is one of the authorized members who are authorized to access information related to the first order; upon confirming that the first member is an authorized member, record or update the information related to the first order according to the third request.

In an optional embodiment, determining whether the first member is one of the authorized members comprises invoking the smart contract executing on the blockchain to determine whether the first member is one of the authorized members based on the information stored in the data structure.

In an optional embodiment, the apparatus 1300 further comprising: at the service platform, receiving a third request from a second member to record or update information related to the first order, determining whether the second member is one of the authorized members who are authorized to access information related to the first order; upon confirming that the second member is not an authorized member, denying the third request from the second member.

In an optional embodiment, the apparatus 1300 further comprising: providing a first API to enable an administrator to add a new member to a list of authorized members who are authorized to access information related to an order.

In an optional embodiment, the apparatus 1300 further comprising: providing an API to enable an administrator to remove a member from a list of authorized members who are authorized to access information related to an order.

In an optional embodiment, the apparatus 1300 further comprising: providing an API to enable an administrator to set permission level for a member who is authorized to access information related to an order, and storing information about the permission level in a data structure that stores information about a list of members who are authorized to access the information related to the order.

In an optional embodiment, the apparatus 1300 further comprising: providing an API to enable an administrator to update information for a member who is authorized to access information related to an order, and storing the updated information for the member in a data structure that stores information about a list of members who are authorized to access the information related to the order.

In an optional embodiment, the information comprises at least one of order data, logistics data, or payment data associated with the first order. In an optional embodiment, the apparatus 1300 further comprising: at a service platform, receiving a first request from a first user to record or update information related to a first order, wherein the information includes information provided, or to be provided, to a service authority for requesting custom clearance for the first order; determining whether the first user is one of authorized members who are authorized to record or update information related to the first order; and upon confirming that the first user is an authorized member, recording or updating the information related to the first order according to the first request.

In an optional embodiment, determining whether the first member is one of the authorized members comprises invoking a smart contract executing on a blockchain to determine whether the first user is one of the authorized members based on the information stored in a data structure maintained by the smart contract.

In an optional embodiment, the apparatus 1300 further comprising: at the service platform, receiving a second request from the first user to record or update information related to a second order, wherein the information includes information provided, or to be provided, to the service authority for requesting custom clearance for the second order, determining whether the first user is one of authorized members who are authorized to access information related to the second order; upon determining that the first user is not authorized to access information related to the second order, denying the second request from the first user.

In an optional embodiment, the order is an import order, the first information is first import custom clearance information, the encrypted first import custom clearance data is encrypted first import custom clearance data, and the service authority is a customs authority for custom clearance of the merchandize included in the order.

Figure 14:
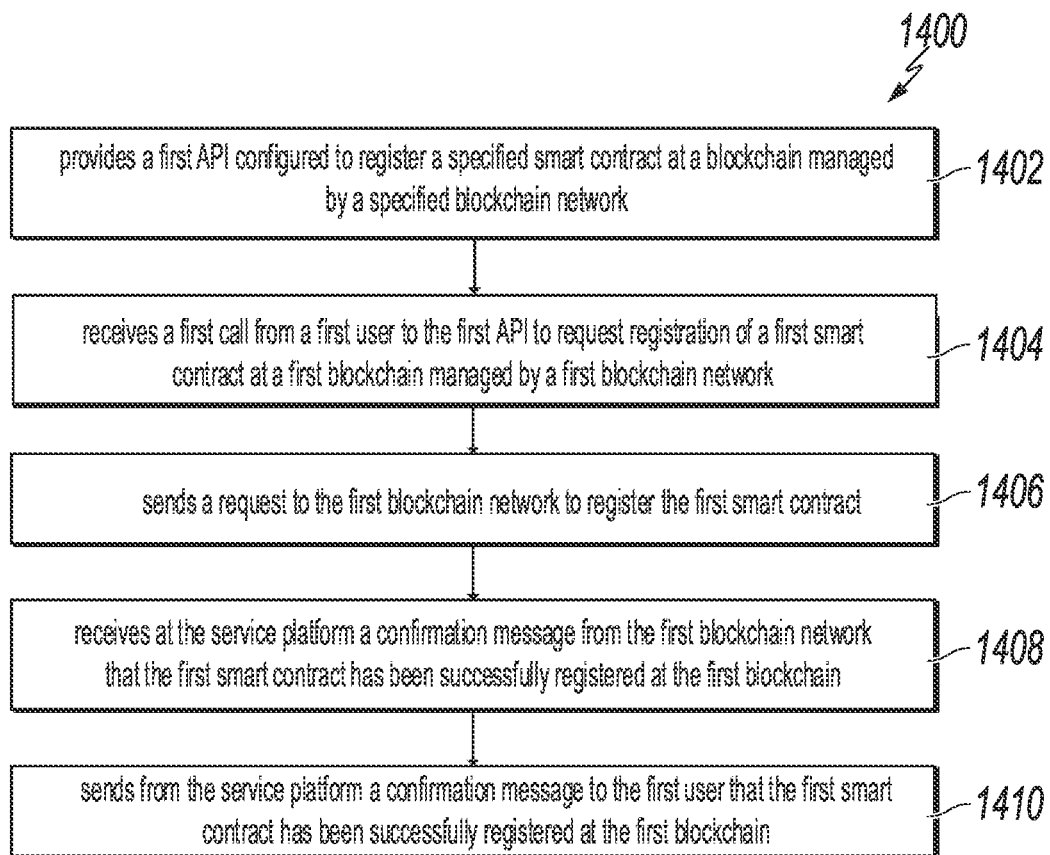
FIG. 14 is a flowchart of yet another example of a process in accordance to embodiments of this specification.

FIG. 14 is a flowchart of yet another example of a process 1400 in accordance to embodiments of this specification. For convenience, the process 1400 will be described as being performed by a computer system that includes a system of one or more computers, located in one or more locations, and programmed appropriately in accordance with this specification. For example, a computer system, e.g., the internal computer system 400 of FIG. 4, appropriately programmed, can perform the process 1400.

At 1402, the computer system provides a first API configured to register a specified smart contract at a blockchain managed by a specified blockchain network.

At 1404, the computer system receives a first call from a first user to the first API to request registration of a first smart contract at a first blockchain managed by a first blockchain network. In some cases, the first smart contract is configured to record at least one of order data, logistics data, or payment data on the first blockchain, in which the order data, logistics data, or payment data are associated with an order for importing a merchandise.

In some cases, the first smart contract is configured to record at least one of updated order data, logistics data, or payment data on the first blockchain, in which the updated order data, logistics data, or payment data are associated with an order for importing a merchandise.

At 1406, the computer system sends a request to the first blockchain network to register the first smart contract.

At 1408, the computer system receives at the service platform a confirmation message from the first blockchain network that the first smart contract has been successfully registered at the first blockchain.

At 1410, the computer system sends from the service platform a confirmation message to the first user that the first smart contract has been successfully registered at the first blockchain.

In some cases, the order is an import order, the first information is first import custom clearance information, the encrypted first import custom clearance data is encrypted first import custom clearance data, and the service authority is a customs authority for custom clearance of the merchandize included in the order.

Figure 15:
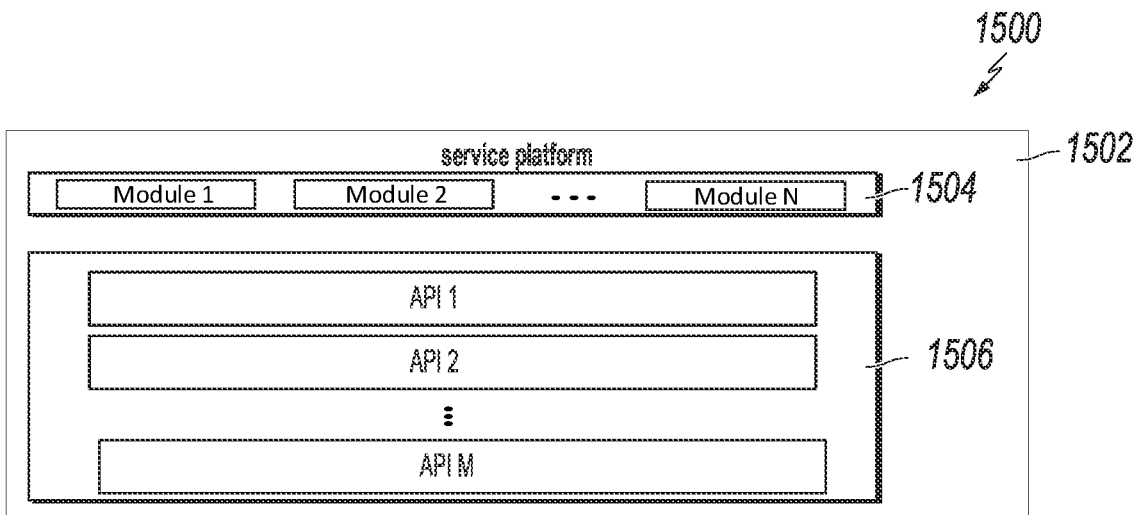
FIG. 15 is a diagram of yet another example of modules of an apparatus in accordance with embodiments of this specification.

FIG. 15 is a diagram of yet another example of modules of an apparatus 1500 in accordance with embodiments of this specification. The apparatus 1500 can be an example of an embodiment of a blockchain. The apparatus 1500 can correspond to the embodiments described above, and the apparatus 1500 includes the following: a service platform 1502 comprising a plurality of service modules 1504 and an API layer comprising a plurality of APIs 1506 to enable users to invoke the service modules to process information related to an order associated with importation of a merchandise, wherein the information includes information provided, or to be provided, to a service authority for requesting custom clearance for the order, wherein a first API of the plurality of APIs enables a user of the service platform to invoke a smart contract on a blockchain managed by a blockchain network, in which the smart contract performs at least one of processing of the information or processing of information related to another user of the service platform.

In an optional embodiment, the first API enables the user to invoke the smart contract to store data on the first blockchain through consensus of blockchain nodes of the blockchain network, in which the data are associated with the order.

In an optional embodiment, the first API enables the user to invoke the smart contract to store data on a smart contract data cache, in which the data are associated with the order.

In an optional embodiment, the first API enables the user to invoke the smart contract to store an immutable portion of custom clearance data on the first blockchain through consensus of blockchain nodes of the blockchain network, and store a mutable portion of the custom clearance data on a smart contract data cache, in which the custom clearance data are associated with the order.

In an optional embodiment, the custom clearance data comprises at least one of order data, logistics data, payment data, updated order data, updated logistics data, or updated payment data.

In an optional embodiment, the custom clearance data comprises at least one of encrypted order data, encrypted logistics data, encrypted payment data, encrypted updated order data, encrypted updated logistics data, or encrypted updated payment data.

In an optional embodiment, the first API enables an administrator to invoke the smart contract to record information about a user of the service platform on the first blockchain through consensus of blockchain nodes of the blockchain network.

In an optional embodiment, the first API enables an administrator to invoke the smart contract to record information about a user of the service platform on a smart contract data cache.

In an optional embodiment, the first API enables an administrator to invoke the smart contract to record an immutable portion of information about a user of the service platform on the first blockchain through consensus of blockchain nodes of the blockchain network, and record a mutable portion of the information about a user of the service platform on a smart contract data cache.

In an optional embodiment, the information about the user of the service platform comprises at least one of (i) information indicating that the user has been added to a list of members authorized to use the service platform, (ii) information indicating that the user has been removed from a list of members authorized to use the service platform, (iii) information indicating that the user has been added to a list of members authorized to use a particular function of the service platform, or (iv) information indicating that the user has been removed from a list of members authorized to use a particular function of the service platform.

In an optional embodiment, the information about the user of the service platform comprises at least one of (i) information indicating that the user has been added to a list of members authorized to access custom clearance data associated with a particular order, or (ii) information indicating that the user has been removed from a list of members authorized to access custom clearance data associated with a particular order.

In an optional embodiment, the information about the user of the service platform comprises at least one of (i) information indicating that the user has been added to a list of members authorized to access order data associated with a particular order, (ii) information indicating that the user has been removed from a list of members authorized to access order data associated with a particular order, (iii) information indicating that the user has been added to a list of members authorized to access logistics data associated with a particular order, (iv) information indicating that the user has been removed from a list of members authorized to access logistics data associated with a particular order, (v) information indicating that the user has been added to a list of members authorized to access payment data associated with a particular order, or (vi) information indicating that the user has been removed from a list of members authorized to access payment data associated with a particular order.

In an optional embodiment, a service platform comprising a plurality of service modules and an API layer comprising a plurality of APIs to enable users to invoke the service modules to generate smart contracts configured to process information related to an order associated with importation of a merchandise, wherein the information includes information provided, or to be provided, to a service authority for requesting custom clearance for the order, wherein a first API of the plurality of APIs enables a user of the service platform to invoke a smart contract generator that includes customizable smart contract templates, in which the smart contract generator enables the user to generate a smart contract configured to process information.

In an optional embodiment, the smart contract generator includes customizable smart contract templates that enable the user to generate a smart contract configured to store information on a blockchain managed by a blockchain network.

In an optional embodiment, the smart contract generator includes customizable smart contract templates that enable the user to generate a smart contract configured to store information on a smart contract data cache.

In an optional embodiment, the smart contract generator includes customizable smart contract templates that enable the user to generate a smart contract configured to store an immutable portion of information on a blockchain managed by a blockchain network, and store a mutable portion of the information on a smart contract data cache.

In an optional embodiment, the information comprises at least one of order data, logistics data, payment data, updated order data, updated logistics data, updated payment data, encrypted order data, encrypted logistics data, encrypted payment data, encrypted updated order data, encrypted updated logistics data, or encrypted updated payment data.

In an optional embodiment, the plurality of APIs comprises an API for handling different types of documents related to import custom clearance. In an optional embodiment, the plurality of APIs comprises an API for managing authorization levels given to users of the service platform for accessing information.

In an optional embodiment, the plurality of APIs comprises an API for managing encryption of at least a portion of the information. In an optional embodiment, the plurality of APIs comprises an API for managing DIS services to selectively store custom clearance data in either a smart contract data cache or a blockchain database.

In an optional embodiment, the plurality of APIs comprises an API for managing lifecycles of documents associated with import custom clearance.

In an optional embodiment, the plurality of APIs comprises an API for managing smart contract services including at least one of (i) generating a smart contract configured to process information, (ii) executing a smart contract for processing information, or (iii) generating a smart contract pool.

In an optional embodiment, the service platform is configured to provide a notification service to enable one or more blockchain nodes of a consortium blockchain network to send a notice or a message to at least one of (i) the service platform, or (ii) users of the service platform.

In an optional embodiment, the notice or the message comprises at least one of (i) an update on document events, or (ii) an update on user events. In an optional embodiment, a service platform comprising a plurality of service modules and an API layer comprising a plurality of APIs to enable users to invoke the service modules to process information related to an order associated with importation of a merchandise, wherein the information includes information provided, or to be provided, to a service authority for requesting custom clearance for the order, wherein a first API in the plurality of APIs enables a user of the service platform to deploy a smart contract to a blockchain managed by a blockchain network, and the smart contract is configured to process information in association with the blockchain.

In an optional embodiment, the service platform comprising a smart contract generator that includes customizable smart contract templates that can be used to generate smart contracts configured to process information in connection with the blockchain.

In an optional embodiment, the first API enables the user to deploy a smart contract to the blockchain in which the smart contract is configured to record at least one of order data, logistics data, or payment data on the blockchain, and the order data, logistics data, or payment data are associated with an order for importing a merchandise.

In an optional embodiment, the first API enables the user to deploy a smart contract to the blockchain in which the smart contract is configured to record at least one of updated order data, logistics data, or payment data on the blockchain, and the updated order data, logistics data, or payment data are associated with an order for importing a merchandise.

In an optional embodiment, the order is an import order, the first information is first import custom clearance information, the encrypted first import custom clearance data is encrypted first import custom clearance data, and the service authority is a customs authority for custom clearance of the merchandize included in the order.

Figure 16:
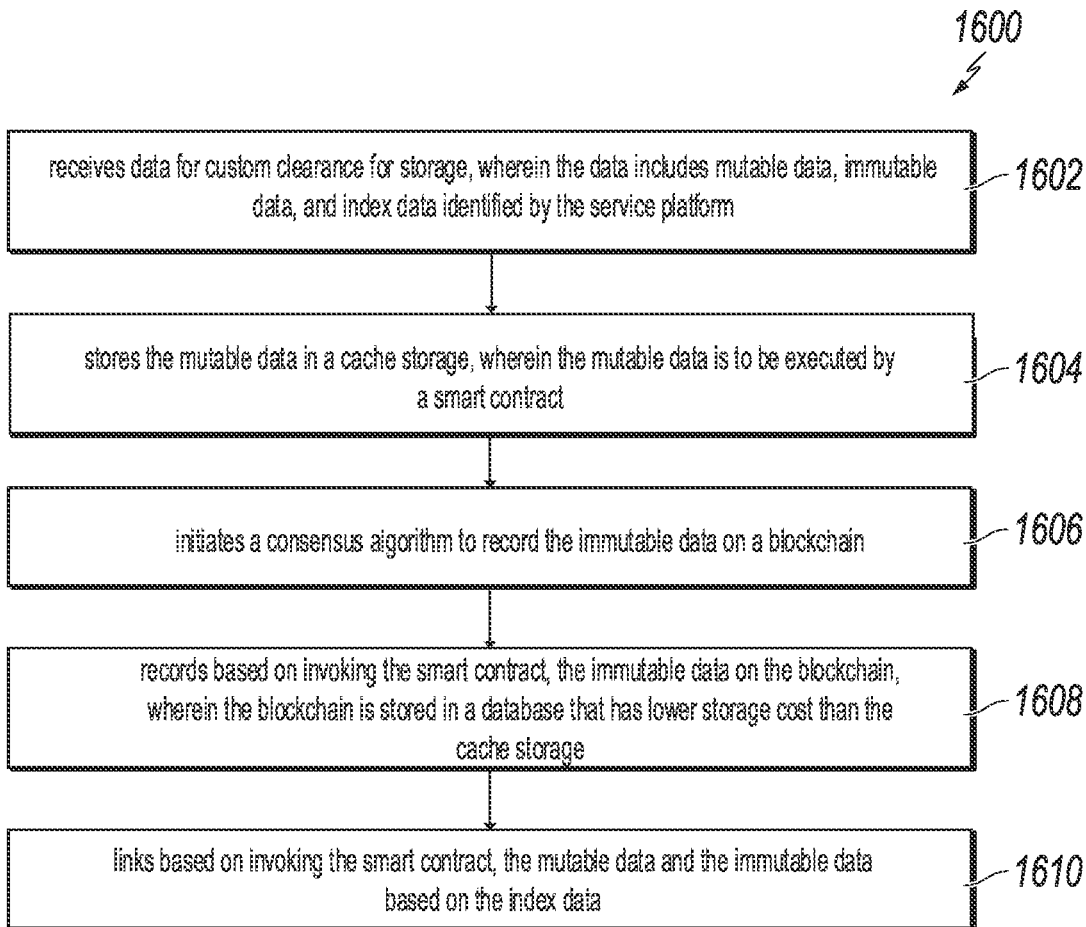
FIG. 16 is a flowchart of yet another example of a process in accordance with embodiments of this specification.

FIG. 16 is a flowchart of yet another example of a process 1600 in accordance with embodiments of this specification. For convenience, the process 1600 will be described as being performed by a blockchain node that includes a computer system of one or more computers, located in one or more locations, and programmed appropriately in accordance with this specification. For example, a computer system, e.g., the computer system 100 of FIG. 1, appropriately programmed, can perform the process 1600.

At 1602, the blockchain node receives data for custom clearance for storage, wherein the data includes mutable data, immutable data, and index data identified by the service platform.

In some cases, the mutable data is associated with a document for custom clearance, and the mutable data includes one or more of a document type of the document, a document status of the document, association information of the document with one or more other documents for custom clearance.

In some cases, the immutable data is associated with the document and includes an encrypted version of at least a portion of content of the document encrypted by an encryption key associated with an owner of the document.

In some cases, the encryption key is derived based on a linear secret sharing scheme through negotiations among at least two of (i) a custom clearance agent platform managed by at least one custom clearance agent or broker who represents importers in preparing and submitting information related to custom clearance to the customs authority, (ii) the service platform, or (iii) the customs authority.

In some cases, the index data is associated with the document and includes one or more of an ID of the document and hash values of a plurality of blockchain transactions associated with the document.

In some cases, the data is associated with a purchase order and includes one or more of order data, logistics data, and payment data. In some cases, an address of the smart contract is stored on the blockchain in the database storage. In some cases, the immutable data is stored in a data structure of a state Merkle tree.

At 1604, the blockchain node stores the mutable data in a cache storage, wherein the mutable data is to be executed by a smart contract.

At 1606, the blockchain node initiates a consensus algorithm to record the immutable data on a blockchain. In some cases, the consensus algorithm is one of PoW, PoS, or PBFT.

At 1608, the blockchain node records based on invoking the smart contract, the immutable data on the blockchain, wherein the blockchain is stored in a database that has lower storage cost than the cache storage.

At 1610, the blockchain node links based on invoking the smart contract, the mutable data and the immutable data based on the index data. In some cases, linking the mutable data and the immutable data based on the index data includes storing the index data and the mutable data under a first data structure in the cache storage and recording the index data and the immutable data under a second data structure on the blockchain.

In some cases, linking the mutable data and the immutable data based on the index data comprises enabling a user to obtain the mutable data and the immutable data by searching for the index data in the first data structure and the second data structure.

In some cases, the process 1600 further comprising: at the service platform, providing an API to enable the customs authority to search for the index data to retrieve the mutable data and the immutable data linked based on the index data.

Figure 17:
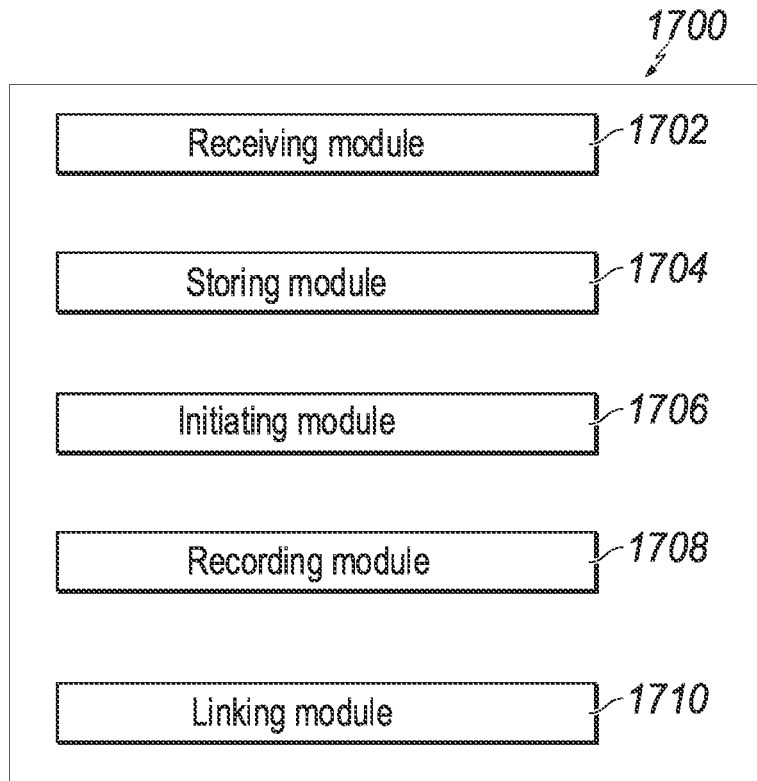
FIG. 17 is a diagram of yet another example of modules of an apparatus in accordance with embodiments of this specification.

FIG. 17 is a diagram of yet another example of modules of an apparatus 1700 in accordance with embodiments of this specification. The apparatus 1700 can be an example of an embodiment of a blockchain node. The apparatus 1700 can correspond to the embodiments described above, and the apparatus 1700 includes the following: a receiving module 1702 that receives data for custom clearance for storage, wherein the data includes mutable data, immutable data, and index data identified by the service platform; a storing module 1704 that stores the mutable data in a cache storage, wherein the mutable data is to be executed by a smart contract; an initiating module 1706 that initiates a consensus algorithm to record the immutable data on a blockchain; a recording module 1708 that records based on invoking the smart contract, the immutable data on the blockchain, wherein the blockchain is stored in a database that has lower storage cost than the cache storage; and a linking module 1710 that links based on invoking the smart contract, the mutable data and the immutable data based on the index data.

In an optional embodiment, the data is associated with a purchase order and includes one or more of order data, logistics data, and payment data. In an optional embodiment, the mutable data is associated with a document for custom clearance, and the mutable data includes one or more of a document type of the document, a document status of the document, association information of the document with one or more other documents for custom clearance.

In an optional embodiment, the immutable data is associated with the document and includes an encrypted version of at least a portion of content of the document encrypted by an encryption key associated with an owner of the document.

In an optional embodiment, the index data is associated with the document and includes one or more of an ID of the document and hash values of a plurality of blockchain transactions associated with the document.

In an optional embodiment, the encryption key is derived based on a linear secret sharing scheme through negotiations among at least two of (i) a custom clearance agent platform managed by at least one custom clearance agent or broker who represents importers in preparing and submitting information related to custom clearance to the customs authority, (ii) the service platform, or (iii) the customs authority.

In an optional embodiment, the consensus algorithm is one of PoW, PoS, or PBFT. In an optional embodiment, linking the mutable data and the immutable data based on the index data includes storing the index data and the mutable data under a first data structure in the cache storage and recording the index data and the immutable data under a second data structure on the blockchain.

In an optional embodiment, linking the mutable data and the immutable data based on the index data comprises enabling a user to obtain the mutable data and the immutable data by searching for the index data in the first data structure and the second data structure. In an optional embodiment, the apparatus 1700 further comprising: at the service platform, providing an API to enable the customs authority to search for the index data to retrieve the mutable data and the immutable data linked based on the index data. In an optional embodiment, an address of the smart contract is stored on the blockchain in the database storage. In an optional embodiment, the immutable data is stored in a data structure of a state Merkle tree.

Figure 18:
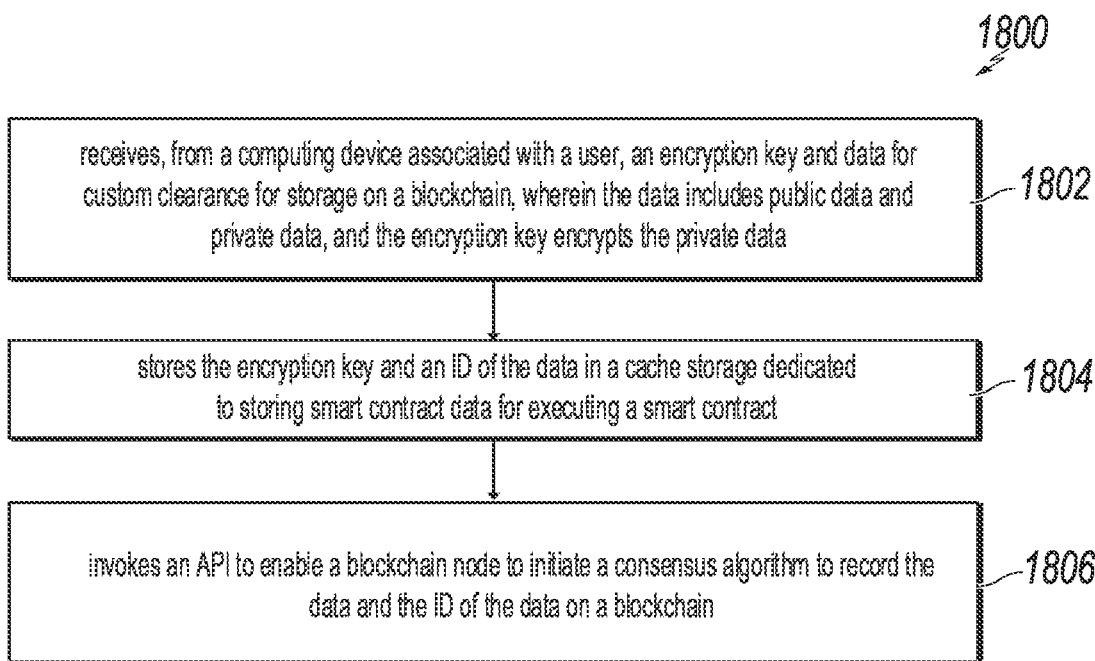
FIG. 18 is a flowchart of yet another example of a process in accordance with embodiments of this specification.

FIG. 18 is a flowchart of yet another example of a process 1800 in accordance with embodiments of this specification. For convenience, the process 1800 will be described as being performed by a computer system that includes a system of one or more computers, located in one or more locations, and programmed appropriately in accordance with this specification. For example, a computer system, e.g., the internal computer system 400 of FIG. 4, appropriately programmed, can perform the process 1800.

At 1802, the blockchain node receives, from a computing device associated with a user, an encryption key and data for custom clearance for storage on a blockchain, wherein the data includes public data and private data, and the encryption key encrypts the private data. In some cases, the encryption key is a symmetric key and the private data is in cyphertext encrypted using the symmetric key.

In some cases, the private data is in plaintext and the encryption key is a symmetric key, and the process 1800 further comprising: encrypting the private data using the symmetric key before invoking the API. In some cases, the user is a first user, the encryption key is a symmetric key encrypted by a public key of a second user, and the private data is encrypted by the symmetric key. In some cases, the data is associated with a purchase order and includes one or more of order data, logistics data, and payment data.

At 1804, the blockchain node stores the encryption key and an ID of the data in a cache storage dedicated to storing smart contract data for executing a smart contract.

At 1806, the blockchain node invokes an API to enable a blockchain node to initiate a consensus algorithm to record the data and the ID of the data on a blockchain.

In some cases, the ID of the data is a hash value of the data or an ID of a document associated with the data.

In some cases, the process 1800 further comprising: receiving, from the computing device associated with the user, a list of one or more other users permitted to access plaintext of the private data; encrypting the encryption key by using each of public keys of the one or more other users to generate encrypted encryption keys; and storing the encrypted encryption keys in the cache storage.

In some cases, the process 1800 further comprising: providing an API to enable the first user or the second user to: retrieve the encryption key from the cache storage and the private data from the blockchain; retrieve the symmetric key by decrypting the encryption key by using a private key corresponding to the public key; and decrypt the private data by using the symmetric key.

In some cases, the process 1800 further comprising: providing an API to enable the first user or the second user to retrieve the public data from the blockchain and the private data from the cache storage based on the ID of the data to recover the data.

In some cases, the API further enables the first user to record an updated version of the data associated with the ID of the data on the blockchain, and disables the second user to record the updated version of the data associated with the ID of the data on the blockchain.

In some cases, the encryption key is derived based on a linear secret sharing scheme through negotiations among at least two of (i) a custom clearance agent platform managed by at least one custom clearance agent or broker who represents importers in preparing and submitting information related to custom clearance to the customs authority, (ii) the service platform, or (iii) the customs authority.

In some cases, the consensus algorithm is one of proof of work PoW, PoS, or PBFT. In some cases, an address of the smart contract is stored on the blockchain in a database storage.

In some cases, the process 1800 further comprising: generating one or more ZKPs related to one or more values associated with the private data. In some cases, the data includes at least one of order data or payment data, and the ZKPs are related to one or more values associated with at least one of the order data or the payment data. In some cases, at least one of the one or more ZKPs is generated based on homomorphic encryption and is at least one of a range proof or a zero test, and wherein the consensus algorithm is performed after the one or more ZKPs are verified.

Figure 19:
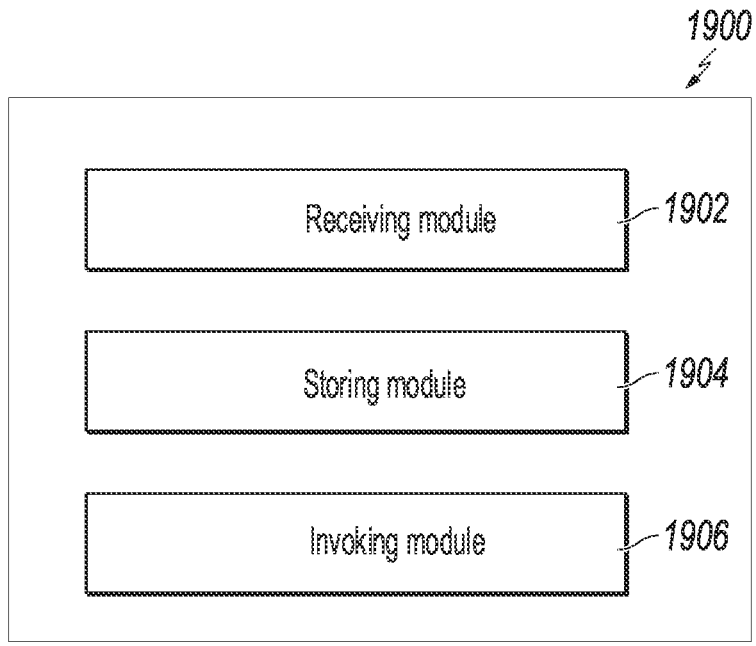
FIG. 19 is a diagram of yet another example of modules of an apparatus in accordance with embodiments of this specification.

FIG. 19 is a diagram of yet another example of modules of an apparatus 1900 in accordance with embodiments of this specification. The apparatus 1900 can be an example of an embodiment of a computer system. The apparatus 1900 can correspond to the embodiments described above, and the apparatus 1900 includes the following: a receiving module 1902 that receives from a computing device associated with a user, an encryption key and data for custom clearance for storage on a blockchain, wherein the data includes public data and private data, and the encryption key encrypts the private data; a storing module 1904 that stores the encryption key and an ID of the data in a cache storage dedicated to storing smart contract data for executing a smart contract; and an invoking module 1906 that invokes an API to enable a blockchain node to initiate a consensus algorithm to record the data and the ID of the data on a blockchain.

In an optional embodiment, the encryption key is a symmetric key and the private data is in cyphertext encrypted using the symmetric key.

In an optional embodiment, the private data is in plaintext and the encryption key is a symmetric key, and the apparatus 1900 further comprising: encrypting the private data using the symmetric key before invoking the API.

In an optional embodiment, the apparatus 1900 further comprising: receiving, from the computing device associated with the user, a list of one or more other users permitted to access plaintext of the private data; encrypting the encryption key by using each of public keys of the one or more other users to generate encrypted encryption keys; and storing the encrypted encryption keys in the cache storage.

In an optional embodiment, the user is a first user, the encryption key is a symmetric key encrypted by a public key of a second user, and the private data is encrypted by the symmetric key.

In an optional embodiment, the apparatus 1900 further comprising: providing an API to enable the first user or the second user to: retrieve the encryption key from the cache storage and the private data from the blockchain; retrieve the symmetric key by decrypting the encryption key by using a private key corresponding to the public key; and decrypt the private data by using the symmetric key.

In an optional embodiment, the apparatus 1900 further comprising: providing an API to enable the first user or the second user to retrieve the public data from the blockchain and the private data from the cache storage based on the ID of the data to recover the data.

In an optional embodiment, the ID of the data is a hash value of the data or an ID of a document associated with the data.

In an optional embodiment, the API further enables the first user to record an updated version of the data associated with the ID of the data on the blockchain, and disables the second user to record the updated version of the data associated with the ID of the data on the blockchain.

In an optional embodiment, the data is associated with a purchase order and includes one or more of order data, logistics data, and payment data.

In an optional embodiment, the encryption key is derived based on a linear secret sharing scheme through negotiations among at least two of (i) a custom clearance agent platform managed by at least one custom clearance agent or broker who represents importers in preparing and submitting information related to custom clearance to the customs authority, (ii) the service platform, or (iii) the customs authority.

In an optional embodiment, the consensus algorithm is one of PoW, PoS, or PBFT.

In an optional embodiment, an address of the smart contract is stored on the blockchain in a database storage.

In an optional embodiment, the apparatus 1900 further comprising: generating one or more ZKPs related to one or more values associated with the private data.

In an optional embodiment, the data includes at least one of order data or payment data, and the ZKPs are related to one or more values associated with at least one of the order data or the payment data.

In an optional embodiment, at least one of the one or more ZKPs is generated based on homomorphic encryption and is at least one of a range proof or a zero test, and wherein the consensus algorithm is performed after the one or more ZKPs are verified.

Figure 20:
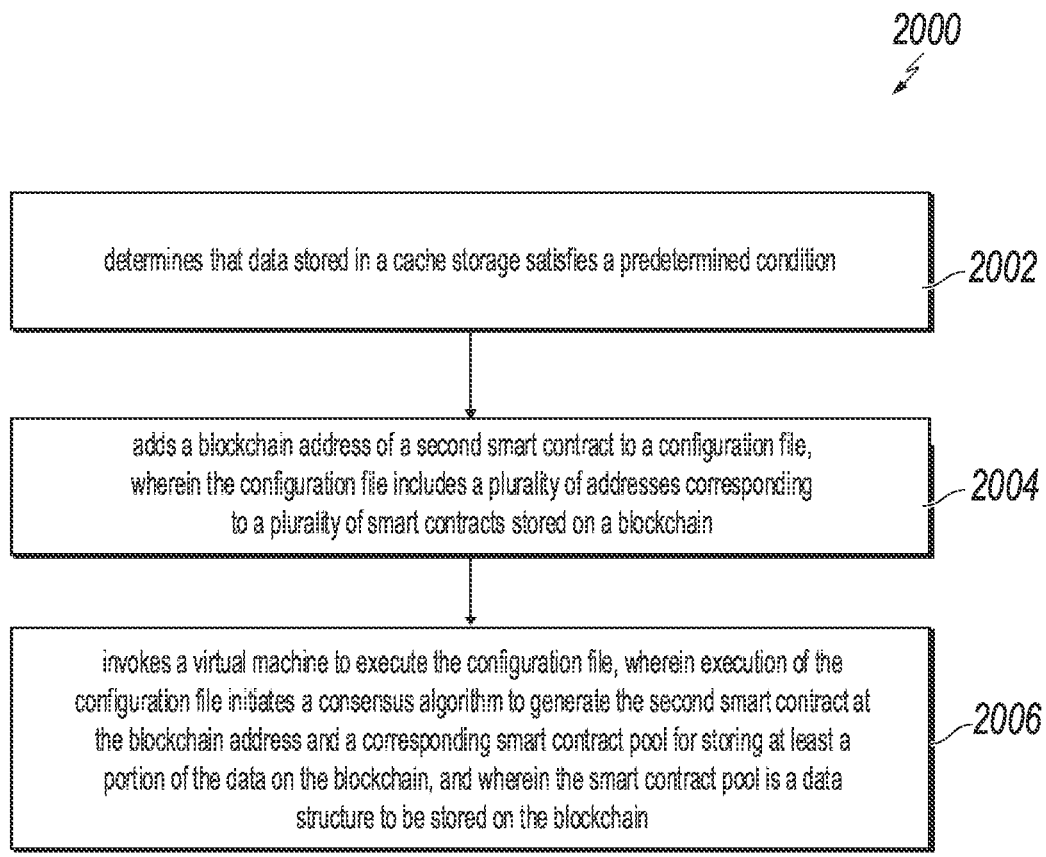
FIG. 20 is a flowchart of yet another example of a process in accordance with embodiments of this specification.

FIG. 20 is a flowchart of yet another example of a process 2000 in accordance with embodiments of this specification. For convenience, the process 2000 will be described as being performed by a computer system that includes a system of one or more computers, located in one or more locations, and programmed appropriately in accordance with this specification. For example, a computer system, e.g., the computer system 400 of FIG. 4, appropriately programmed, can perform the process 2000.

At 2002, the blockchain node determines that data stored in a cache storage satisfies a predetermined condition. In some cases, the data is mutable data included in a document for custom clearance, and the data includes one or more of a document type of the document, a document status of the document, association information of the document with one or more other documents for custom clearance.

In some cases, the document is one of an order document, a logistics document, or a payment document, and wherein the document includes the mutable data, immutable data including an encrypted version of at least a portion of content of the document encrypted by an encryption key associated with an owner of the document, and index data including one or more of an identifier of the document and hash values of a plurality of blockchain transactions associated with the document.

In some cases, the predetermined condition is satisfied if a volume of the data stored in the cache storage exceeds a predetermined threshold. In some cases, the blockchain includes a plurality of smart contract pools, and the process 2000 further comprising invoking an API to enable a blockchain node to initiate a consensus algorithm to record at least a portion of the data exceeding the predetermined threshold to the plurality of smart contract pools in a round-robin manner.

In some cases, the predetermined condition is satisfied if the at least a portion of the data is received at a predetermined time period different from a remainder of the data other than the at least a portion of the data.

In some cases, the blockchain includes a plurality of smart contract pools created during the predetermined time period, and the process 2000 further comprising invoking an API to enable a blockchain node to initiate a consensus algorithm to record the at least a portion of the data to the plurality of smart contract pools.

At 2004, the blockchain node adds a blockchain address of a second smart contract to a configuration file, wherein the configuration file includes a plurality of addresses corresponding to a plurality of smart contracts stored on a blockchain. In some cases, the configuration file is executed in response to restarting the computing device.

At 2006, the blockchain node invokes a virtual machine to execute the configuration file, wherein execution of the configuration file initiates a consensus algorithm to generate the second smart contract at the blockchain address and a corresponding smart contract pool for storing at least a portion of the data on the blockchain, and wherein the smart contract pool is a data structure to be stored on the blockchain.

In some cases, the blockchain includes a plurality of smart contract pools, and the process 2000 further comprising invoking an API to enable a blockchain node to initiate a consensus algorithm to record at least a portion of the data exceeding the predetermined threshold to the plurality of smart contract pools based on an ID of the data and IDs of the plurality of the smart contract pools.

In some cases, the at least a portion of data is associated with a plurality of documents for custom clearance, and the process 2000 further comprising associating a document ID of each of the plurality of documents with corresponding data in the at least a portion of data.

In some cases, the at least a portion of data is associated with a plurality of transactions associated with a document, and the process 2000 further comprising associating a hash value of each of the plurality of transactions with corresponding data in the at least a portion of data.

In some cases, the data structure of the smart contact pool is a state Merkle tree including a plurality of key-value pairs. In some cases, the second smart contract and the corresponding smart contract pool are associated with a smart contract ID of the second smart contract, wherein the smart contract ID is stored in the second smart contract and the smart contract pool to link the second smart contract with the smart contract pool.

Figure 21:
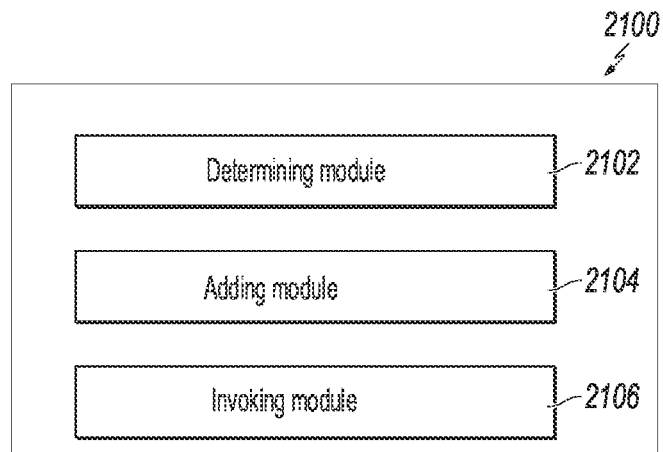
FIG. 21 is a diagram of yet another example of modules of an apparatus in accordance with embodiments of this specification.

FIG. 21 is a diagram of yet another example of modules of an apparatus 2100 in accordance with embodiments of this specification. The apparatus 2100 can be an example of an embodiment of a computer system. The apparatus 2100 can correspond to the embodiments described above, and the apparatus 2100 includes the following: a determining module 2102 that determines that data stored in a cache storage satisfies a predetermined condition; an adding module 2104 that adds a blockchain address of a second smart contract to a configuration file, wherein the configuration file includes a plurality of addresses corresponding to a plurality of smart contracts stored on a blockchain; and an invoking module 2106 that invokes a virtual machine to execute the configuration file, wherein execution of the configuration file initiates a consensus algorithm to generate the second smart contract at the blockchain address and a corresponding smart contract pool for storing at least a portion of the data on the blockchain, and wherein the smart contract pool is a data structure to be stored on the blockchain.

In an optional embodiment, the data is mutable data included in a document for custom clearance, and the data includes one or more of a document type of the document, a document status of the document, association information of the document with one or more other documents for custom clearance.

In an optional embodiment, the document is one of an order document, a logistics document, or a payment document, and wherein the document includes the mutable data, immutable data including an encrypted version of at least a portion of content of the document encrypted by an encryption key associated with an owner of the document, and index data including one or more of an identifier of the document and hash values of a plurality of blockchain transactions associated with the document.

In an optional embodiment, the predetermined condition is satisfied if a volume of the data stored in the cache storage exceeds a predetermined threshold. In an optional embodiment, the blockchain includes a plurality of smart contract pools, and the apparatus 2100 further comprising invoking an API to enable a blockchain node to initiate a consensus algorithm to record at least a portion of the data exceeding the predetermined threshold to the plurality of smart contract pools in a round-robin manner.

In an optional embodiment, the blockchain includes a plurality of smart contract pools, and the apparatus 2100 further comprising invoking an API to enable a blockchain node to initiate a consensus algorithm to record at least a portion of the data exceeding the predetermined threshold to the plurality of smart contract pools based on an ID of the data and IDs of the plurality of the smart contract pools.

In an optional embodiment, the at least a portion of data is associated with a plurality of documents for custom clearance, and the apparatus 2100 further comprising associating a document ID of each of the plurality of documents with corresponding data in the at least a portion of data.

In an optional embodiment, the at least a portion of data is associated with a plurality of transactions associated with a document, and the apparatus 2100 further comprising associating a hash value of each of the plurality of transactions with corresponding data in the at least a portion of data.

In an optional embodiment, the predetermined condition is satisfied if the at least a portion of the data is received at a predetermined time period different from a remainder of the data other than the at least a portion of the data.

In an optional embodiment, the blockchain includes a plurality of smart contract pools created during the predetermined time period, and the apparatus 2100 further comprising invoking an API to enable a blockchain node to initiate a consensus algorithm to record the at least a portion of the data to the plurality of smart contract pools.

In an optional embodiment, the configuration file is executed in response to restarting the computing device. In an optional embodiment, the data structure of the smart contact pool is a state Merkle tree including a plurality of key-value pairs.

In an optional embodiment, the second smart contract and the corresponding smart contract pool are associated with a smart contract ID of the second smart contract, wherein the smart contract ID is stored in the second smart contract and the smart contract pool to link the second smart contract with the smart contract pool.

Figure 22:
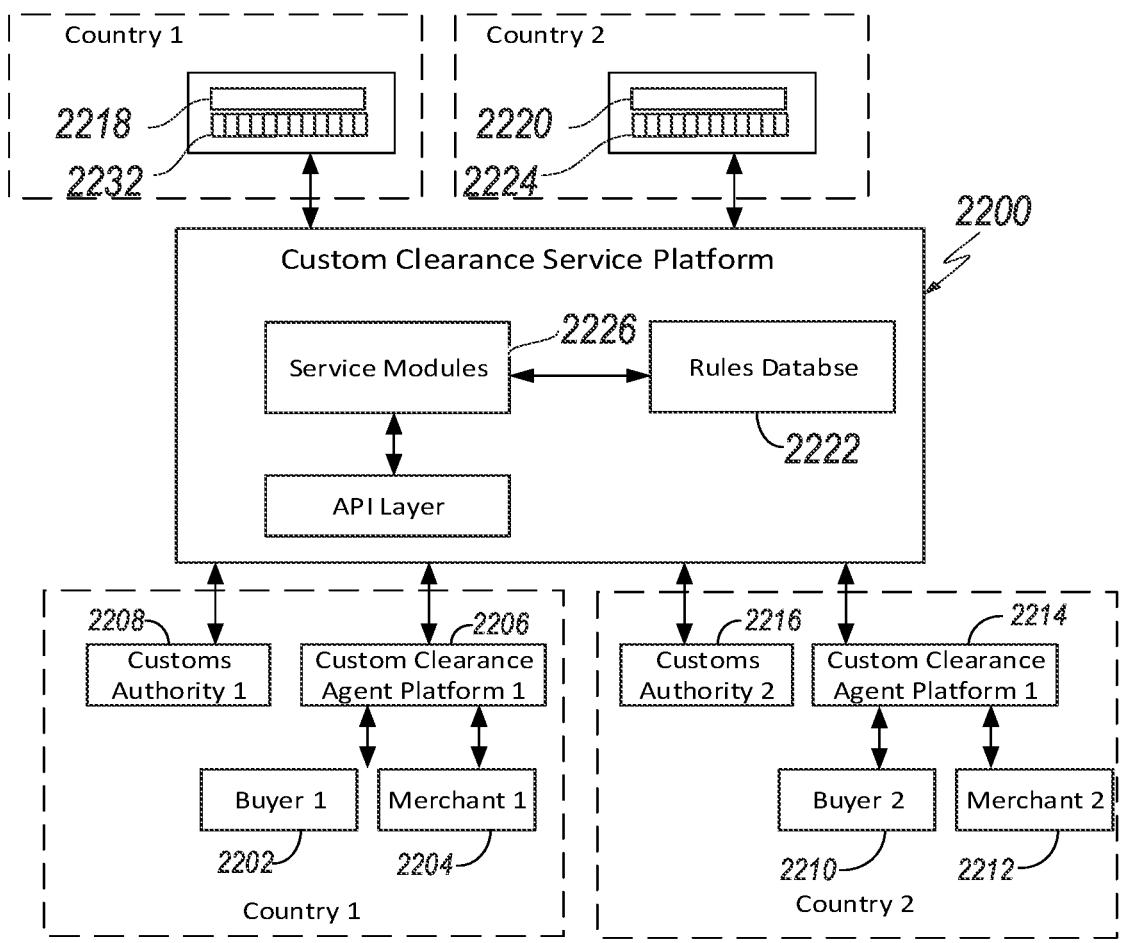
FIG. 22 is a diagram illustrating an example of a custom clearance service platform 2200, in accordance with embodiments of this specification.

FIG. 22 is a diagram illustrating an example of a custom clearance service platform 2200, in accordance with embodiments of this specification. In some embodiments, a custom clearance service platform 2200 can provide services to users in multiple countries by adopting to the local customs clearance rules in respective countries. In this example, a first buyer 2202 and a first merchant 2204 are located in a first country, a first custom clearance agent platform 2206 is managed by one or more customs brokers in the first country, and a first customs authority 2208 is responsible for approving requests for custom clearance of merchandise imported into the first country. A second buyer 2210 and a second merchant 2212 are located in a second country, a second custom clearance agent platform 2214 is managed by one or more customs brokers in the second country, and a second customs authority 2216 is responsible for approving requests for custom clearance of merchandise imported into the second country.

For example, the first buyer 2202 located in the first country wishes to purchase a first merchandise from the second merchant 2212 located in the second country and import the first merchandise into the first country. The first custom clearance agent platform 2208 collects information related to a first import order for importing the first merchandise into the first country according to the laws and regulations of the first country. The first custom clearance agent platform 2208 invokes the services of the custom clearance service platform 2200 to store first custom clearance information related to the first import order in a blockchain. The laws and regulations of the first country may require that the custom clearance data be stored in computer servers located in the first country. When the custom clearance service platform 2200 detects that the first custom clearance information is related to an import order submitted by the first buyer located in the first country, the custom clearance service platform 2200 stores the first custom clearance information in a first blockchain database 2218 managed by a first blockchain network and a first smart contract data cache 2232 located in the first country.

In a similar manner, the second buyer 2210 located in the second country wishes to purchase a second merchandise from the first merchant 2204 located in the first country and import the second merchandise into the second country. The second custom clearance agent platform 2216 collects information related to a second import order for importing the second merchandise into the second country according to the laws and regulations of the second country. For example, the documents and information required for custom clearance in the second country can be different from those of the first country. The second custom clearance agent platform 2216 invokes the services of the custom clearance service platform 2200 to store second custom clearance information related to the second import order in a blockchain. The laws and regulations of the second country may require that the custom clearance data be stored in computer servers located in the second country. When the custom clearance service platform 2200 detects that the second custom clearance information is related to an import order submitted by the second buyer located in the second country, the custom clearance service platform 2200 stores the second custom clearance information in a second blockchain 2220 managed by a second blockchain network and a second smart contract data cache 2224 located in the second country.

The custom clearance service platform 2200 can treat the first custom clearance information and the second custom clearance information differently. For example, each of the first and second countries may have regulations governing the procedures for handling the custom clearance information, and the privacy protections applied to the custom clearance information. The regulations of the first country may be different from those of the second country. In some embodiments, the custom clearance service platform 2200 provide the same APIs to the first custom clearance service platform 2206 and the second custom clearance service platform 2214, but the backend service modules 2226 for managing the processing of the custom clearance data will process the custom clearance data differently depending on the country that the import order is associated with.

For example, the custom clearance service platform 2200 includes a rules database 2222 that includes information about the regulations of the various countries in which the custom clearance service platform 2200 operates. Each of the service modules 2226 of the custom clearance service platform 2200, such as the custom clearance service module 920, the user control module 922, the privacy and encryption module 924, the DIS service module 926, the document lifecycle management module 928, and the smart contract service module 930 can access the rules database 2222 and operate in compliance with the regulations of each country.

For clarity of illustration, FIG. 22 omits several entities involved in the custom clearance process, such as the banks or payment companies, the delivery companies, the customs brokers, and the administrators. The custom clearance service platform 2200 handles the information collected from the various entities in various countries in compliance with the data retention and privacy protection regulations of each respective country.

Figure 23:
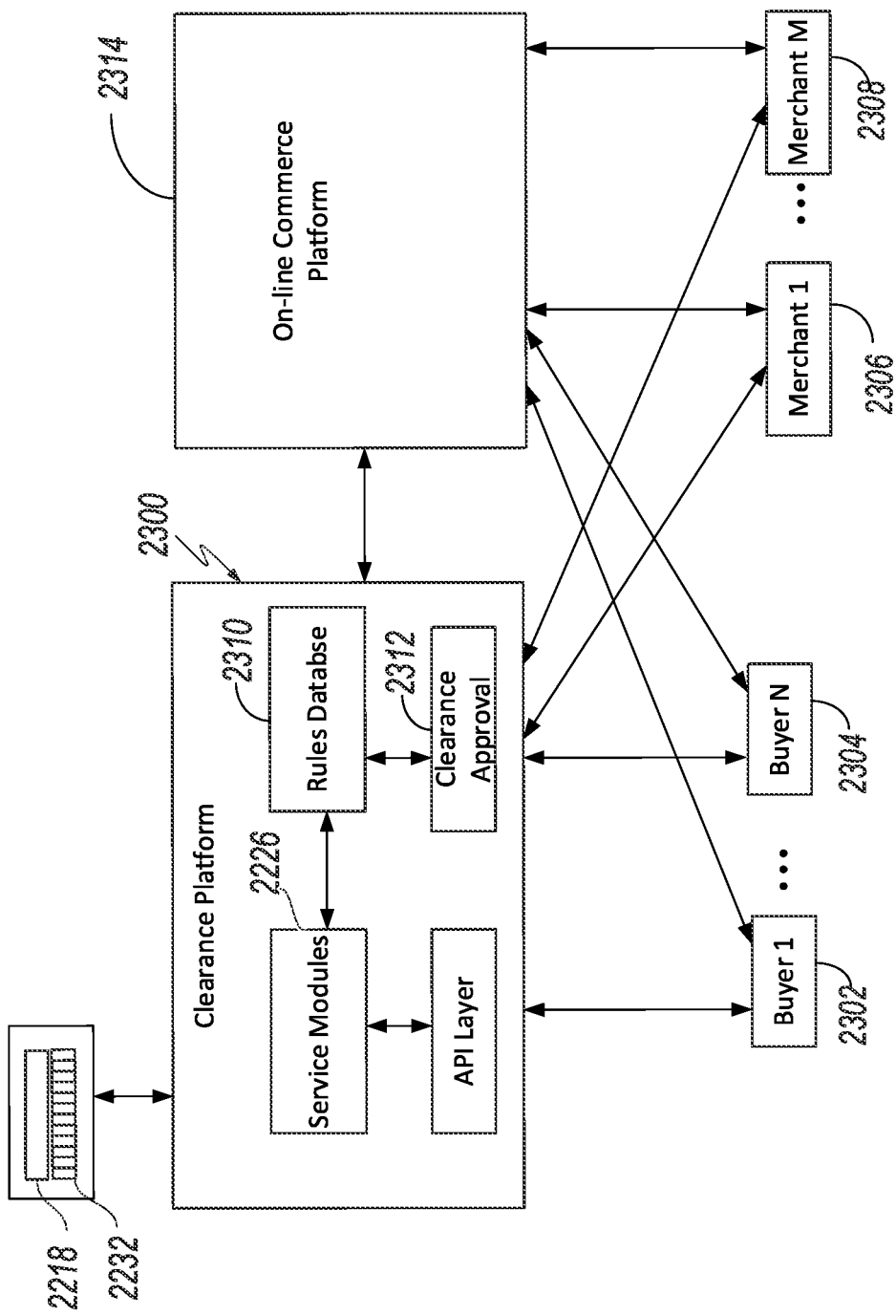
FIG. 23 is a diagram illustrating an example of a clearance platform, in accordance with embodiments of this specification.

The technology described in this specification is not limited to processing of import custom clearance data. Referring to FIG. 23, FIG. 23 is a diagram illustrating an example of a clearance platform 2300, in accordance with embodiments of this specification. A clearance platform 2300 can be used to process an arbitrary type of clearance data based on an arbitrary set of rules agreed upon by a group of people. For example, when a first group of people of a country agree to follow a set of rules regarding taxation on importation of goods, the clearance platform 2300 can be used to process import custom clearance data.

For example, a second group of environmentally conscious members may decide to buy products mostly from sustainable sources and to donate a certain percentage of the purchase price of merchandise purchased from non-sustainable sources to environmental causes. It may be difficult for individuals to keep track of what products are from sustainable sources or non-sustainable sources. The clearance platform 2300 allows the second group of members to easily set up rules to help achieve their goals. For example, the clearance platform 2300 can include a rules database 2310 specifying which consumer products are from sustainable sources, which farm products are produced using environmentally friendly methods, and which seafood products are produced by harvesting marine wildlife in a sustainable manner. An administrator can update the rules database 2310 from time to time. Members of the second group (e.g., first buyer 2302, . . . , N-th buyer 2304) can purchase products from merchants (e.g., first merchant 2306, . . . , M-th merchant 2308) through an on-line commerce system 2314.

When a buyer purchases a product through the on-line commerce system 2314 and indicates that the buyer belongs to the second group of members, the on-line commerce system 2314 sends purchase data to the clearance platform 2300, and indicates, e.g., with an identifier associated with the second group, that the purchase data are associated with the second group. The clearance platform 2300 records the purchase data on a blockchain database 2222 and/or a smart contract data cache 2218. The clearance platform 2300 includes a clearance approval module 2312 that analyzes the purchase data to determine, based on the rules database 2310, whether the product being purchased is from a sustainable source. If the product is not from a sustainable source, the clearance approval module 2312 determines the amount of donation that the buyer should contribute (this is similar to the customs authority determining the amount of import tax to be applied to import goods).

For example, the clearance approval module 2312 can send a message to the buyer indicating that the product is not from a sustainable source, and that the buyer should give a donation of a certain amount based on the agreement among the second group of members. The clearance platform 2300 can communicate with a bank of the buyer, request payment from the bank, and send the payment to, e.g., an environmental non-profit organization as donation. The transactions performed by the clearance platform 2300 can be recorded in the blockchain database 2222 that can be verified by the relevant parties. The services provided by the clearance platform 2300 can be automated through the use of smart contracts.

In some embodiments, the custom clearance service platforms 900 and 2200, and the clearance platform 2300 can be used to process clearance data (e.g., import custom clearance data) in a virtual world, e.g., in a gaming platform. For example, a gaming platform may allow players to establish virtual nations or kingdoms, recruit other players to be citizens or subjects of the virtual nations or kingdoms, and establish their own rules or laws for the virtual nations or kingdoms. The citizens/subjects of a nation/kingdom may trade goods with citizens/subjects of another nation/kingdom. The nation/kingdom may raise funds (in virtual currency) by imposing a tax on trade. The operations of the custom clearance service platforms 900 and 2200, and the clearance platform 2300 can be automated by use of smart contracts, so the technology used for implementing the custom clearance service platforms 900 and 2200, and the clearance platform 2300, can also be applied to implement virtual customs clearance and taxation in the virtual world. This allows the players of the online gaming platform to establish their own rules for taxation on trade, making the online gaming platform more realistic and interesting.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 11, 13, 15, 17, 19, and 21, it can be interpreted as illustrating an internal functional module and a structure of a computer system or a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general—and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for managing a blockchain-based customer clearance service platform comprising:
   receiving, using an API by the service platform managing interactions between one or more users and a consortium blockchain, a first request to authorize a first member to access information related to a first order, wherein the information is provided to a service authority for requesting clearance for the first order, and the first request is sent from an administrator;
   invoking a smart contract executing on the consortium blockchain to request that the first member be added to a list of authorized members who are authorized to access the information related to the first order, in which the smart contract is configured to maintain a mutable data structure on a blockchain node that stores information about the authorized members, wherein the consortium blockchain stores the information related to the first order or a processed version of the information related to the first order and the mutable data structure is a cache storage linked with an immutable data structure based on index data;
   receiving a confirmation from the smart contract that the first member has been added to the list of authorized members in the mutable data structure on the blockchain node; and
   sending a confirmation to the administrator that the first member has been added to the list of authorized members in the mutable data structure on the blockchain node.

2. The method of claim 1, comprising:
   at the service platform, receiving a third request from the first member to record or update information related to the first order;
   determining whether the first member is one of the authorized members who are authorized to access information related to the first order; and
   upon confirming that the first member is an authorized member, record or update the information related to the first order according to the third request.

3. The method of claim 2, wherein determining whether the first member is one of the authorized members comprises invoking the smart contract executing on the consortium blockchain to determine whether the first member is one of the authorized members based on the information stored in the mutable data structure.

4. The method of claim 1, comprising:
   at the service platform, receiving a third request from a second member to record or update information related to the first order;
   determining whether the second member is one of the authorized members who are authorized to access information related to the first order; and
   upon confirming that the second member is not an authorized member, denying the third request from the second member.

5. The method of any of claim 1, comprising providing a first application programming interface (API) to enable an administrator to add a new member to a list of authorized members who are authorized to access information related to an order.

6. The method of claim 1, comprising providing an application programming interface (API) to enable an administrator to remove a member from a list of authorized members who are authorized to access information related to an order.

7. The method of claim 1, comprising providing an application programming interface (API) to enable an administrator to set a permission level for a member who is authorized to access information related to an order, and storing information about the permission level in a second data structure that stores information about a list of members who are authorized to access the information related to the order.

8. The method of claim 1, comprising providing an application programming interface (API) to enable an administrator to update information for a member who is authorized to access information related to an order, and storing the updated information for the member in a second data structure that stores information about a list of members who are authorized to access the information related to the order.

9. The method of claim 1, wherein the information comprises at least one of order data, logistics data, or payment data associated with the first order.

10. The method of claim 1, wherein the information is import custom clearance information and the first order is a first import order.

11. The method of claim 1, wherein the mutable data structure and the smart contract are executed and maintained in a Trusted Executing Environment (TEE).

12. A computer-implemented method for managing a blockchain-based customer clearance service platform comprising:
   receiving, using an API by the service platform managing interactions between one or more users and a consortium blockchain, a first request from a first user to record or update information related to a first order, wherein the information is provided, or to be provided, to a service authority for requesting clearance for merchandize included in the first order;
   determining whether the first user is one of authorized members who are authorized to record or update the information related to the first order, by invoking a smart contract executing on the consortium blockchain based on information stored in a mutable data structure on a blockchain node, the mutable data structure maintained by the smart contract on a blockchain node that stores information about the authorized members, wherein the mutable data structure is a cache storage linked with an immutable data structure based on index data; and upon confirming that the first user is an authorized member, recording or updating the information related to the first order according to the first request and sending a confirmation to an administrator that the updated information related to the first order has been added to the mutable data structure on the blockchain node.

13. The method of claim 12, comprising:

at the service platform, receiving a second request from the first user to record or update information related to a second order, wherein the information is provided, or to be provided, to the service authority for requesting clearance for merchandise included in the second order, determining whether the first user is one of authorized members who are authorized to access the information related to the second order; and upon determining that the first user is not authorized to access the information related to the second order, denying the second request from the first user.

14. The method of claim 12, wherein the information is import custom clearance information, the first order is a first import order, and the service authority is a customs authority for custom clearance of the merchandise included in the first order.

15. A system for managing a blockchain-based customer clearance service platform, comprising:

one or more computers; and a non-transitory computer readable medium storing instructions that are executable by the one or more computers and that upon execution cause the one or more computers to perform operations as a service platform, the operations comprising:

receiving, using an API by the service platform managing interactions between one or more users and a consortium blockchain, a first request to authorize a first member to access information related to a first order, wherein the information is provided to a service authority for requesting clearance for the first order, and the first request is sent from an administrator;

invoking a smart contract executing on the consortium blockchain to request that the first member be added to a list of authorized members who are authorized to access the information related to the first order, in which the smart contract is configured to maintain a mutable data structure on a blockchain node that stores information about the authorized members, wherein the consortium blockchain stores the information related to the first order or a processed version of the information related to the first order and the mutable data structure is a cache storage linked with an immutable data structure based on index data;

receiving a confirmation from the smart contract that the first member has been added to the list of authorized members in the mutable data structure on the blockchain node; and sending a confirmation to the administrator that the first member has been added to the list of authorized members in the mutable data structure on the blockchain node.

16. The system of claim 15, the operations comprising:

at the service platform, receiving a third request from the first member to record or update information related to the first order;

determining whether the first member is one of the authorized members who are authorized to access information related to the first order; and upon confirming that the first member is an authorized member, record or update the information related to the first order according to the third request.

17. The system of claim 16, wherein determining whether the first member is one of the authorized members comprises invoking the smart contract executing on the consortium blockchain to determine whether the first member is one of the authorized members based on the information stored in the mutable data structure.

18. The system of claim 15, comprising:

at the service platform, receiving a third request from a second member to record or update information related to the first order;

determining whether the second member is one of the authorized members who are authorized to access information related to the first order; and upon confirming that the second member is not an authorized member, denying the third request from the second member.

19. The system of claim 15, the operations comprising providing an application programming interface (API) to enable an administrator to update information for a member who is authorized to access information related to an order, and storing the updated information for the member in a second data structure that stores information about a list of members who are authorized to access the information related to the order.

20. A non-transitory computer-readable medium storing instructions that are executable by the one or more computers and that upon execution cause the one or more computers to manage operations for a blockchain-based customer clearance service platform, the operations comprising:

receiving, using an API by the service platform managing interactions between one or more users and a consortium blockchain, a first request to authorize a first member to access information related to a first order, wherein the information is provided to a service authority for requesting clearance for the first order, and the first request is sent from an administrator;

invoking a smart contract executing on the consortium blockchain to request that the first member be added to a list of authorized members who are authorized to access the information related to the first order, in which the smart contract is configured to maintain a mutable data structure that stores information about the authorized members, wherein the consortium blockchain stores the information related to the first order or a processed version of the information related to the first order and the mutable data structure is a cache storage linked with an immutable data structure based on an index data;

receiving a confirmation from the smart contract that the first member has been added to the list of authorized members; and sending a confirmation to the administrator that the first member has been added to the list of authorized members.

* * * * *